(12) United States Patent
Rajasekaran et al.

(10) Patent No.: US 10,902,368 B2
(45) Date of Patent: Jan. 26, 2021

(54) INTELLIGENT DECISION SYNCHRONIZATION IN REAL TIME FOR BOTH DISCRETE AND CONTINUOUS PROCESS INDUSTRIES

(71) Applicant: Bahwan CyberTek Private Limited, Chennai (IN)

(72) Inventors: Panchatcharam Rajasekaran, Chennai (IN); Balasubramanian Sivarama Krishnan, Chennai (IN)

(73) Assignee: DT360 Inc., Natick, MA (US)

(*) Notice: Subject to any disclaimer, the term of this patent is extended or adjusted under 35 U.S.C. 154(b) by 0 days.

(21) Appl. No.: 16/389,493

(22) Filed: Apr. 19, 2019

(65) Prior Publication Data
US 2019/0347590 A1    Nov. 14, 2019

Related U.S. Application Data

(63) Continuation-in-part of application No. 15/921,456, filed on Mar. 14, 2018, which is a continuation of
(Continued)

(51) Int. Cl.
*G06Q 10/00* (2012.01)
*G06Q 10/06* (2012.01)

(52) U.S. Cl.
CPC ....... *G06Q 10/0635* (2013.01); *G06Q 10/067* (2013.01); *G06Q 10/0637* (2013.01)

(58) Field of Classification Search
None
See application file for complete search history.

(56) References Cited

U.S. PATENT DOCUMENTS 6,671,818 B1 * 12/2003 Mikurak ............... G06Q 10/06
714/4.21
7,124,101 B1 * 10/2006 Mikurak ............... G06Q 10/06
705/35

(Continued)

FOREIGN PATENT DOCUMENTS

WO    2012035547 A2    3/2012

*Primary Examiner* — Joseph M Waesco
(74) *Attorney, Agent, or Firm* — Barclay Damon LLP

(57) ABSTRACT

This invention that provides system, method & apparatus for Real Time integration and Analytics (RETINA) to enable proactive decision synchronization in real time in order to minimize the operational risk and maximize the process productivity for process industries such as Oil & Gas Exploration and Fossil fuel power plants is disclosed. RETINA generates and synchronizes the decisions that affect the performance and profitability of business operations in real time and helps in analysis that are essential for any successful business operations. RETINA provides methods and apparatus that combines data from several types of data sources, build models for identifying impending failures, predicting a future state of the process from currently measured process data and provide decision options to business users so that any unwanted opportunity loss such as downtimes or critical equipment failures that are operations risks would be eliminated. RETINA provides methods and apparatus to ensure that correct decisions are taken at the appropriate instant of time with right amount of data to the pertinent personnel to eliminate inefficiencies in operations and performance resulting in tangible profitability.

3 Claims, 51 Drawing Sheets

Related U.S. Application Data application No. 14/205,377, filed on Mar. 12, 2014, now abandoned.

(56) References Cited

U.S. PATENT DOCUMENTS

| | | | | |
|---|---|---|---|---|
| 7,584,165 B2* | 9/2009 | Buchan | G06Q 10/06 | 706/60 |
| 7,716,077 B1* | 5/2010 | Mikurak | G06Q 10/06 | 705/7.12 |
| 7,818,203 B1* | 10/2010 | Pearson | G06Q 10/0639 | 705/7.29 |
| 8,032,409 B1* | 10/2011 | Mikurak | G06Q 30/00 | 705/14.39 |
| 8,311,863 B1* | 11/2012 | Kemp | G06Q 10/0639 | 705/7.11 |
| 8,417,360 B2* | 4/2013 | Sustaeta | G05B 13/0265 | 700/28 |
| 2004/0064351 A1* | 4/2004 | Mikurak | G06Q 10/087 | 705/22 |
| 2004/0153437 A1* | 8/2004 | Buchan | G06Q 10/06 | |
| 2005/0027683 A1* | 2/2005 | Dill | G06F 16/2465 | |
| 2006/0161952 A1* | 7/2006 | Herz | H04L 9/0825 | 725/46 |
| 2006/0178918 A1* | 8/2006 | Mikurak | G06Q 10/06375 | 705/7.25 |
| 2006/0224437 A1* | 10/2006 | Gupta | G06Q 10/06 | 705/7.32 |
| 2009/0204234 A1* | 8/2009 | Sustaeta | G05B 13/0285 | 700/29 |
| 2013/0226317 A1* | 8/2013 | Vijayaraghavan | G06Q 10/06 | 700/28 |
| 2018/0268333 A1 | 9/2018 | Rajasekaran | | |

* cited by examiner

RETINA TIME SERIES MODEL BUILDER

| MODEL | Type |
|---|---|
| WeatherStation1 | VAR |
| WeatherStation2 | VAR |
| GenerationOutput1 | ARMA |
| GenerationOutput2 | ARIMA |
| GenerationOutput3 | ARMA |
| GenerationOutput4 | AR |

[MODIFY] [DELETE]

<NEW NAME> [ADD]

DESCRIPTION

DATA SOURCE  ○ DATA SET  ○ DATABASE  ○ PHYSICAL FILE

MODEL TYPE  ○ AR  ○ ARMA  ○ ARIMA  ○ VAR

NUMBER OF PREDICTION STEPS

LAG ORDER

DIFFERENCING ORDER

ERROR LAG

INITIAL STATE

COVARIANCE

NUMBER OF ITERATIONS / STOPPING CRITERIA

[TRAIN] [SAVE]

RETINA CONSTRAINT OPTIMIZATION CONFIGURATION MODULE

| CONSTRAINTS | Description |
|---|---|
| Next Action | Determine next steps |

MODIFY  DELETE

<NEW NAME>  ADD

---

DESCRIPTION:

TAGS:

OBJECTIVE EXPRESSION: TAG1*TAG2 + TAG3*TAG5 * (TAG2^2/TAG6)

OBJ. TYPE: ○ MINIMIZE  ○ MAXIMIZE  ○ SET TO VALUE

CONSTRAINTS LIST:

EDIT  DELETE

CONSTRAINT EXPRESSION: (TAG1^2 – 25) / TAG1^2 >= 0.00

MATH CONDITIONS: ○ +  ○ –  ○ *  ○ /  ○ ^
○ =  ○ >  ○ ≠  ○ <=  ○ >=

○ TAG  ○ VALUE

ADD

SOLVE BY: ○ EVOLUTIONARY ALGORITHM  ○ NEWTONIAN  ○ LANGRANGE  ○ LP

SAVE

| Pattern Name | Description | Monitoring Parameter | Influencing Parameter | Rules |
|---|---|---|---|---|
| Drop in PF | Drop in Condenser Performance Factor – U5zz_FL_CND_PERF_FACT_PCT | Condenser performance Factor – U5zz_FL_CND_PERF_FACT_PCT | • HP Condenser pressure-U5_HP_CND_P<br>• HP Condenser Vacuum pressure - U5_HP_CND_VAC_P<br>• LP condenser pressure- U5_LP_CND_P<br>• LP condenser vacuum pressure - U5_LP_CND_VAC_P<br>• Condenser pressure deviation - U5zz_FL_CND_DEV_P<br>• Condenser temperature Rise- U5zz_FL_CND_TEMP_RISE_T<br>• HP(A) Condenser water temperature difference - difference=U5z_HP_A_CND_WTR_DELTA_T<br>• U5z_HP_A_CND_WTR_DELTA_T<br>• HP(B) Condenser water temperature difference=U5z_LP_A_CND_WTR_DELTA_T<br>• LP(A) Condenser water temperature difference=U5z_LP_B_CND_WTR_DELTA_T<br>• LP(B) Condenser water temperature<br>• Condenser Pump Dissolved Oxygen - U5_CCND_PUMP_DO<br>• HotWell Lvl A<br>• HotWell Lvl B<br>• CCND_PUMP_DISCH_pH<br>• CCND_PUMP_DISCH_SC<br>• Hotwell Temperature - U5_HW_Temp<br>• Ambient Air Temp - U5_AMB_AIR_T<br>• HP cooling water outlet temp - U5_A_HP_CW_OUT_T<br>• U5_GROSS_MW<br>• LP cooling water outlet temperature U5_A_LP_CW_OUT_T | if U5zz_FL_CND_PERF_FACT_PCT minimum value = 40 AND U5zz_FL_CND_PERF_FACT_PCT maximum Value = 60 AND Slope of U5zz_FL_CND_PERF_FACT_PCT < -0.3 AND Slope ROC of U5zz_FL_CND_PERF_FACT_PCT < -0.2 AND U5_GROSS_MW maximum Value =300 |

FIG. 31

INTELLIGENT DECISION SYNCHRONIZATION IN REAL TIME FOR BOTH DISCRETE AND CONTINUOUS PROCESS INDUSTRIES

CROSS-REFERENCE TO RELATED APPLICATIONS

This application is a continuation-in-part of U.S. patent application Ser. No. 15/921,456, filed Mar. 14, 2018, which is a continuation of U.S. patent application Ser. No. 14/205,377, filed Mar. 12, 2014, the disclosures of each of which are incorporated by reference herein in their entireties.

FIELD OF THE INVENTION

The present invention of RETINA (Real Time Integration and Analytics) relates to a dynamic, real time decision synchronization system that reduces the operational risks involved in process industries such as for example thermal power generation operations and oil & gas upstream operations. RETINA works on real time and historical operational and maintenance data to generate risk-reduced business decisions and is a system that provides for set of methods and techniques to collect, validate, model, predict risk and prescribe correction actions in order to minimize operational risks characterized by events or scenarios such as production disruption, unforced/forced maintenance, increased operational costs and opportunity loss for the above process industries. The invention allows configuration of computation algorithms using inbuilt Artificial Intelligence techniques, Statistical methods, Evolutionary algorithms and constraint optimization tools to process the data for decision generation and synchronization in real time.

Definitions

An operations risk is defined, in the context of this invention, as a scenario or an event, which when not handled in the most appropriate manner, may result in business scenarios that would be detrimental to the objectives of the business itself. This may be different for various businesses and could be both time dependent and independent.

A decision is defined, in the context of this invention, as an action direction or a prescription or a recommendation coming from this invention that would mitigate or dilute or minimize a potential operations risk and handle them in a manner that would ensure business goals are not compromised.

A decision synchronization is defined, in the context of this invention, as a timely and most appropriate recommendation or call-to-action or suggestions from this invention that would be applicable to various business users and applicable to various business areas such that the decisions that are identified by the invention reaches the correct stakeholders for completion or execution.

BACKGROUND OF THE INVENTION AND PRIOR ART

Availability of right amount of information and making timely decisions are imperative to realize high performance manufacturing business operations. Process industries operate under lots of constraints that are both system and human driven. Errors in decision making on operations standpoint impacts several aspects of business and these cumulatively puts the business into serious risks of production reduction, unplanned maintenance leading to unplanned expenses and also production loss causing opportunity loss directly.

Upon detailed analysis, process industries such as Oil & Gas Upstream sector, Fossil Fueled Power plants, are devoid of timely decision synchronization mechanism due to lack of integration of information between operational and business line. Information is available in silos such as production systems, control systems, quality assurance systems besides the performance systems such as Asset Maintenance systems and the Enterprise resource planning (ERP). The very presence of the silo of information and their lack of exchange amongst the operational and business systems lead to the loss of several critical and vital business advantages.

Although there are systems, methods and apparatus existing that propose efficient data integration, predictive analytics in silos, there is no singular method or apparatus that is capable of delivering a user configurable and manageable prescriptive analytics to reduce the operational risks mentioned in real time.

U.S. Pat. No. 7,584,165 by John Gibb Buchan describes a type of real time support apparatus, method and system for facilitating decision making in an enterprise. It is used to make real time operations and maintenance decisions in connection with assets such as petroleum and petrochemical refinery. This, however, does not provide specific details of how exactly the data from various sources are processed to create decisions, which sequence of steps followed or what computations are inherently involved.

In US20130226317A1 by Vijayaraghavan et al., a real time computerized system is described which is used to control, manage and optimize the machine tools by comparing the operational data with historical stored data. The data's are harvested and collected in a central data warehouse; the operational data is compared with the warehouse data by multi-variant analysis, etc to generate performance evaluation of the machines. The machines are mainly addressed for their environmental impacts, risk, maintenance, and safety. The areas such as how data would be processed—sequence, models or algorithms employed and how these would enable any predictable impending set of events that would impact on the overall reduction of operations risk are not explicitly covered.

U.S. Pat. No. 8,417,360B2 by Sustaeta et al., describes a control system and method for selecting, controlling and optimizing the machinery utilization and process performance. It also provides diagnostic and prognostic information about the process which can be integrated with the decision support systems, logistics systems and control systems to optimize specific operational performance of any process industry. However, this lacks the advantage of utilizing past performance and maintenance history of machines to forecast any impending failures or faults that would be a major input in planning operations and maintenance thereby minimizing business opportunity losses.

In U.S. Pat. No. 8,311,863B1 by Kemp, a high performance capability assessment model is described. It relates to an efficient and cost effective way of identifying the performance of an organization. It helps to achieve a clear, consistent and well defined execution of core processes in utility industries with reduced inefficiencies and waste. However, this is more of methods that can help classifying the operations processes but not ways to interpret or forecast any unfavorable scenarios.

The present invention overcomes the drawbacks of above mentioned inventions by providing a method and apparatus to define data sources, define processing logic, define models, define risks, faults and provide for pattern based matching of the faults, combining the outputs of models and patterns to provide inputs for proactive prescriptions to various business users with actionable insights that would reduce the stated operations risks in their respective areas of work.

SUMMARY OF THE INVENTION

The present invention of RETINA provides a system, method and apparatus for operational risk reduction by a real time decision synchronization system that involves modeling and contextualization of operational real time and historical data to generate risk-reduced business decisions for Process industries such as Oil & Gas Upstream sector and Fossil Fueled Power industry. The invention relates to a set of methods, techniques that collects, validates, models, predicts risk and prescribes corrective steps and actions that minimizes operational risks like production disruption, forced maintenance, increased operational costs and opportunity loss for the above process industries.

The present invention is a distributed computing system where the data sources can be from multiple geographically spread out locations and decisions can either be centrally made or locally made. To accommodate the various business concerns and risks that would be involved if not handled, RETINA has been invented to be a distributed, collective intelligence system comprising of two levels of intelligence: remote intelligence node and central intelligence node. There can be several RETINA remote nodes depending on complexity of the processes to be managed. For example, there can be one remote node per power plant or an oil drilling rig. The number of remote nodes are dependent on the size of the business operations of the organization that needs decision synchronization. These RETINA remote nodes handle scenarios that may need faster decision synchronization, for example, process closed loop optimization and provide necessary information for RETINA central node. The RETINA central node, provides its decisions and synchronizes the same to several users.

Whether it is a remote node or a central node, the present invention executes a combination of models built using Artificial Intelligence techniques, machine learning, Statistical methods, Evolutionary algorithms and constraint optimization tools in such a manner that the data from real time and other non-real time sources are used to sense the risk probability and generate decisions that suggest remedial actions synchronizes the same in real time.

The data is first subjected to a set of pre-configured plumbing & pre-processing techniques to create a wholesome actionable data. Then, the pre-processed data is passed into various sequential modeling mechanisms that capture the risks. These set of steps, in combination of the above mentioned modeling tools, analyzes, understands & establishes the innate, inherent relationship that exists between the parameters in the data to estimate the probability of process risks. Once done, a secondary set of models get activated to identify the probability of incidence of opportunity loss in any manner. Once done, the third level of models identify the category of risks and generates the remedial actions from a set of pre-configured knowledge base of actions for risk categories. These actions are then synchronized as per the user levels to provide an overall wholesome set of decisions, when acted upon result in reduced operation risks that would cumulatively boost the productivity of the process.

RETINA provides method and apparatus to configure the risk areas of a process dynamically and execute them on the fly. The technology disclosed herein, has diverse utility value, application & usage across several process industries specifically in oil & gas drilling and fossil power generation industry. RETINA provides tools and methods to configure concurrent real time & non-real time data sources for data acquisition, create models out of the data acquired, configure risk reducing, productivity increasing philosophy and build knowledgebase for relating the scenarios identified with diagnostics and decision making. While doing all the above mentioned activities, the methods provided by RETINA ensure that the end users are only expected to have only basic computer operations besides their domain knowledge to configure the system, without having the need to know the system programming or knowledge on the computations carried out inside the models.

Further, the present invention RETINA provides intuitive data collaborated, artificial intelligence enabled heuristic and data modeling capabilities that also embeds evolutionary algorithms and constraint optimization toolkits providing adaptive decision system minimizing or eliminating human intervention.

RETINA Remote node comprises of the components mentioned here-in:
  a. Data store which is used to store and manage the parameters and attributes from several data sources
  b. Real time data preparation, cleaning & smoothening mechanisms to process raw data.
  c. Very critical computations that may be needed for one or more timely closed loop decisions are computed by a Real Time Logic Processing and KPI Computation Engine;
  d. Real-time logic processing and KPI computation engine inside which the processing logic is built by the domain expert using the math power provided by Math Library block
  e. RETINA interface management module is the data integration gateway of RETINA and can handle unlimited number of concurrent interfaces of similar or different types
  f. Meta database which keeps track of configurations, variations, limits and other key attributes
  g. The math library tool kit with numerous computing libraries which is used by the domain expert to built the logic
  h. Fuzzy Logic modeler
  i. Statistical regression fit modeler RETINA Central Remote node comprises of the components mentioned here-in:
  a. Data store which is used to store and manage the parameters and attributes from several RETINA Remote intelligence nodes.
  b. Collection of data pre-processing libraries that cleans and extracts actionable data
  c. KPI configuration module to dynamically configure the Key Performance Indicators that is to be computed by the Real Time Logic Processing and KPI Computation Engine;
  d. Real-time logic processing and KPI computation engine inside which the processing logic is built by the domain expert using the math power provided by Math Library block
  e. RETINA interface management module is the data integration gateway of RETINA and can handle unlimited number of concurrent interfaces of similar or different types
  f. Meta database which keeps track of configurations, variations, limits and other key attributes g. Math library tool kit with numerous computing libraries which is used by the domain expert to built the logic
h. Data pre-processing libraries including clustering
i. Statistical regression fit modeler
j. Neural network modeler
k. Genetic Programming Modeler
l. Time series Modeler
m. Constraint optimization algorithm for processing linear, non-linear programming models;
n. Failure or risk pattern identification module
o. decision synchronizer to deliver intelligent risk-reduced decisions in a closed loop system;

BRIEF DESCRIPTION OF THE DRAWINGS

FIG. 4 illustrates the Tag configuration module of RETINA.

FIG. 5 illustrates the data sources (and destinations) for RETINA decision synchronization.

FIG. 6 illustrates the data pre-processing configuration module of RETINA

FIG. 7 illustrates the data set configuration module in RETINA

FIGS. 9-A and 9-B illustrate the Fuzzy logic model builder module of RETINA

FIG. 11 illustrates the genetic programming model builder module of RETINA

FIG. 12 illustrates the time series model builder module of RETINA

FIGS. 14-A and 14-B illustrate the Risk pattern configuration module of RETINA

FIG. 15 illustrates the constraint optimization module of RETINA

Figure 23:
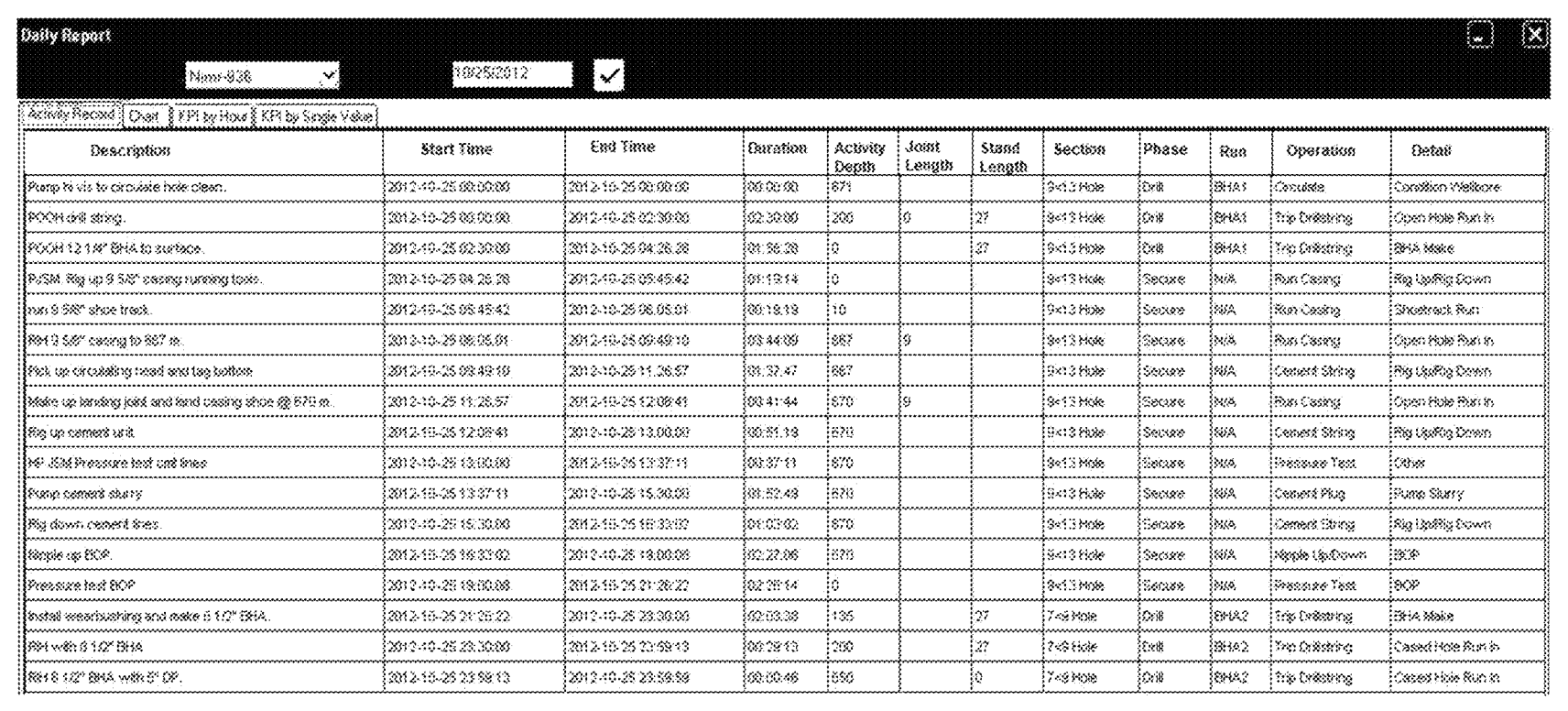

FIG. 23 illustrates a typical daily activities report generated through RETINA

FIGS. 24-A and 24-B illustrate risk pattern configuration in RETINA for a typical compressor in the oil and gas upstream process.

FIG. 29 illustrates a typical fuzzy rule block configured in RETINA for Power plant control and dynamic decision making.

FIG. 31 illustrates a set of rules configured in RETINA for the condenser equipment in the regenerative cycle for risk pattern identification.

DETAILED DESCRIPTION OF THE INVENTION

Figure 1:
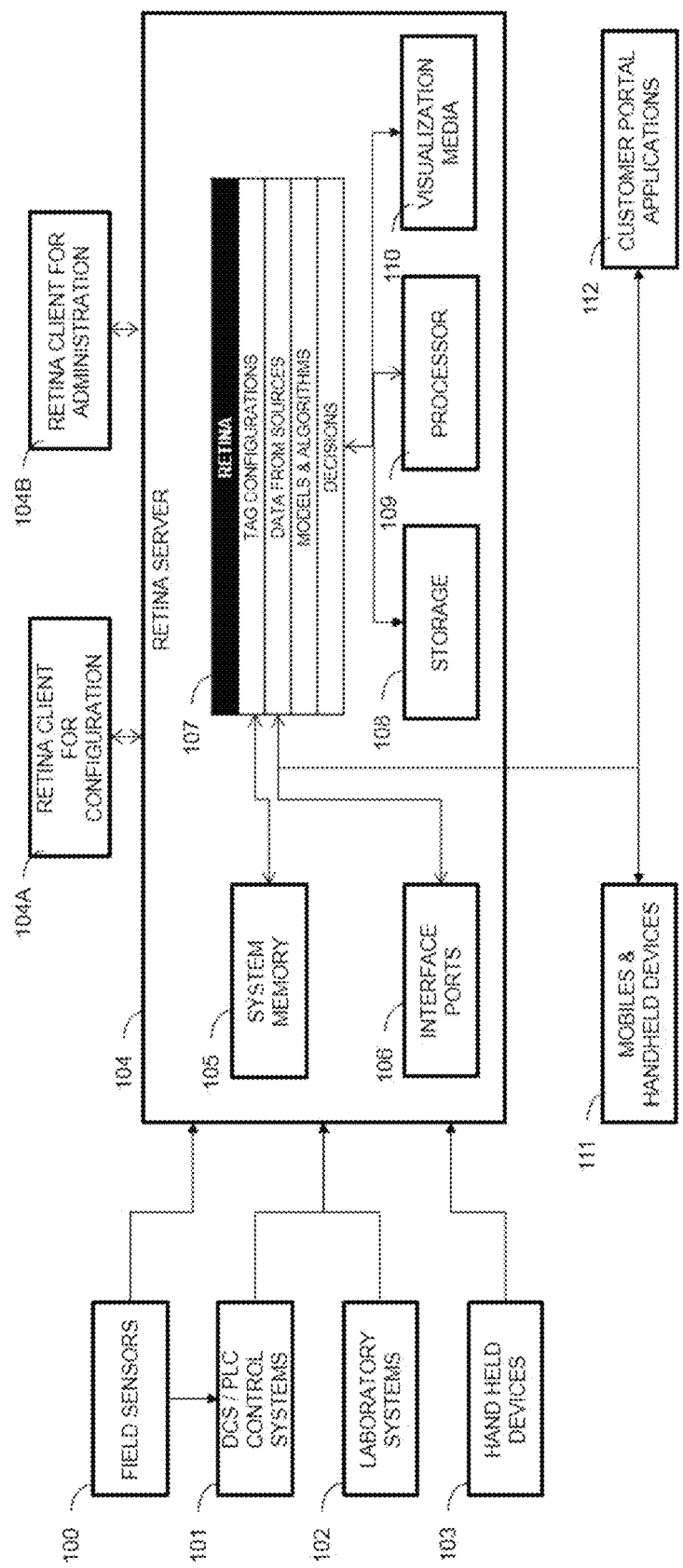
FIG. 1 illustrates a typical deployment of RETINA for decision synchronization, following a client server mode of configuration, deployment and runtime of the system.

Process industries such as Power Generation plants and Oil & Gas are highly machinery and asset intensive. Not just these are needed to be in continuous operations all around, but also are required to perform at their peak levels to complete the intended outcomes of the process and therefore of the entire business. Since the continual operations are imperative, the availability of the assets are also imperative. Therefore, any impending anomaly and disruption to the aspects of performance and availability would need to be sensed, analyzed and acted upon, while contextualizing with the criticality of the operations, process and other considerations. The significance of this is obvious: cost of failure is enormous not just for continuity of operations, but also in terms of business opportunity loss and any impacting health and safety issues that may arise. To do this, there is a need for a computing system which provide method and apparatus with the ability to allow user to configure, tune and manage all those steps that enables listening to vital signals from all these assets, managing the data from related sources and work on set of methods to do the above in real time and as things happen. Such a system would, not just foresee the risks of operations disruption—degradation of performance of assets, downtime or non-productive time scenarios besides missing out on opportunities to improve productivity by reduction of raw material/fuel usage, but also recommend suitable inferences and actions to handle the above scenarios to relevant set of personnel in various level of business operations hierarchy. RETINA is an invention aimed to address that above scenarios.

Broadly, RETINA, provides methods and apparatus to, combine and unify data from standard and proprietary data sources, provide predictive-prescriptive analytics capability that is essential for successful business operations and an adaptive real time process modeling capability to generate intelligent risk-reduced business decisions for the above mentioned industries.

When in operation, the first key step is to synchronize, streamline and consolidate data from several data sources including plant/shop floor which may be from a machine, equipment or a process area, from a plant control system, from an operations execution system or from a quality control system. The synchronized data is further subjected to plumbing & pre-processing techniques to create a wholesome actionable data. Finally the pre-processed data is modeled through heuristics, data oriented or statistical means to understand & establish the innate, inherent relationship that exists underneath the parameters in the data stream.

The distinctiveness of the RETINA includes:
a) Distributed & Collective data processing: RETINA is an invention that provides for distributed intelligence capabilities in a remote and central node configuration, such that remote RETINA intelligence nodes can synchronize decisions that need not be analyzed and synchronized from the central RETINA intelligence node and central RETINA intelligence node synchronizes decisions to different set of users as well as sends out key inputs or decisions back to the remote RETINA node.
b) Data Integration: RETINA provides an adaptive and seamless platform that enables data integration and collaboration of real time, persistent, pseudo real time & non-standard data sources such as plant control systems: SCADA, DCS, PLC, Historians, Energy Meters, Machines, Field Equipment, CNCs, Lab equipment, MES, Hand Held devices, GIS systems, ERP, EAM, BI systems and Corporate Performance Management Systems. It has in-built adapters and data integrators to acquire data from above mentioned sources regardless of the nature of the process. RETINA can be configured to identify raw process parameters, derived parameters, manual feed and decision parameters. The acquired data are integrated with business systems such as Enterprise Service Bus systems, SOA enabled systems and Business Process Management Systems.
c) Predictive Analysis: RETINA has provision for online real-time predictive analytics using which a framework for manual & automatic multi parameter predictive model is created.
d) Modeling: RETINA has capability to adjust, adapt, create and manage heuristic and data models and has provisions to select the model that is to be used during a particular scenario. The framework created can contextualize the data & information, devise models automatically and self-adjust them according to the scenarios.
e) Industries: RETINA can be adapted to any type of process industry—continuous, discrete or batch.

FIG. 1 shows a typical deployment of RETINA for decision synchronization. Data and information would be acquired from variety of data sources as outlined in (100), (101), (102) and (103), through interface ports (106) available in RETINA server (104). RETINA is configured from a client computer (104A) and administered for user access from another client (104B). All configurations of RETINA outlined in (107), including tags, model metadata, decision settings, are archived in system storage (108), would be loaded into server memory (105). The computer processor (109) processes the logic of models with data that would stream into RETINA and produce outputs that can be seen in local visualization media (110) such as monitors or in mobile devices (111) or in web portal applications (112).

The current invention is a distributed computing system that:
a. Has deployments over a set of data interface and integration computer servers to access data from variety of realtime and non-realtime data sources such as field sensors, DCS, PLC, SCADA systems, Laboratory systems and hand held devices and also from ERP and Maintenance Management software systems
b. Has one or more database storage servers to store the data collected from data interface and integration computer servers in raw, pre-processed and abstracted formats.
c. Has deployments over one or more User Administration and configuration computer servers to allow user access and data processing logic configurations, data model creation and definition of Key Performance Indicators so as to store all master meta data needed for decision synchronization.
d. Has one or more concurrent application servers that host the run time RETINA components such as real time in-memory data store, fuzzy logic engine, neural network engine, regression fit engine, constraint optimization engine, Real time logic processing and KPI engine, Decision synchronization engine, that pull data from data interface and integration servers, database storage servers and User administration and configuration servers to process the data from various sources using the meta data to deliver the decisions synchronized as per the situations identified by the current invention at correct times.
e. Has a client deployment for the users of the current invention to access the findings and decisions synchronized through a laptop computer connected to the internet, a mobile phone with internet enabled access and a desktop computer system that is connected to internet.

The uniqueness that the current invention brings is that the entire decision synchronization cycle—right from data interface from variety of data sources to model building to setting up decision synchronization is completely user configurable and definable provided the user understands the merits and demerits of usage of data modeling components such as a neural network or a fuzzy logic or a regression fit at various scenarios as per the area of usage of the current invention.

Figure 1A:
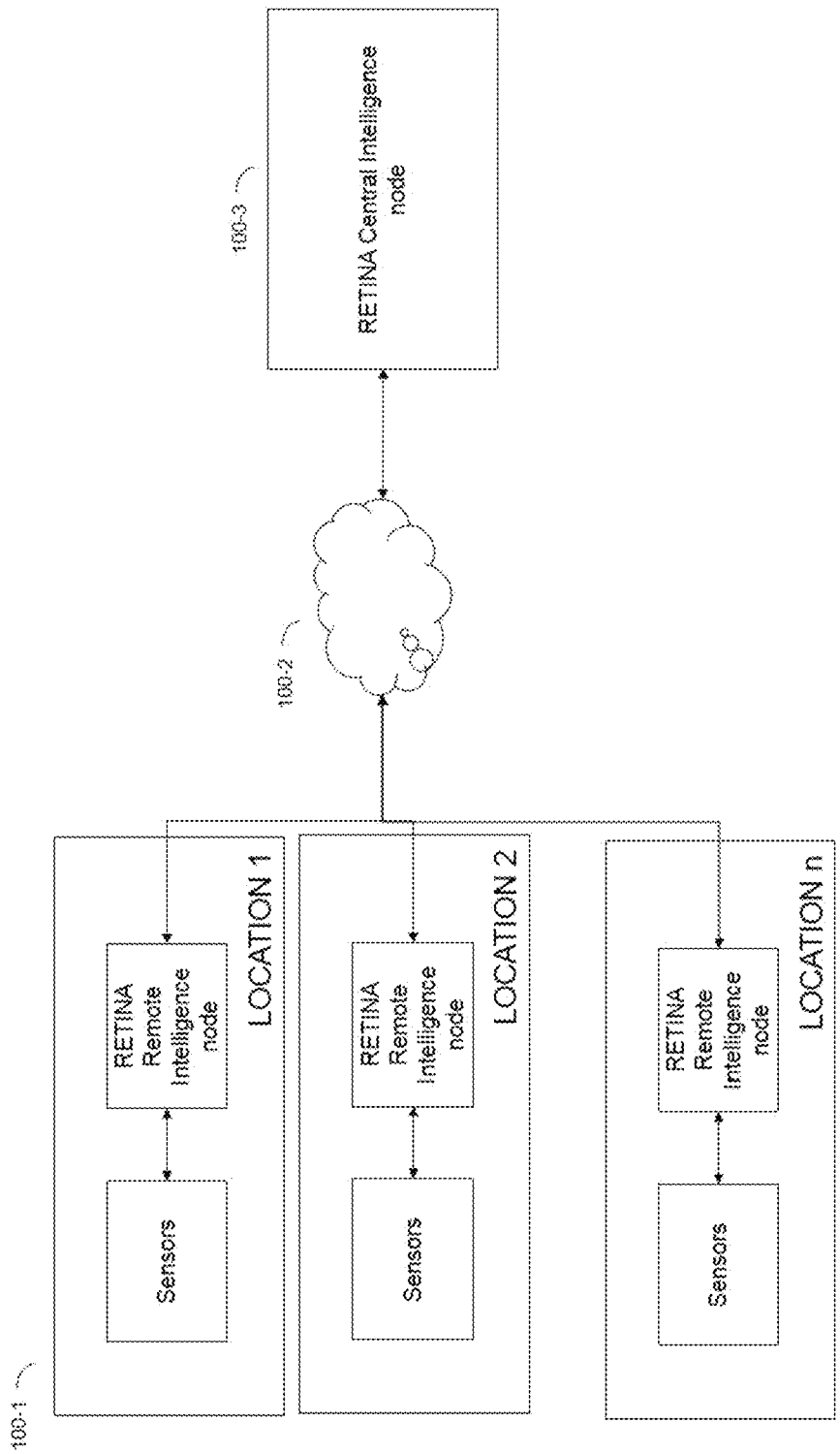
FIG. 1A illustrates a generic RETINA distributed intelligence schematic

FIG. 1A talks about a general RETINA configuration of Remote and Central Intelligence nodes. (100-1) is a typical remote location which for example can be an Oil & Gas upstream oil drilling rig or a thermal power plant. The data from sensors are acquired by a RETINA remote intelligence node which automatically processes the data and generates its own set of decisions that are synchronized for local users with in the remote location. The critical information alone from each remote location passes through the internet (100-2) to a central RETINA intelligence node (100-3).

Figure 1B:
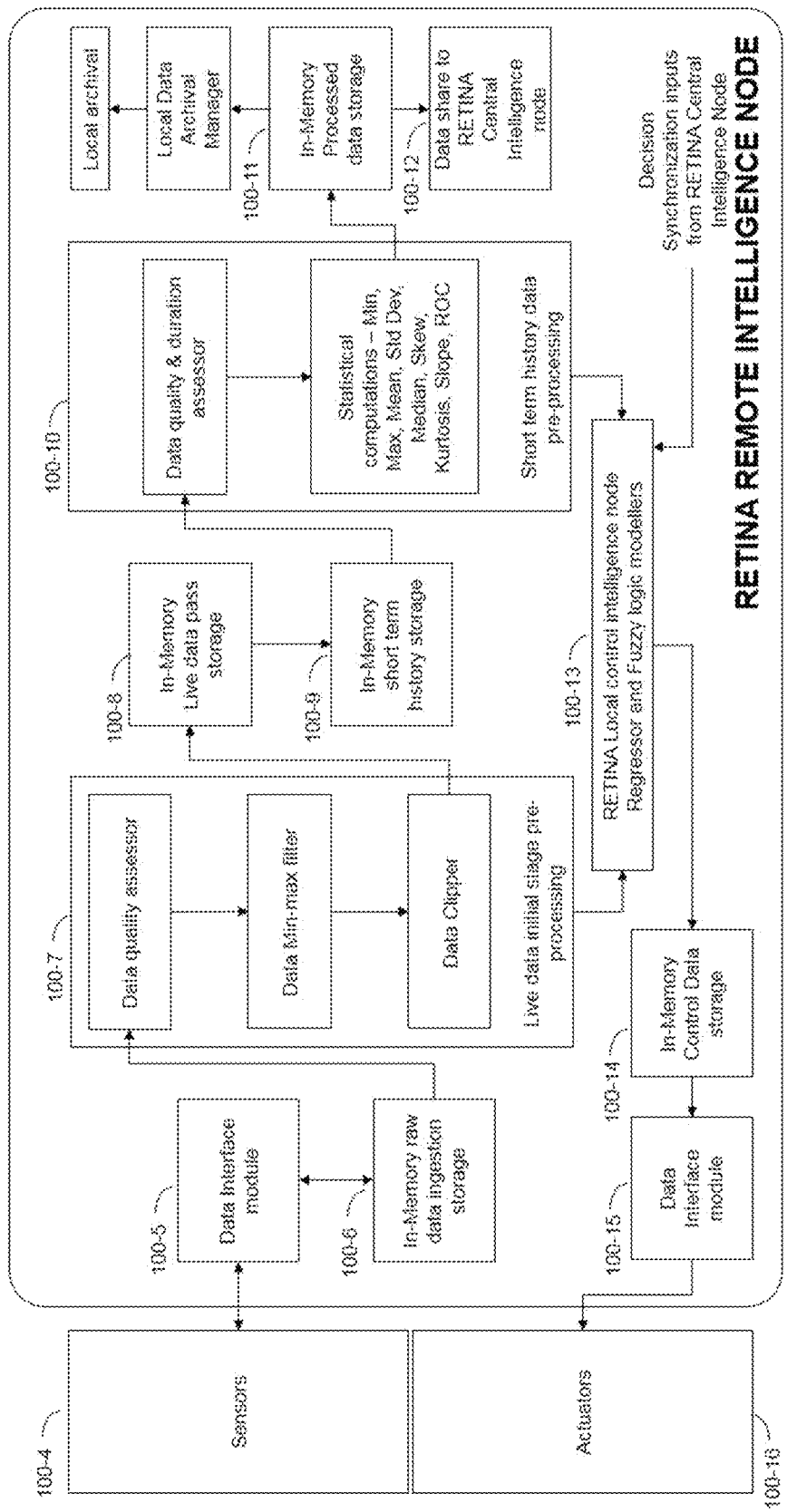
FIG. 1B illustrates Automated Data Pre-processing in a RETINA local intelligence node

FIG. 1B details how the RETINA Remote intelligence node processes the data. Typical installation of this remote intelligence node would be made for continuous & discrete process industries such as Thermal Power plants and Oil & Gas. The sensors mentioned in (100-4) typically could be plant control systems such as PLC, DCS, SCADA, Historian or even a sensor network of the remote location. RETINA's Data interface module mentioned in (100-5), acquires the data and passes into the RETINA's In-memory raw data ingestion storage (100-6). The function block (100-7) does data pre-processing on this live data in these steps:
  a. Data quality assessor which validates the data quality as would be acquired from the data source.
  b. Data min-max filter checks the data range
  c. Data clipper typically works on clipping the data to the pre-set min-max range in the event of deviating the range Once the data is subjugated through the above process mentioned in the block (100-7), the data is stored in the In-memory Live Data Pass storage (100-8). The data from this gets stored in the In-memory Short Term history storage block (100-9). The data is stored as multidimensional arrays for identified parameters enabling the subsequent statistical processing computations to happen. The data from this block is fed into the Short term history data pre-processing block (100-10), where the following sequence of steps would happen:
  a. Data quality & duration assessment: This is done to ensure adequate and sufficient data is present in the storage for subsequent processing.
  b. All the statistical computations such as minimum, maximum, mean, standard deviation, variance, skew, median, kurtosis, non-zero average, Rate of Change (ROC) would be done on identified data.

The data processed out of the block (100-10) would be stored in the In-memory processed data storage (100-11). The data present here are both archived locally as well as shared to RETINA Central Intelligence node (100-12). The data from blocks (100-7) and (100-10) are fed into the block (100-13), which is the RETINA local intelligence node that executes a real-time rule processing engine that embeds Fuzzy Logic and Regression fit modelers. This block computes, in real time, any recommendations or decisions that would need to be provided into the plant and sends the same first to the In-memory Control Data Storage (100-14), which then sends to the Data interface module (100-15) which pushes the same back to the actuators (100-16) of the plant which again typically would the plant control systems such as the DCS, PLC and SCADA systems.

Figure 1C:
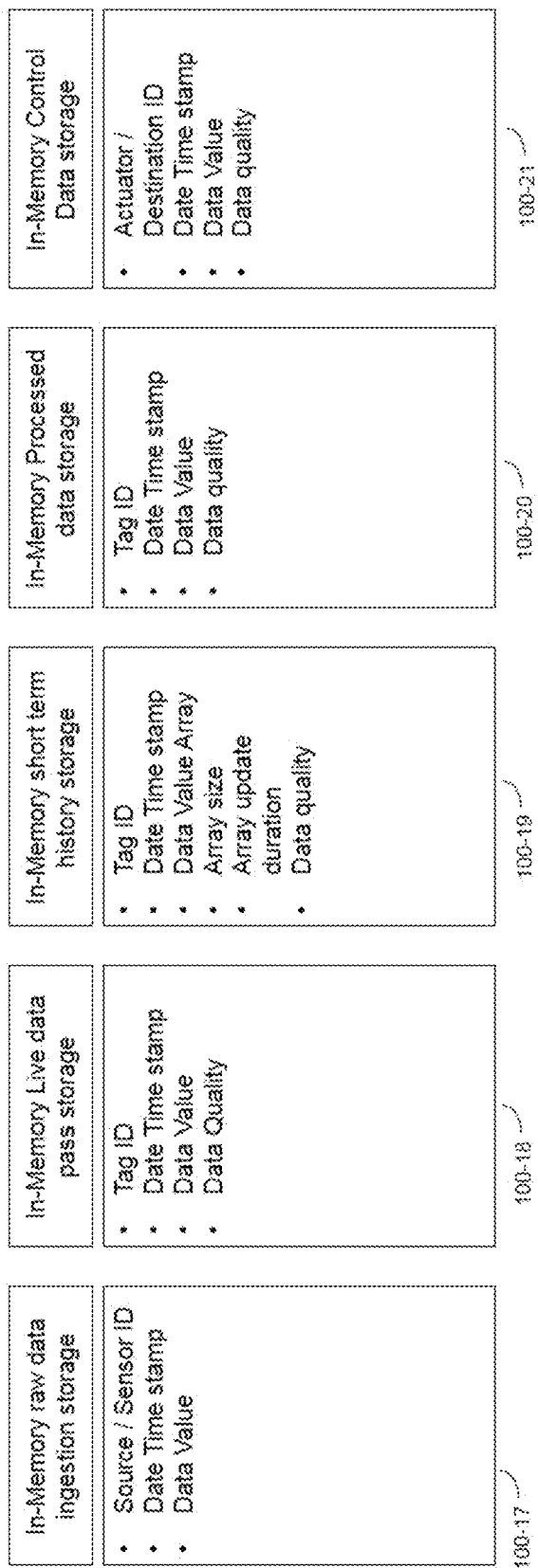
FIG. 1C illustrates RETINA local intelligence node data attributes at various stages of in-memory storage

FIG. 1C provides details of the data attributes of various In-memory data hold areas of the RETINA remote intelligence nodes:
  a. In-Memory raw data ingestion storage (100-17)
  b. In-Memory Live data pass storage (100-18)
  c. In-Memory short term history storage (100-19)
  d. In-Memory Processed data storage (100-20)
  e. In-Memory Control Data storage (100-21)

Figure 1D:
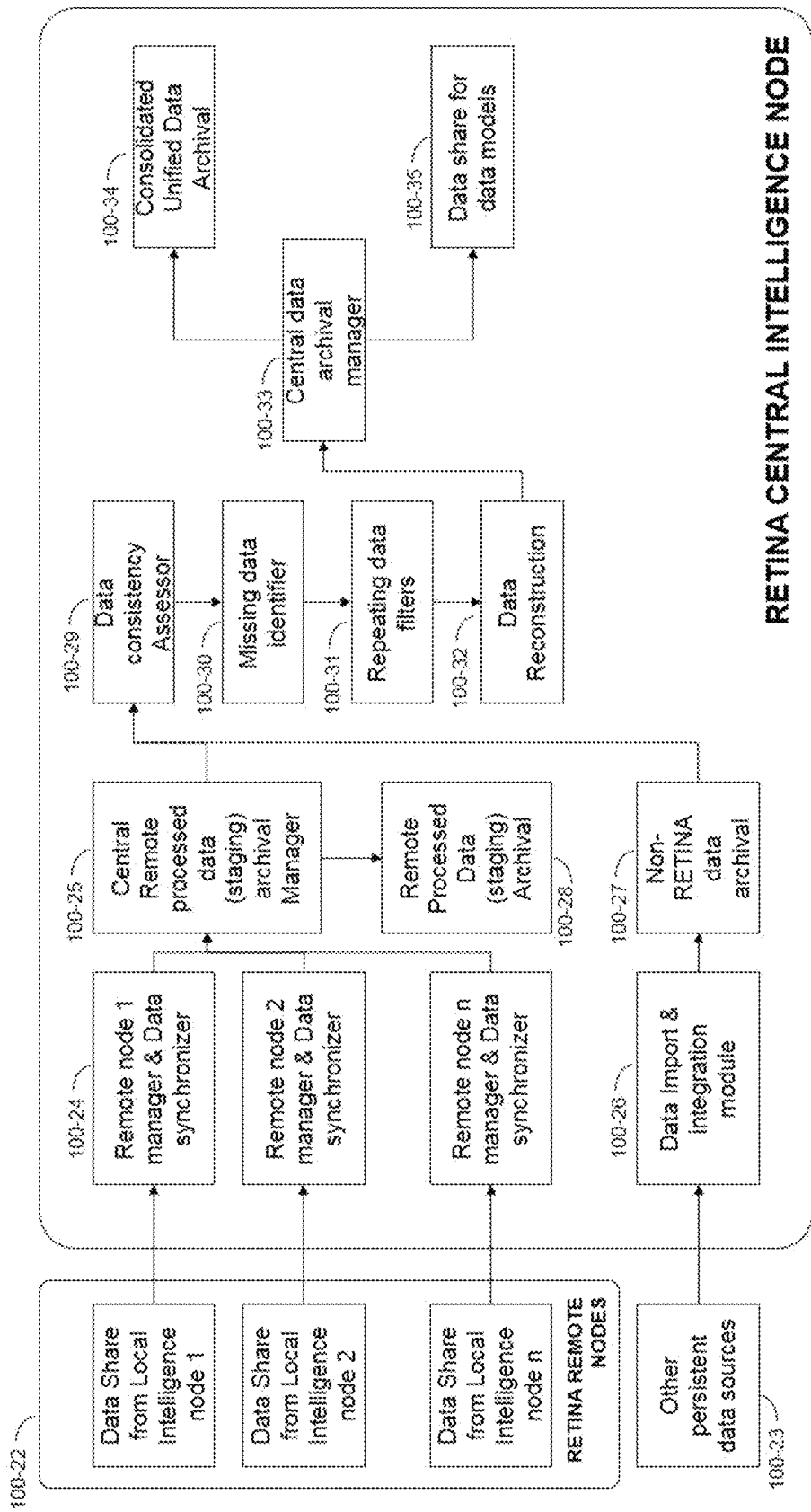
FIG. 1D illustrates Automated Data Integration in RETINA Cloud Processing node

FIG. 1D talks about the data handling & staging mechanism at RETINA Central Intelligence node. Data from RETINA remote nodes (100-22) comes in to the data handling block called RETINA Remote node manager and data synchronizer (100-24). This block manages the connectivity between the remote node and central node as well as ensure that data feeds that are expected from each RETINA remote node reaches reliably and fully into the RETINA Central Intelligence block.

The data is then unified and archived through a Central Remote processed data (staging) archival Manager (100-25) into a Remote Processed data archival medium (100-28). Data from other data sources (100-23) that are not RETINA remote intelligence nodes are accessed through a Data Import and integration module (100-24), which gets archived into a Non-RETINA data archival (100-27). The data from (100-25) and (100-27) are processed by the Data Consistency Assessor (100-29) which checks for data periodicity, normalization or denormalization of data and flags them suitably for any aberration. The missing data identifier (100-30) checks for missing data either by the data sets or within datasets and flags them again. A Repeating data filter (100-31), validates, based on data distance criterion, irrespective of whether the data is time-series or otherwise, for uniqueness and flags the repeated data. Data reconstruction block (100-32) processes all the flags raised and re-creates the archived data pushing the data into Central Archival Manager (100-33). The data from here is archived both into a Consolidated Unified Data Archival block (100-34) and is also shared (100-35) and made available for data models that would be built in the decision synchronizer.

Figure 1E:
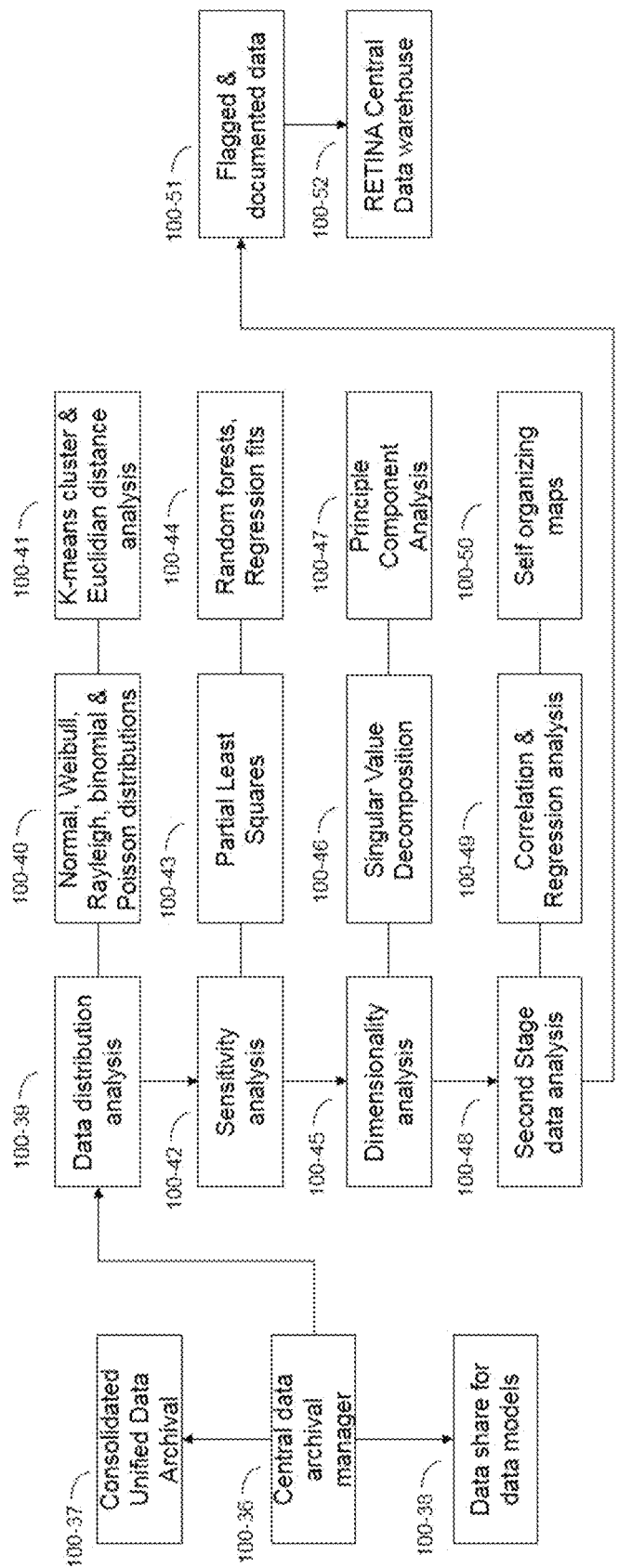
FIG. 1E illustrates Automated Data pre-processing in RETINA Cloud Processing node

FIG. 1E shows the mechanism of automated data transformation and pre-processing in RETINA Central Intelligence node. Data from Central data archival (100-36) is processed in these steps:
  a. Data sufficiency:
    i. Data distribution analysis (100-39) is performed first, where a Box-Whisker analysis is done to estimate the spread and median of each parameter is assessed.
    ii. The data is then subjected to Normal or Weibull or Poisson or Rayleigh or binomial probability distribution analysis (100-40) based on pre-configured settings as well as on the type of the parameter to determine how well within the data range the data is spread
    iii. The data grouping (100-41) is analyzed through k-means clustering technique and Euclidean distance is measured.
    iv. If the data is not well distributed across its range there will be a flag set for the data set processed.
  b. Intra—Data relationships:
    i. Sensitivity analysis (100-42) is done on the data set to assess the inter-dependency and variability of any random parameter with respect to other parameters in the data set.
    ii. A combination of Partial Least Squares (100-43) and Random Forest & Regression fit analysis (100-44) is employed to assess this.
    iii. The parameters with identified relationships are flagged.
  c. Dimensional analysis
    i. The curse of dimensionality (100-45) is handled by deploying techniques to assess and identify the extraneous or redundant data parameters from among the data that is created.
    ii. Singular Value Decomposition (100-46) and Principal Component Analysis (100-47) are used to reduce the dimensionality of data. Appropriate flags are set in this stage.
  d. Fitment analysis for models.
    i. A Second stage of data analysis (100-48) is done to cross verify the findings in steps (100-39) through (100-47) by deploying Correlation & ANOVA techniques (100-49) and Kohonen's Self Organizing Maps (100-50) and affirmation flags would be raised. Flags raised in the above steps would be processed to derive a Flagged & documented data (100-51) which provide a reduced & processed data for analysis for archival into RETINA Central Data Warehouse (100-52).

Figure 2:
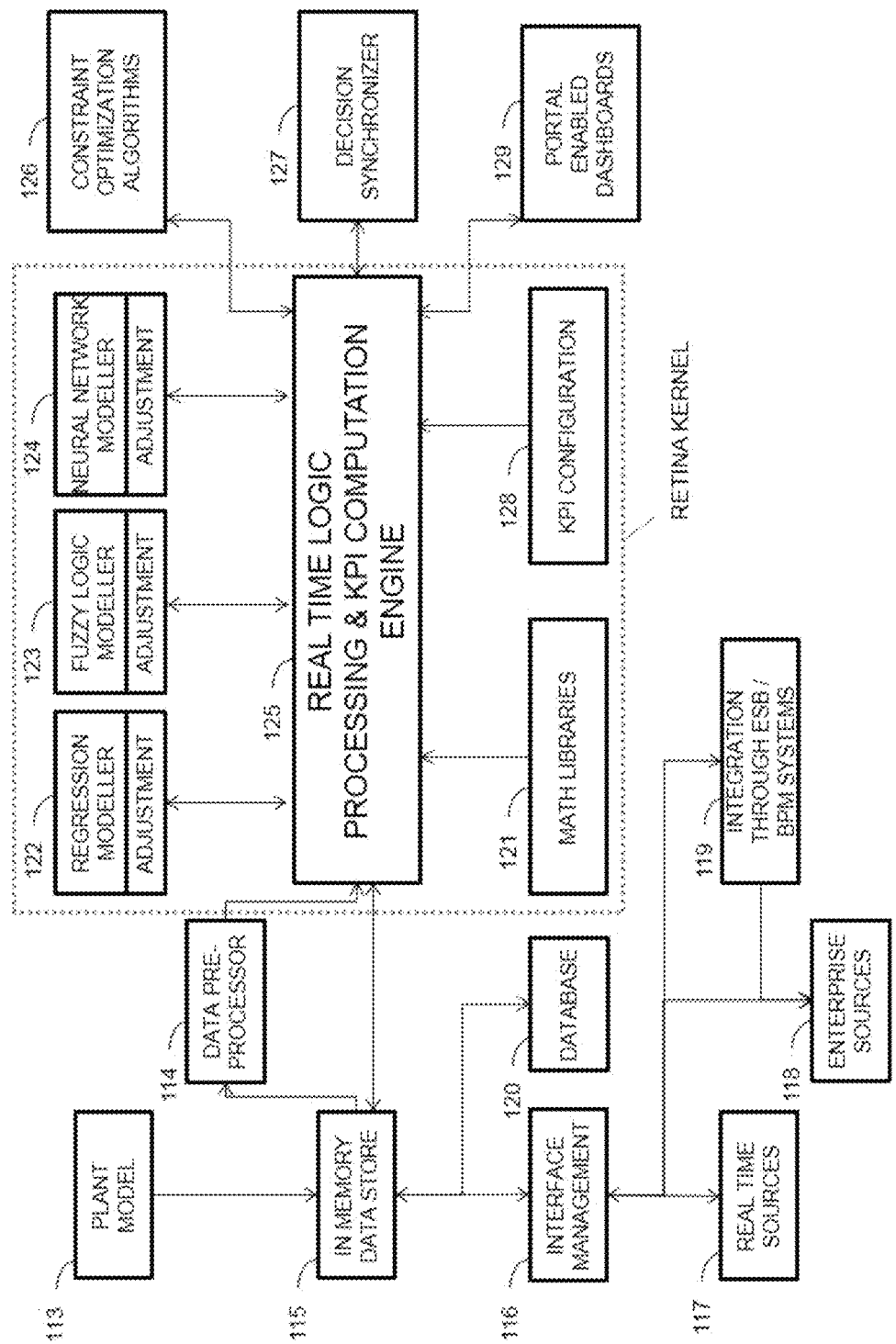
FIG. 2 illustrates the building blocks of RETINA.

FIG. 2 shows the architecture and building blocks of the invention, RETINA that is implemented. The Plant model (113) is a specific section, area or geography of the manufacturing facility where the present invention RETINA is configured. Data Memory Store (115) stores and manages the parameters and attributes from several data sources including plant/shop floor which may be from a machine, equipment or a process area, from a plant control system, from an operations execution system or from a quality control system etc. This data store memory is the mainstay to the real-time dynamic nature of RETINA, as it feeds the values continuously to the data pre-processor system (114) and then to the RETINA's Real-time Logic Processing and KPI computation engine (125). RETINA Interface Management module (116) is the data integration gateway of RETINA and can handle unlimited number of concurrent interfaces of similar or different types. RETINA Interface Management module (116) includes three types of interface management systems namely Real time source (117), Enterprise sources (118) & Integration through ESB/BPM systems (119). Real time source (117) is the assortment of real time interfaces of RETINA. Enterprise sources (118) represent the assortment of interface adaptors of RETINA that can connect with Enterprise Systems. Integration system (119) represents data connectivity between RETINA and other systems in IT landscape of an organization. RETINA can interface with enterprise systems either directly or through ESB/BPM systems. Database (120) is the internal archiving database of RETINA that keeps track of configurations, variations, limits and other key attributes and parameters of RETINA. Real Time Logic processing and KPI Computation Engine (125) is the heart of the entire RETINA system and the processing logic is built by the domain expert as IF-THEN or IF-THEN-ELSE formats using all the needed math power provided by Math Library block (121). Domain expert can use any of the following modeler to built the processing logic: Heuristic modeling of the engine or Heuristic modeling using Fuzzy Logic (123) and data modeling blocks of Statistical regression modeler (122) and neural network modeler (124). Constraint optimization algorithm (126) is used for processing linear, non-linear programming models using constraint optimization methodologies. The KPI configuration module (128) is used to dynamically configure the Key Performance Indicators (KPIs) that is to be computed by the Real Time Logic Processing and KPI Computation Engine (125). The Decision Synchronizer module (127) delivers the decisions, messages, reports, data in the form of action, triggers, events, e-mail alerts, SMS etc. The Portal Enabled Dashboards (129) displays a bird's eye view of the operations pertaining to a specific area which is configured by the domain expert as a role-wise dashboard portal.

Figure 3:
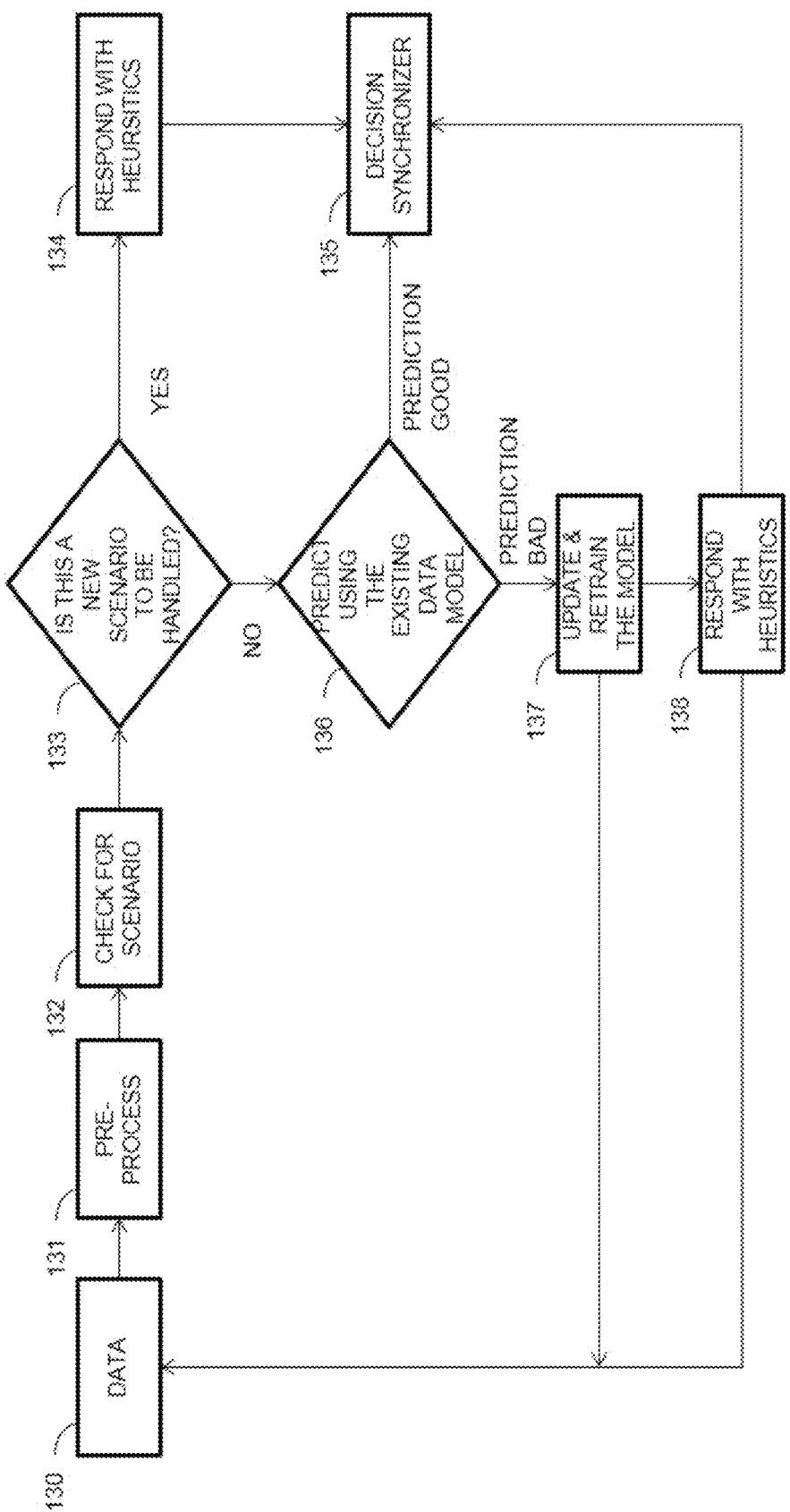
FIG. 3 illustrates the data flow for processing, model build, execution and decision synchronization in RETINA.

FIG. 3 represents the flow chart showing the decision synchronization flow in RETINA. RETINA makes a decision using the following sequential steps. First the data (130) flows into RETINA from data memory store (115), (130) and then into data pre-processor (114), (131) to get an actionable data. Scenario Check logic (132) is the logic that is built in the RETINA system as executed by Real Time Logic Processing and KPI Computation Engine (125). New scenario (133) block determines whether the scenario identified is a new scenario or already configured one based on the set of statements installed in the scenario logic box. In case of new scenario the system is executed by Heuristics (134) and in case if the scenario is already modeled, then the system is predicted using the existing data model (136). If the prediction is good as per the expected set of results, then the decisions are forwarded to the decision synchronizer (134) for decision delivery. If the prediction is bad as per the expected set of results, then the model needs to be updated and re-adjusted for usage (137). The model can be data based models such as Statistical regression (122) or neural network modeler (124). In the event of model requiring update, heuristics (138) is invoked for responding to the current scenario faced. This is done by configuring in the system the standard set of responses to the scenario that is to be handled by heuristics. Output of model that is tuned needs validation from the scenarios that arise so that the prediction can be depended upon for decision making.

In the preferred embodiment the modeling tool can be configured to have thresholds on limits of model accuracy. These thresholds determine if the model needs to be tuned or corrected or output to be used for decision making and management. These threshold values can also be dynamically computed using heuristic models to make the system adaptive.

Figure 4:
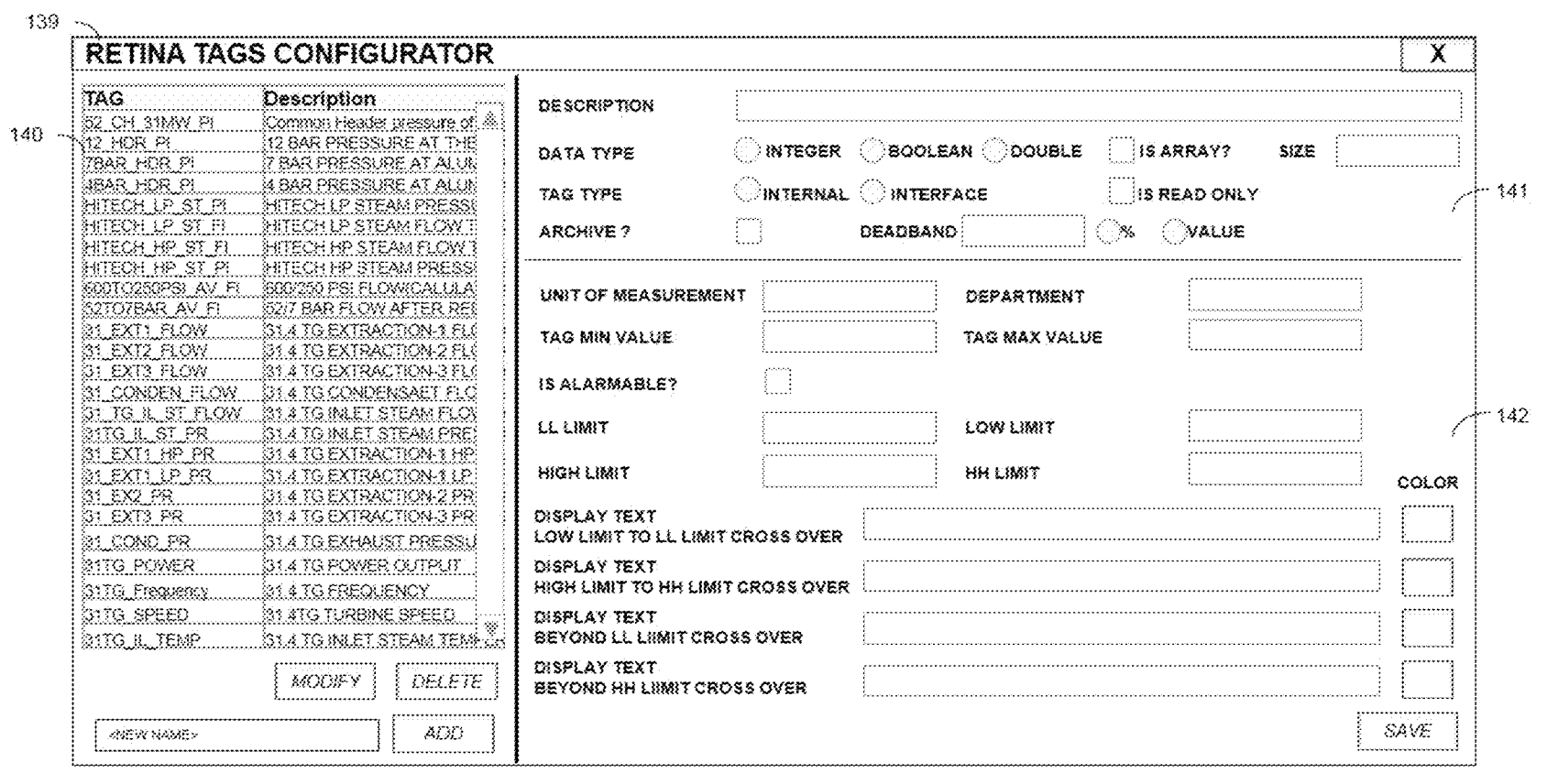

In the preferred embodiment the data memory store (115) stores and manages parameters in the form of string, byte, bit, integer, long, double, float, including but not limited to the values, alarm limits, messages associated with limits etc. The corresponding configurator is illustrated in FIG. 4. The list of parameters are tabulated in (140) while the options and provisions for parameter configuration along with alarms with messages as in (141) and (142).

RETINA Parameters or tags configuration module comprises of methods that
  i. Allow add, modify, delete of tags
  ii. Hold references of usage of tags along with various important tag attributes.
    Provision to create tag data bases so as to support upto 75,000 I/O tags and 75,000 internal tags. Each tag has the following basic attributes:
    Unique tag ID
    Name of the tag
    Tag Description
    Tag Data type: Integer, Float (Double), Boolean
    Tag Nature: Analog or Digital
    Read only or read-write or write only.
    Internal or real time tag
    Tag address if real time tag. Provision to configure the interfaces would be made available from here.
    Definition of departments or sections to which this tag can be classified to.
    Provision to configure alarm for the tag by specifying:
    The Low-Low Limit, Low limit, High Limit, High-High Limit of the tag that will be used to raise alarm if the tag is analog and Boolean TRUE or FALSE cases for digital tags.
    Auto reset option for analog and digital tags
    Color code for parameter display for analog and digital tags based on the ranges they take.
    Tag alarming priority level—High, Medium or Low.
    Guidance or expert messages that are to be popped up corresponding to the alarm states.
    Minimum most and maximum most values that are to be stored in the tag. This is needed to ascertain and prevent any illegal or junk value entering the system.

General Display messages for tags:
Message for values between Low-Low Limit and Low limit, Low limit and high limit, high limit and high-high limit, below low-low limit and above high-high limits for analog parameters
Messages for True and False states for digital tags.
Tag quality attribute to determine the data updation correctness if tag is real time type.
Last value updation time for the tag.
Units of Measurement.
Option of configuring the tag for database storages along with storage dead-bands.

Figure 6:
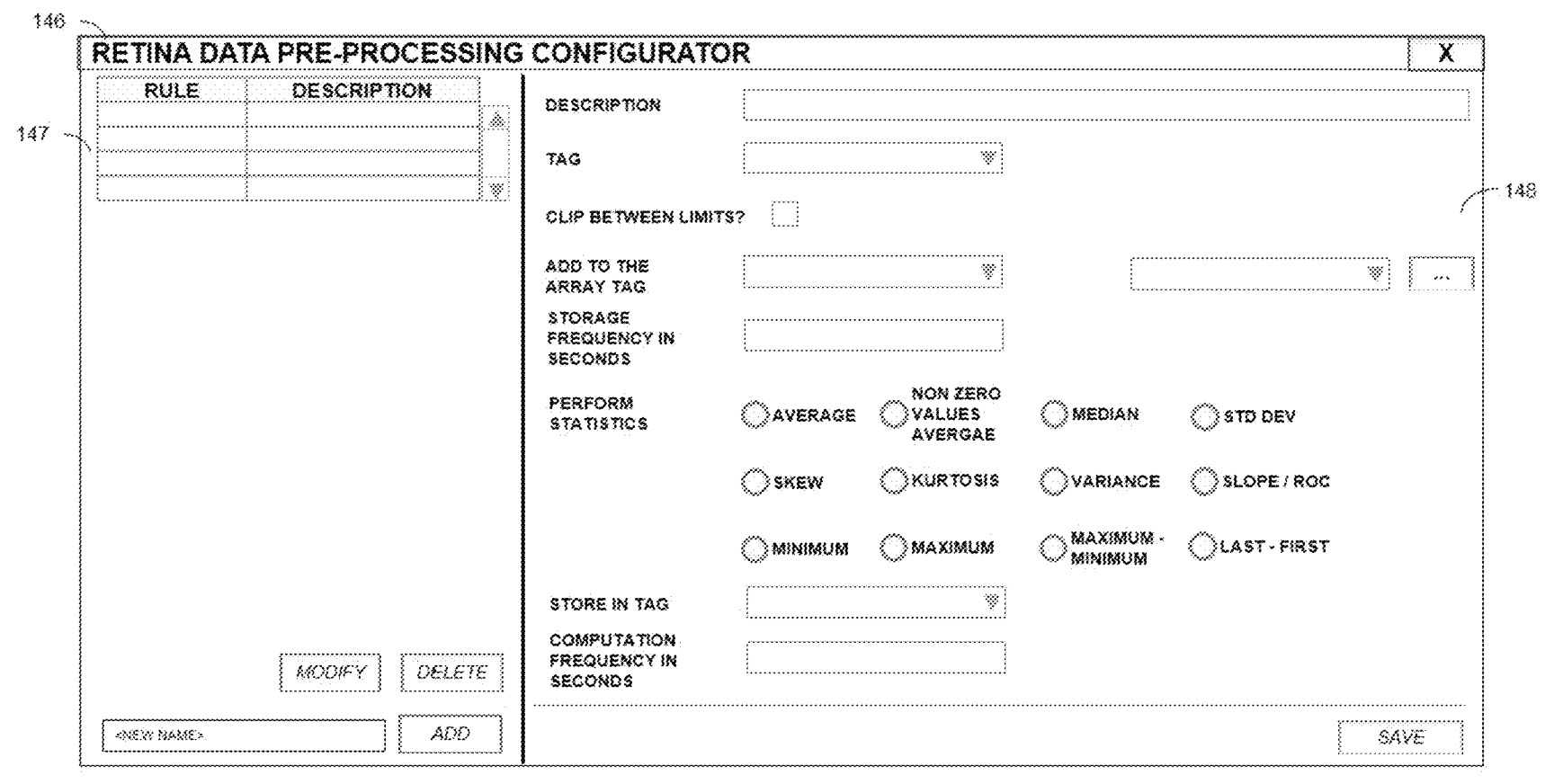

In the preferred embodiment the data pre-processing module (114) has corresponding configuration as illustrated in FIG. 6. This module allows configuration of pre-processing rules as listed in (147) on tags uses various statistical methods such as mean, median and like-wise mentioned in (148).

Figure 5:
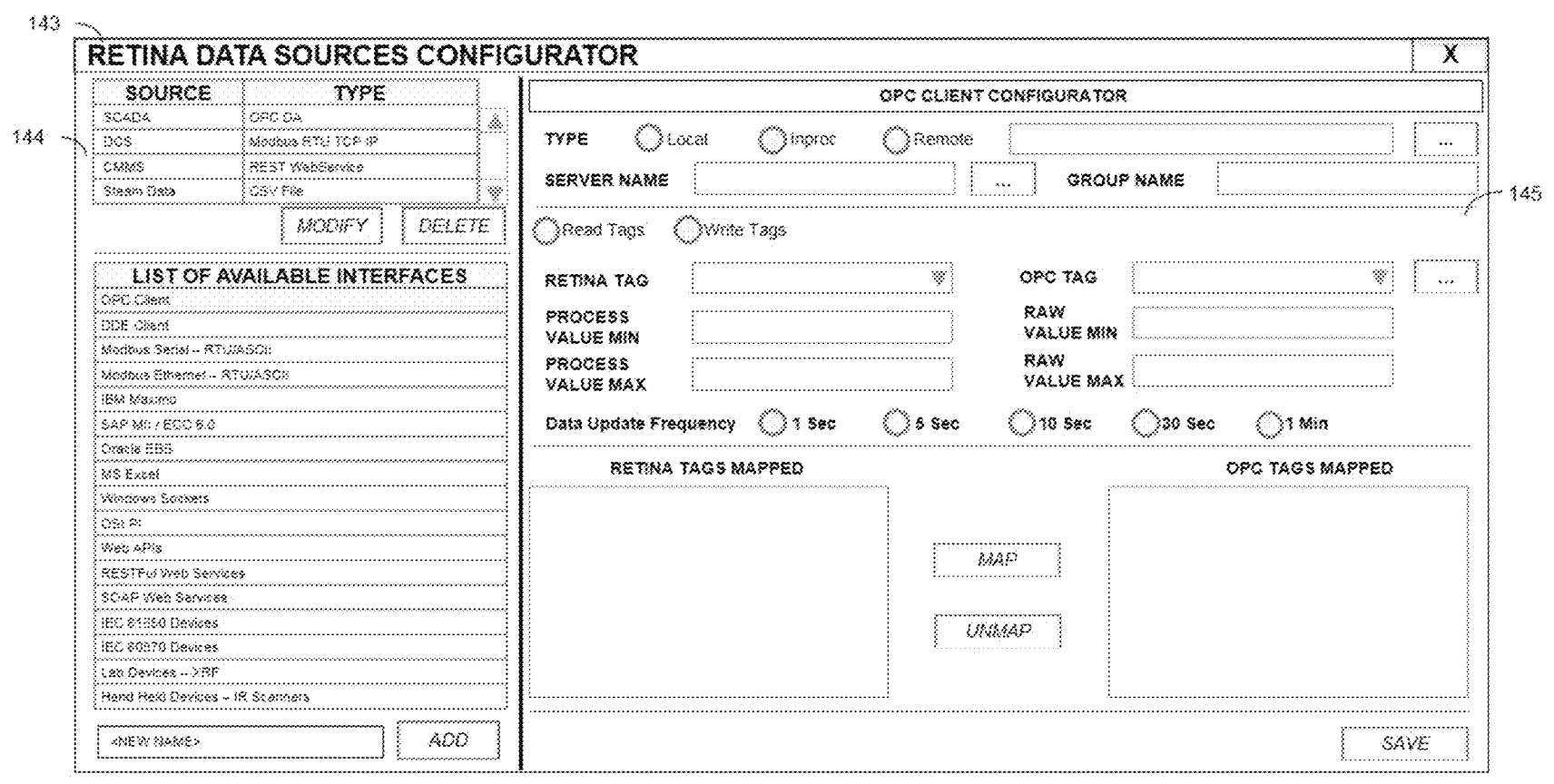

In the preferred embodiment the Interface management module (116) is illustrated in FIG. 5 enables variety of integration capabilities including sources that are Real Time, Pseudo Real time, Manual Data, MES, Interfaces to ERP, Asset Management Systems, BI Systems, MIS systems, Laboratory equipment, Hand held devices and other systems that are SOA-enabled or connectable through ESB or BPM mode. Standard connectivity adaptors using published communication protocols such as OPC, COM, CORBA, XML, B2MML, WITSML, EDI, PRODML, Web services, MODBUS, DDE, ODBC, JDBC, OLEDB etc. as well as non-standard interfaces are supported. The illustration section (145) in FIG. 5 highlights a typical OPC DA client connectivity data source configuration, while the list of interfaces configured and possible mechanisms are as in (144).

In the preferred embodiment the real time sources (117) includes PLC, DCS, SCADA, HISTORIAN data sources that have the capability to share the data in standard modes or non-standard modes as mentioned in RETINA Interface Management module (116) as illustrated in FIG. 5.

In the preferred embodiment the Enterprise sources (118) represent the assortment of interface adaptors of RETINA that can connect with Enterprise Systems such as Asset Management systems including IBM Maximo, SAP PM and Oracle PM, Enterprise Resource Planning Systems (ERP) systems such as Oracle EBS, SAP ECC 6.0 or R/3 using XML based data connectivity or Web Services or through data staging mechanisms. These are mentioned in (144) in FIG. 5.

In the preferred embodiment the Integration system (119) connects the data between RETINA and other systems in IT landscape of an organization which could be a legacy system or a billing system using SOA principles and connected through an ESB or a BPM layer. This is mentioned as Web APIs, RESTFul web services and Windows sockets modes of connectivity in (144) illustrated in FIG. 5.

Figure 7:
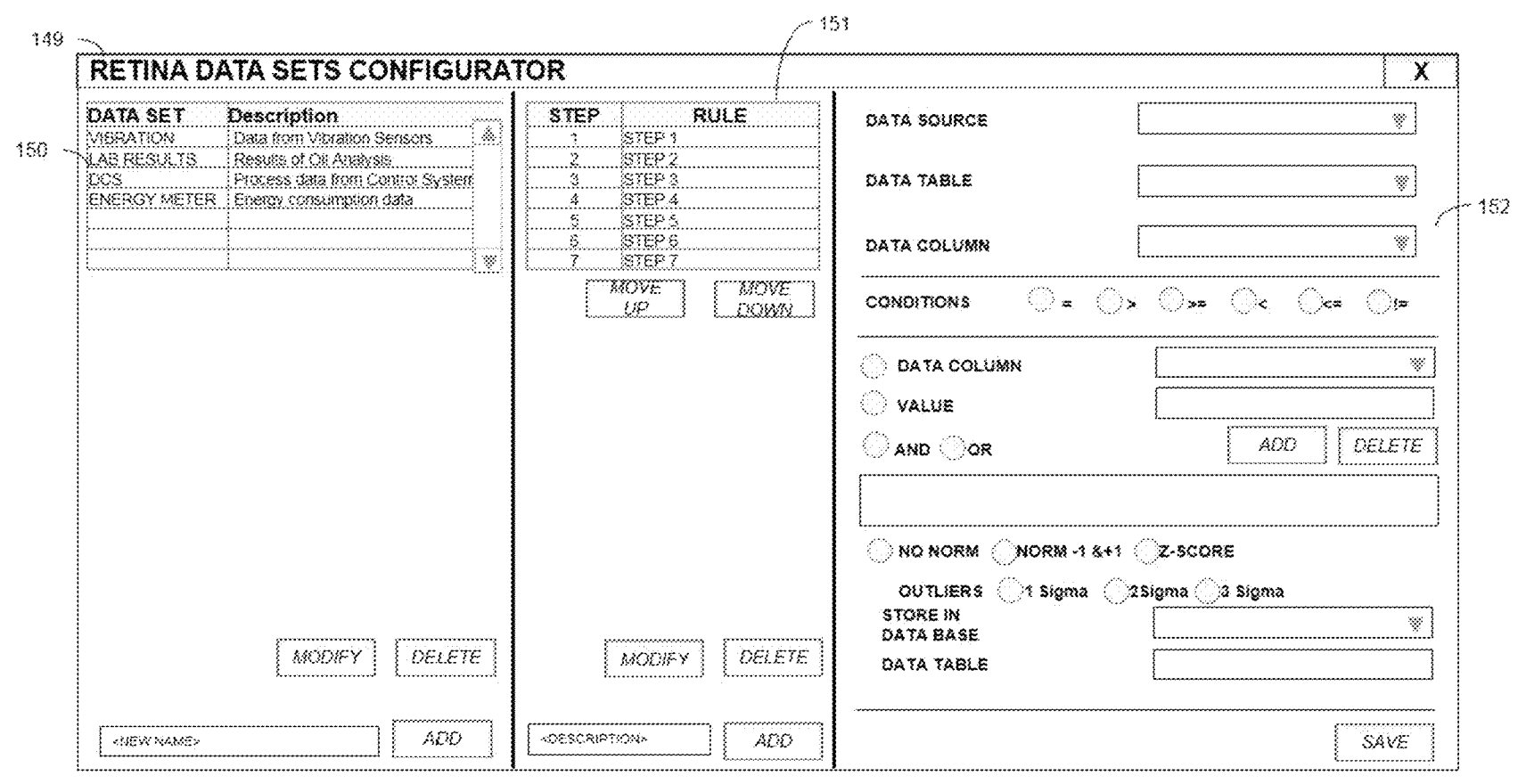

In the preferred embodiment, the data sets configurator module is as illustrated in FIG. 7. The data sets are created through a series of rules mentioned in (151) with each rule having options mentioned in (152). It is to be noted that the data sets can be put into normalized storages through other modes including Z-score normalization and statistical outlier based data cleaning and plumbing mechanism to pre-process the data. The data sets are archived into database (120) that in turn is saved into storage (108). The list of data sets are as illustrated in (150). These data sets would feed the data for each of the modeling tools mentioned in FIG. 2.

Figure 9A:
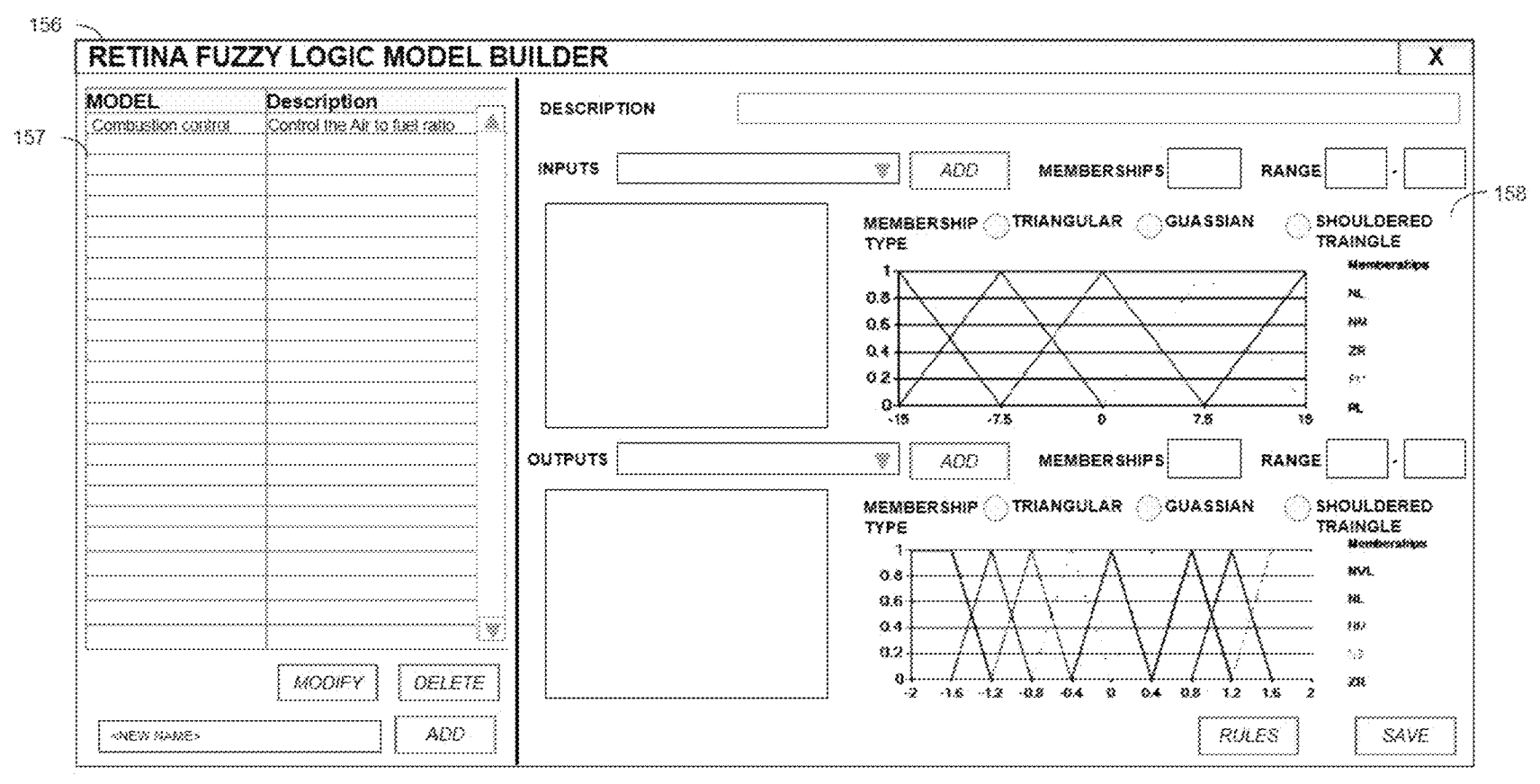
Figure 9B:
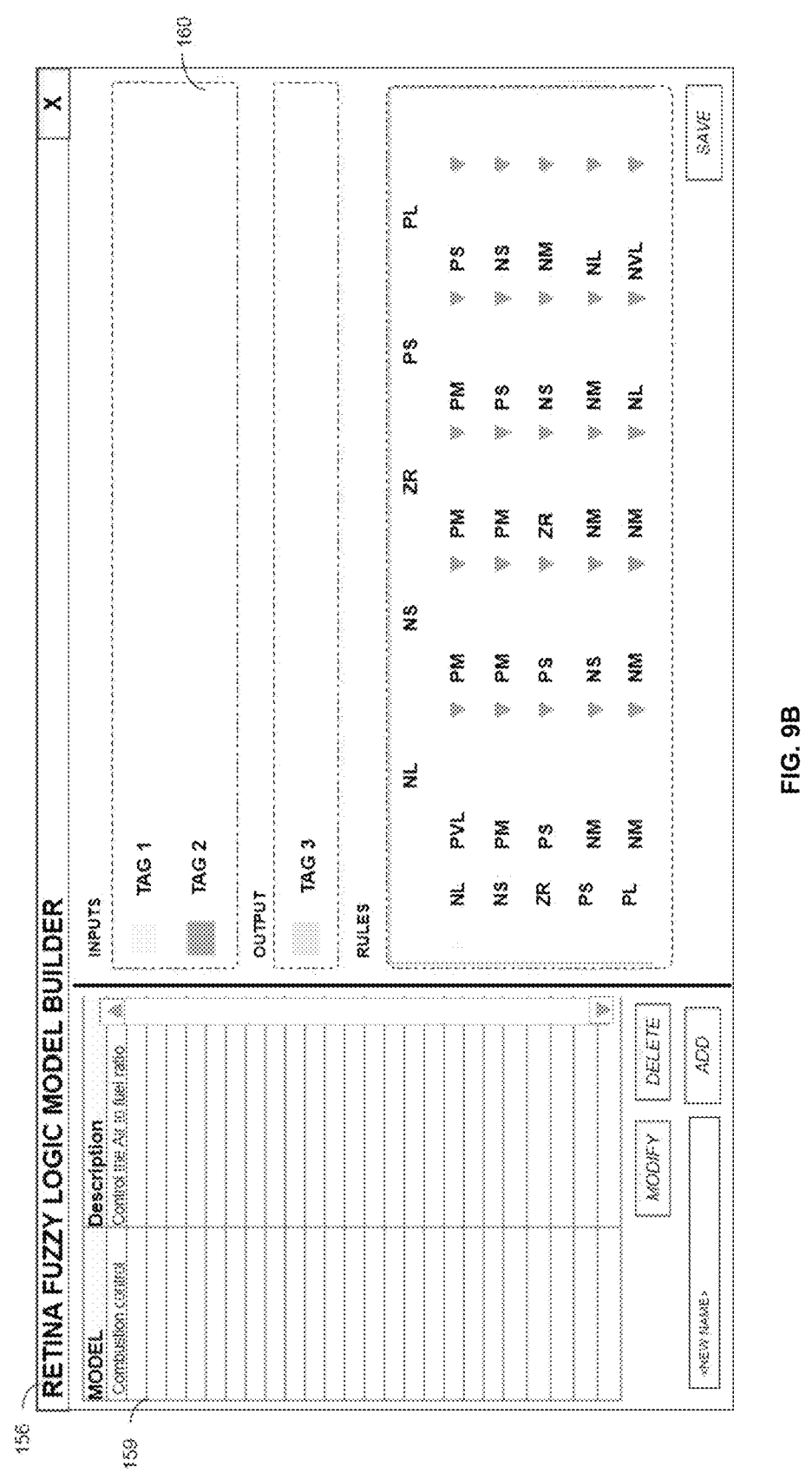

In the preferred embodiment the Fuzzy logic (123) modeler illustrated in FIGS. 9-A and 9-B, constitutes the heuristic modeling capability of RETINA. RETINA implements Mamdani type of Fuzzy Logic controllers, there can be any number of Fuzzy logic controllers that can run in parallel. The model changes are sensed when predicted results of the fuzzy logic controller deviate from expected results by a critical value. The typical adjustments that would be done to the fuzzy logic controllers would be the membership ranges as well as the parameter ranges. The ranges are altered as a function of deviations encountered. The list of fuzzy logic models configured are in (157) and (159) while the options for memberships and rules settings are in (158) and (160).

Figure 8:
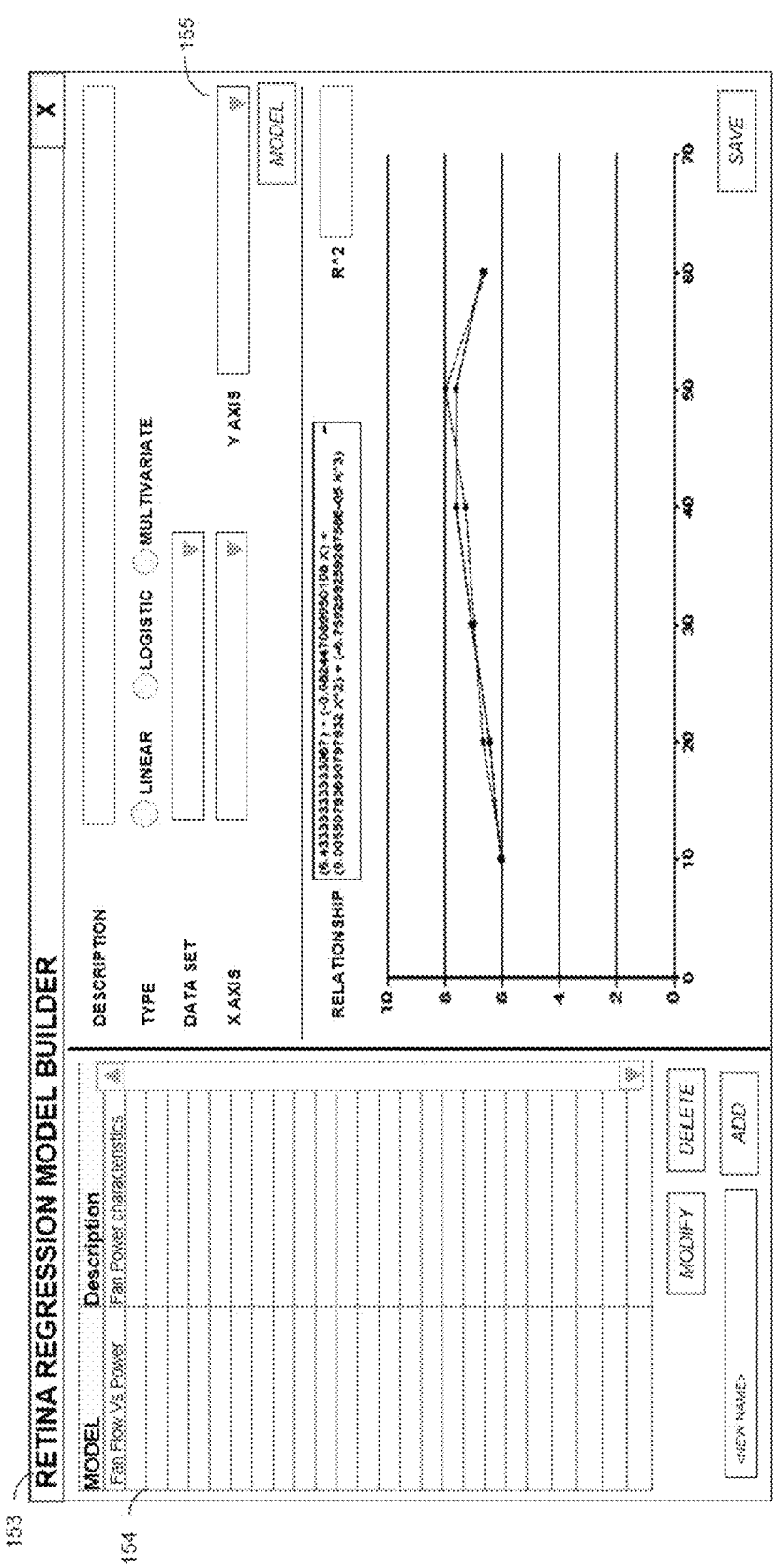
FIG. 8 illustrates the Regression model builder module of RETINA

In the preferred embodiment the Statistical regression fit modeler (122) performs one to one or many to one regression fit. The models are built on the fly and they are altered based on Mean Integrated Squared Error (MISE) criterion set while configuring the model. The configuration module is as illustrated in FIG. 8. Linear, Logistic and Multivariate regression types are available for configuration as in (155), while the list of configured regression models are as in (154). The modeler produces the equations that relate parameters and these can be used directly in the Real Time Logic Processing and KPI Computation Engine (125). Therefore, whenever the modeler alters the equations, the same altered equation gets called dynamically in the logic execution engine without a need to alter the logic.

Figure 10:
FIG. 10 illustrates the Neural network model builder module of RETINA

In the preferred embodiment the RETINA provides both supervised and unsupervised neural network models (124). For supervised networks, back propagation algorithms that work with Generalized Delta Rules and Gradient Descent methods combined with Least Mean squared algorithms are implemented. Data pre-processing and Principle Component Analysis (PCA) applicable for neural networks are in-built in RETINA. PCA helps in reducing the dimensionality of the data and providing a clear set of parameters for modeling. The corresponding configuration part is as illustrated in FIG. 10. List of models configured are in (162), while options for creating or modifying a model is as in (163).

Figure 11:
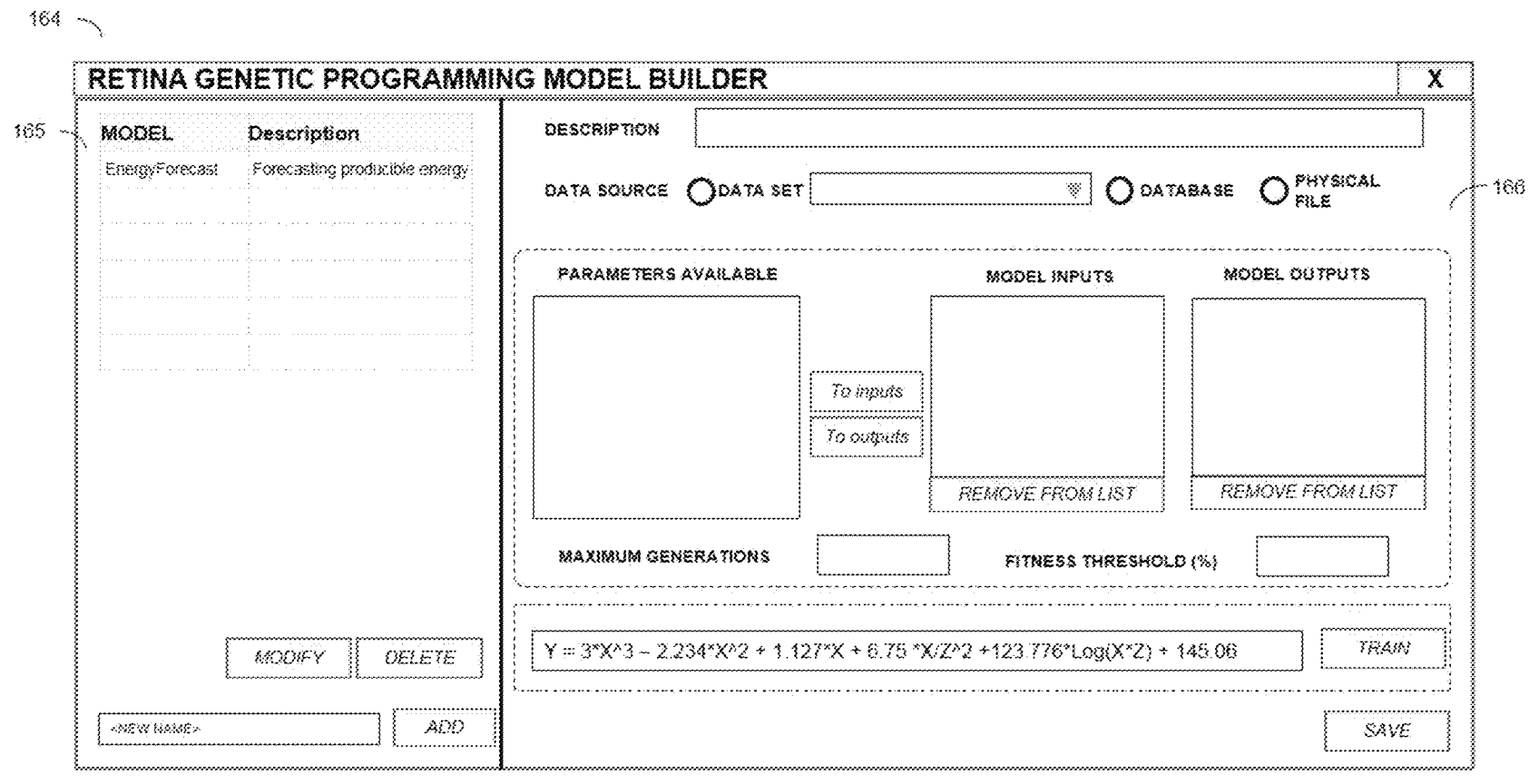

RETINA also provides for Genetic programming models that can be used in case insufficient data is available for model building using neural networks. In the preferred embodiment, RETINA's Genetic programing model configurator is as illustrated in FIG. 11. List of models are displayed as in (165), while options for configuration are provided as in (166). RETINA provides capabilities for time series models for analyzing and modeling time stamped data. In the preferred embodiment, RETINA's Time series model builder is as illustrated in FIG. 12. Model types such as Auto-Regression (AR), AR Moving Average (ARMA), AR Integrated Moving Average (ARIMA) and Vector Auto Regression (VAR) are available for configuration as in (169), while list of models configured in RETINA are shown in (168).

Figure 13A:
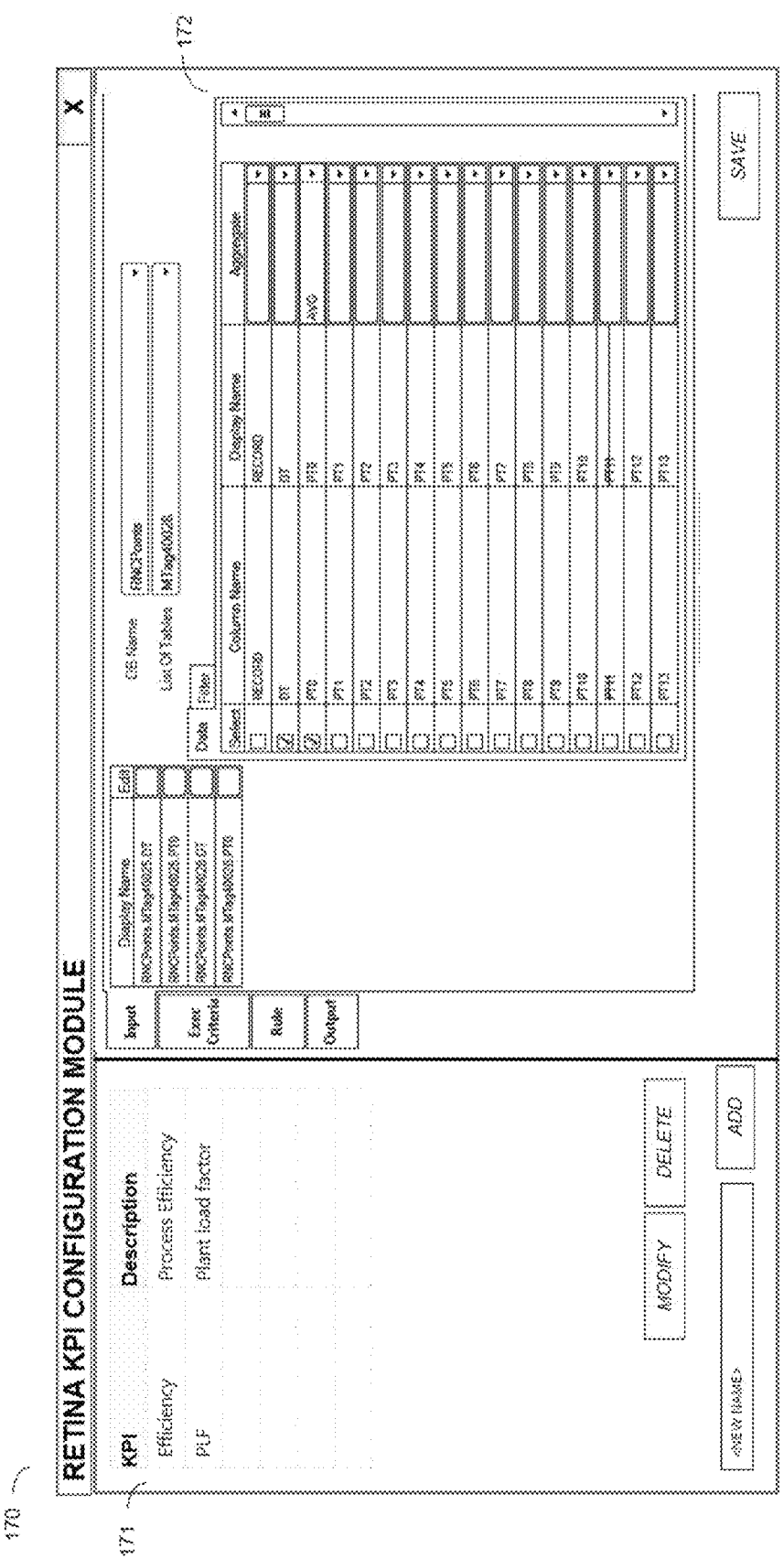
FIGS. 13-A till 13-F illustrate the KPI configuration module of RETINA
Figure 13B:
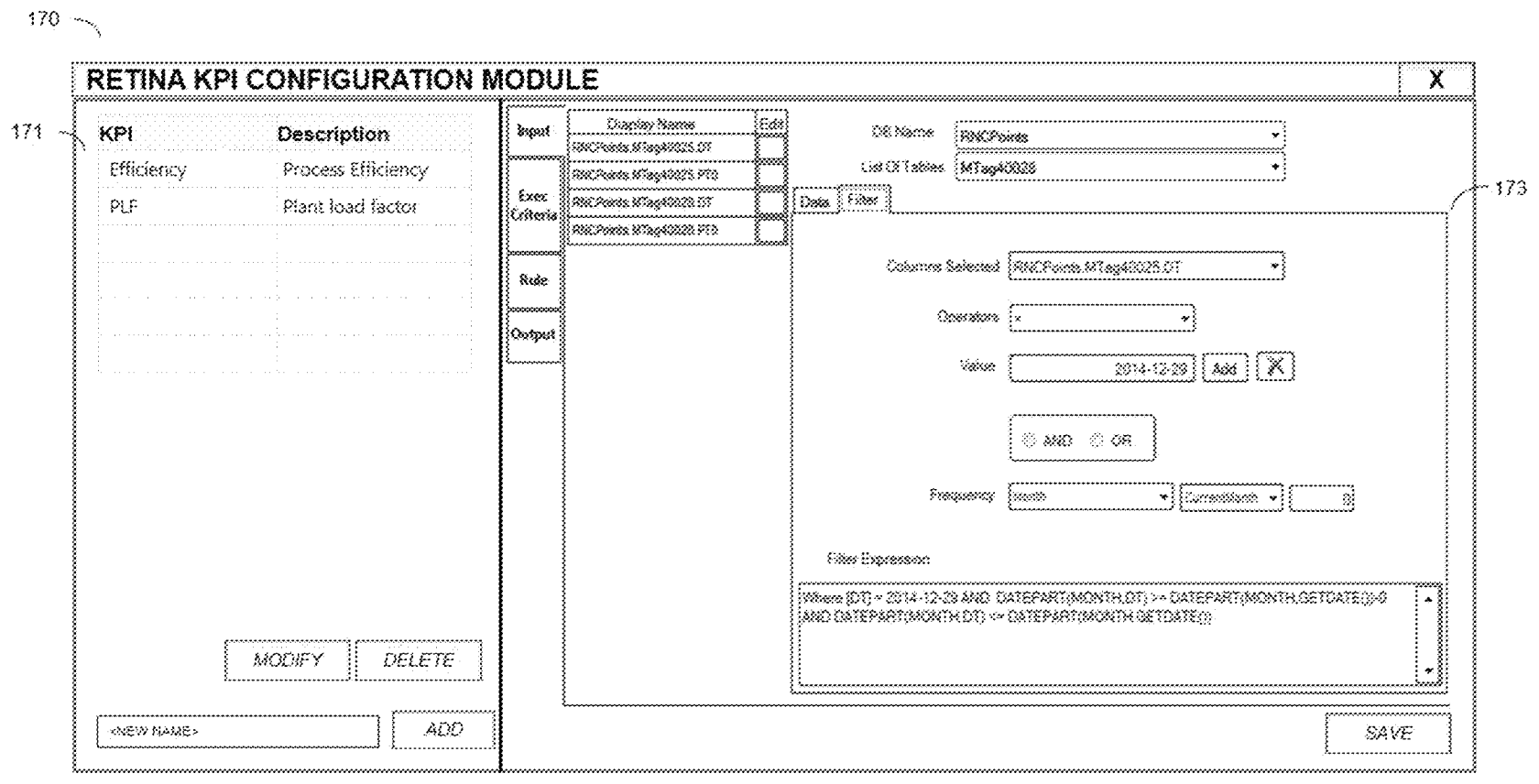
Figure 13C:
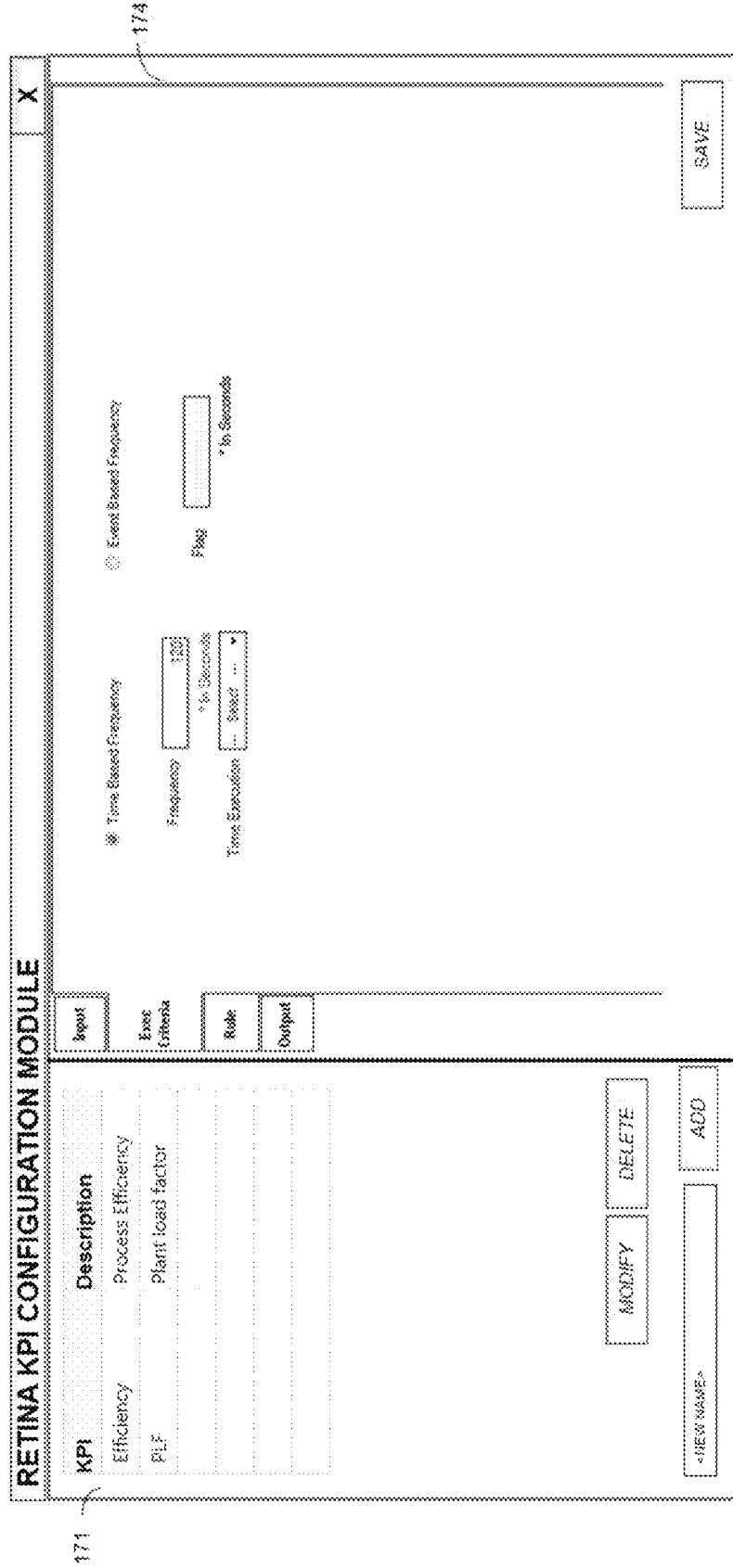
Figure 13D:
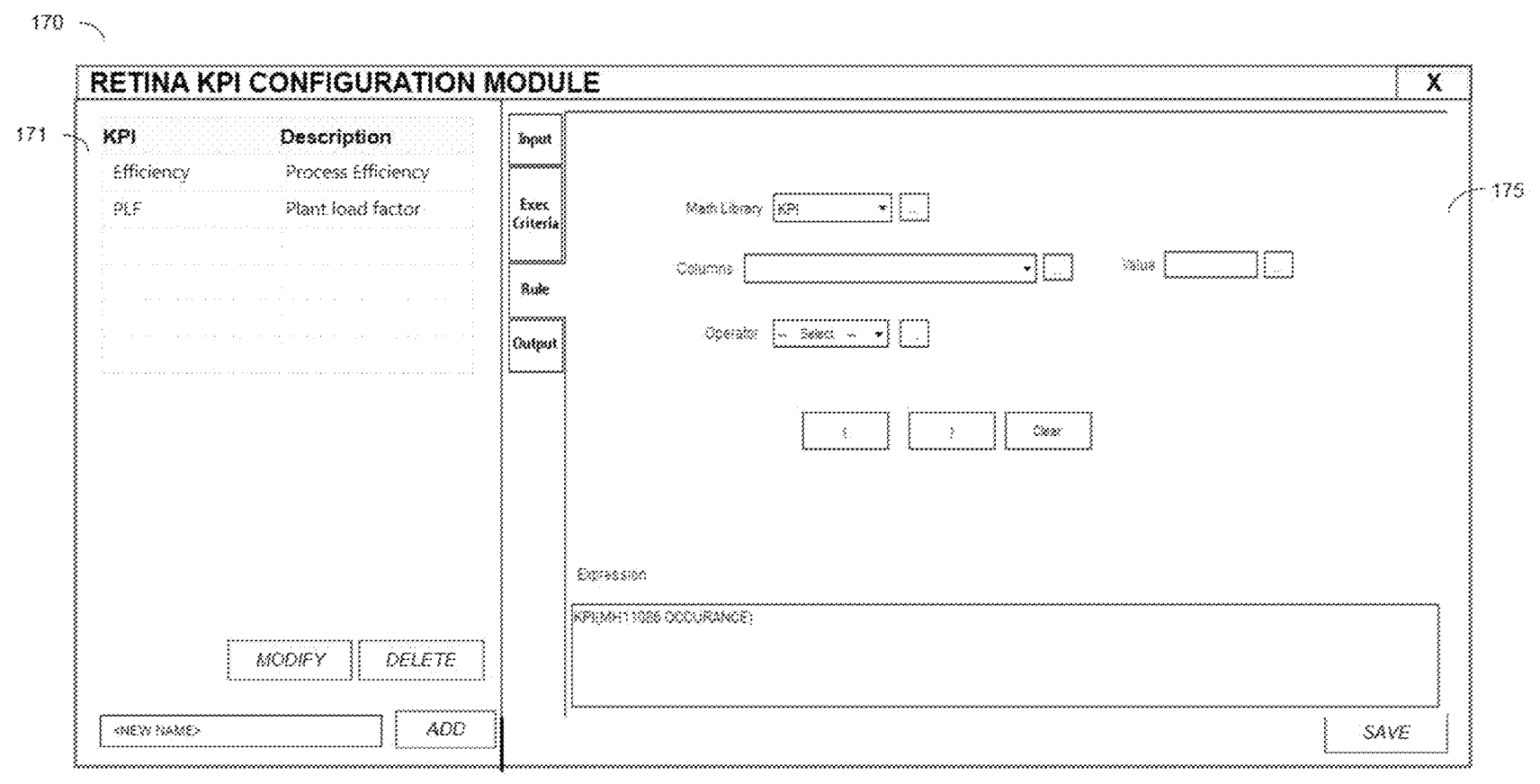
Figure 13E:
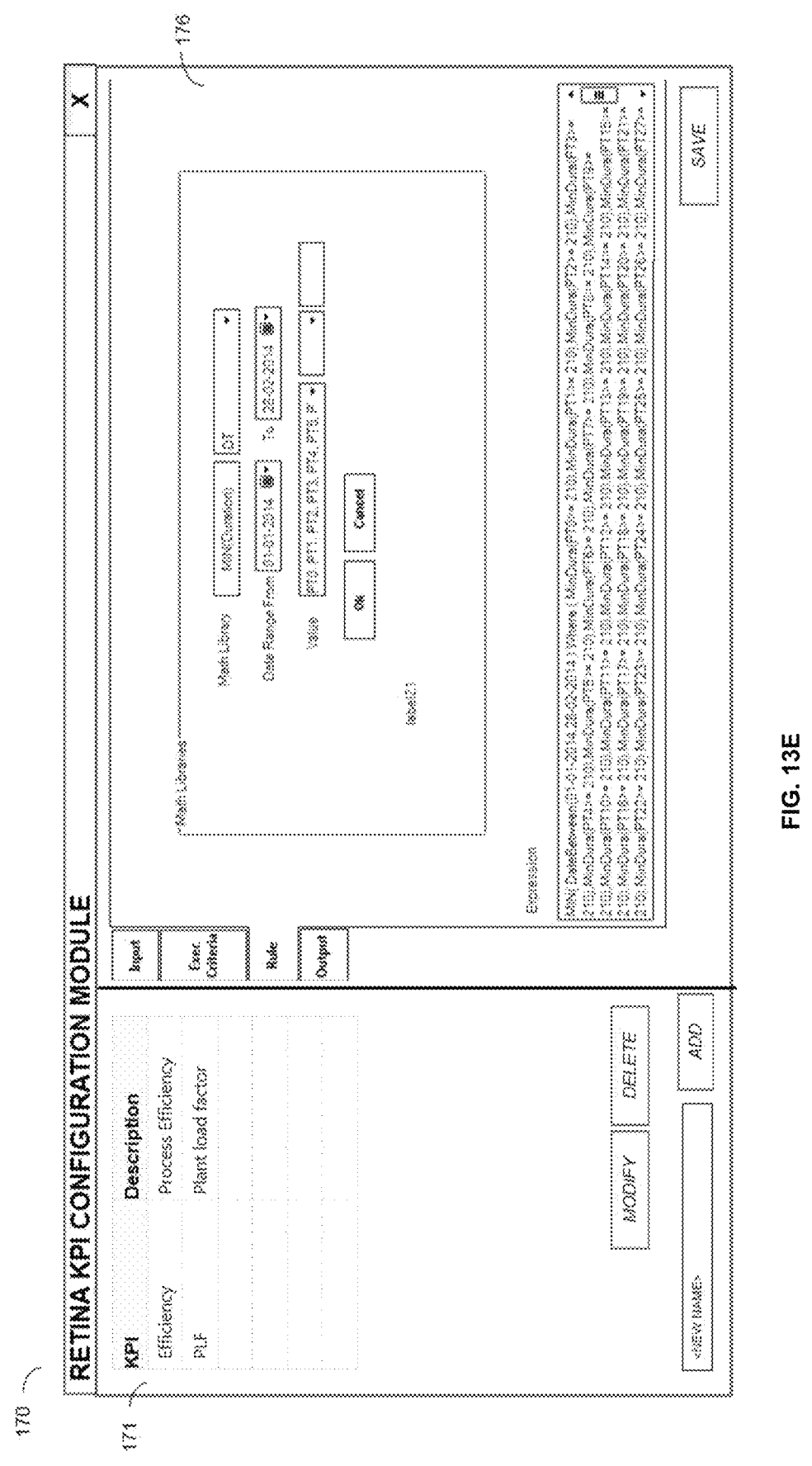
Figure 13F:
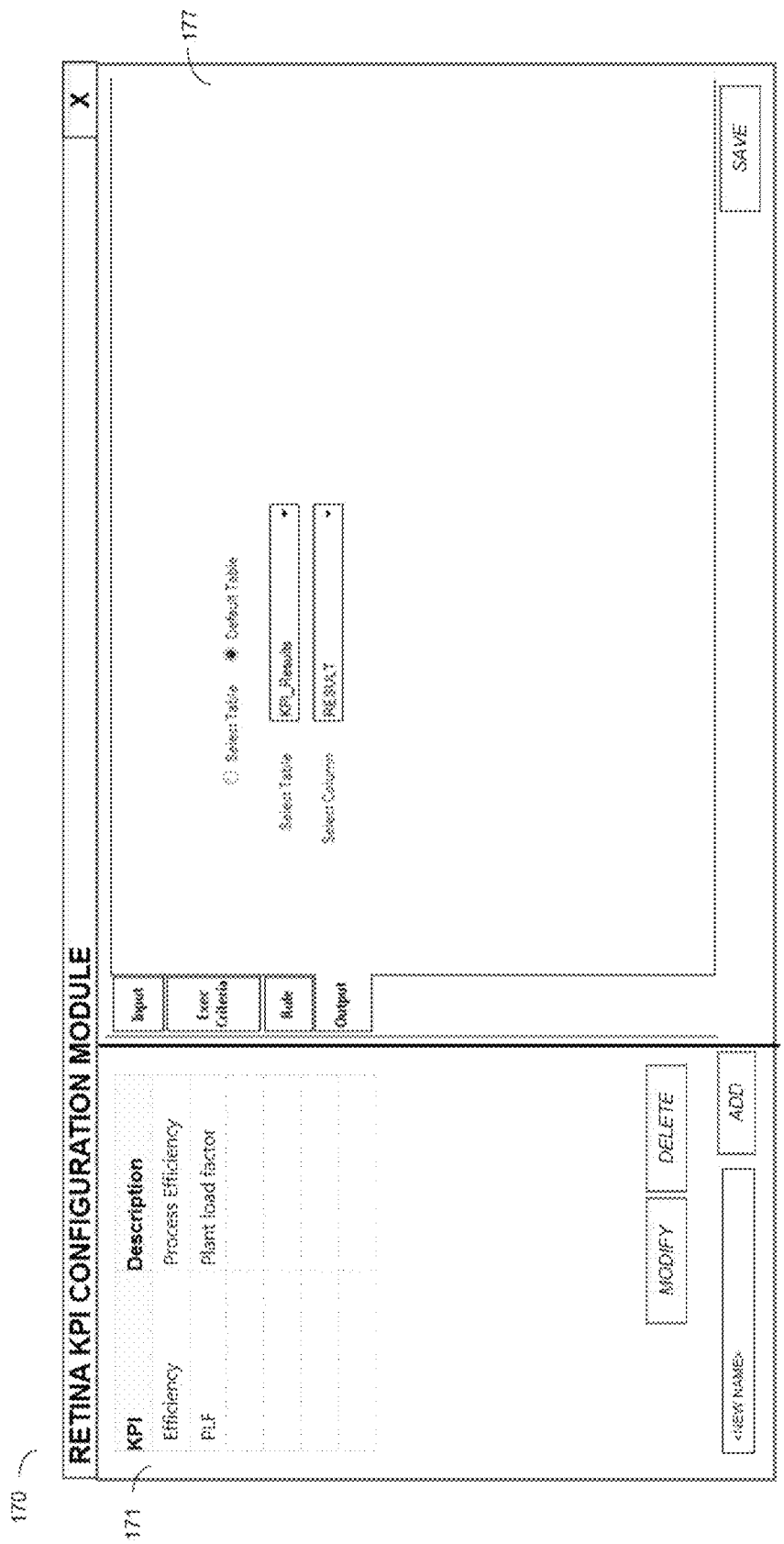

In the preferred embodiment the domain expert uses general KPIs such as MTBF, MTTR, Specific Power Consumption, Specific Energy Consumption, Yield, Emission, OEE, Productivity etc. which are available pre-built in the system for dynamic configuration. The user can define and configure KPIs as in block (128) using KPI configuration module as in FIGS. 13-A till 13-F. The list of KPIs are shown in (171), while options to define the data elements, logic and computation of KPIs are shown in (172), (173), (174), (175), (176) and (177).

In the present embodiment of the invention, RETINA has the capability to allow user configurations to define the risks, its patterns in the form of rules and identify the instances of the patterns from history and use the same for forecasting in future. RETINA's Risk pattern identification module does this functionality. The aim is to recognize the temporal (time-series) patterns here. The steps involved in the pattern recognition are Pattern Identification
Pattern Match The idea involved in this segment is to identify the patterns that has occurred in the past. It is basically offline identification of patterns. The patterns are defined in terms of rules by the user and the algorithm identifies the time period during which the pattern has occurred. Also, the pattern can be defined with multiple parameters.

The inputs are

Data set (in which the pattern instances are to be identified)
Bin Size
Window Type (Sliding/Batch)
Rules (that defines a pattern)
The attributes that can be used to define rules are: Max, Min, Mean, Max-Min, Slope, Slope ROC, Correlation, Standard Deviation, FFT, Frequency The output of the identified pattern would be the Pattern Instances which has details such as, Start Index
End Index
Pattern attributes—Max, Min, Mean, Median, Standard Deviation, Skewness, Kurtosis The computations are as outlined below
Let,
n be the Bin Size
N be the Length(Data Set)
Then,

```
Start = 0;
End = Start + n − 1;
while(End < N)
  for i = Start:End
    Compute Bin attributes - Max, Min, Mean, Max-Min, Slope, Slope
      ROC, Correlation;
    if (Bin attributes = Rule attributes)
      Create/Add Pattern Instance;
      Compute Attributes - Max,Min,Mean, Median,Std. Deviation,
        Skewness, Kurtosis;
    end if
  end for
  if (Window Type = Sliding)
    Start(k+1) = Start(k) + 1;
  end if
  if (Window Type = Batch)
    Start(k+1) = End(k) + 1;
  end if
  End(k+1) = Start(k+1) + n − 1;
end while
```

Once pattern instances are identified, the next step is to check if the live data streaming in matches with the identified patterns from the history. In this, the Euclidean distance between points in the past data and live data are calculated.

At the end we calculate the Cost for Distance. i.e., the cost to align the live data with the pattern instance. Thus when the cost for distance is 0, then the live data has a perfect fit with the pattern instance. Also, if the cost for distance decreases significantly as and when the new data streams in, it denotes an emerging pattern. This can be used for fault predictions and warning with the corrective actions.

The following are the inputs for this:
Time series values of the pattern instances
Time series values of the live data The following are the outputs for the computation
Degree of similarity(DOS)
The computations are as outline as below:
Let,
x be the Pattern Instance of length m
y be the Live Data Stream with recent m points
Then,

```
for i = 0 to m−1
  for j = 0 to m−1
    Distance[i,j] = | x[i] − y[j] |;
  end for
end for
Cost[0,0] = Distance[0,0]
for i = 0 to m−1
  Cost[0,i] = Distance[0,i] + Cost[0,i−1];
  Cost[i,0] = Distance[i,0] + Cost[i−1,0] ;
end for
for i = 0 to m−1
  for j = 0 to m−1
    Cost[i,j] = min[Cost[i−1, j], Cost[i, j−1], Cost[i−1, j−1]) + Distance[i,j];
end for
end for
  Cost for distance = Cost[m−1,m−1];
  Normalized Distance =
  (Cost[m−1,m−1]−Min[Distance])/(Max[Distance]−Min[Distance]);
  DOS = 100 − (Normalized Distance * 100);
```

Figure 14A:
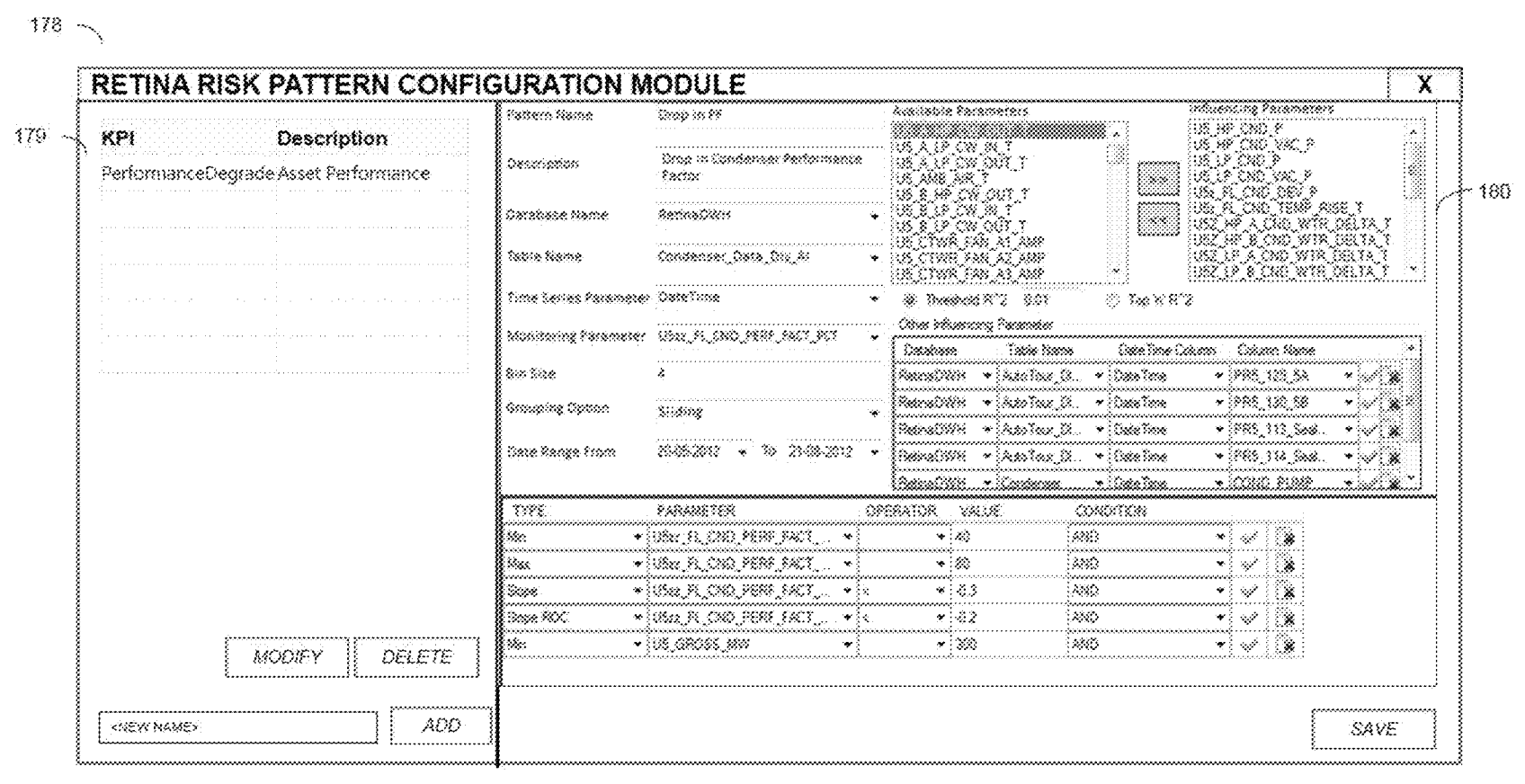
Figure 14B:
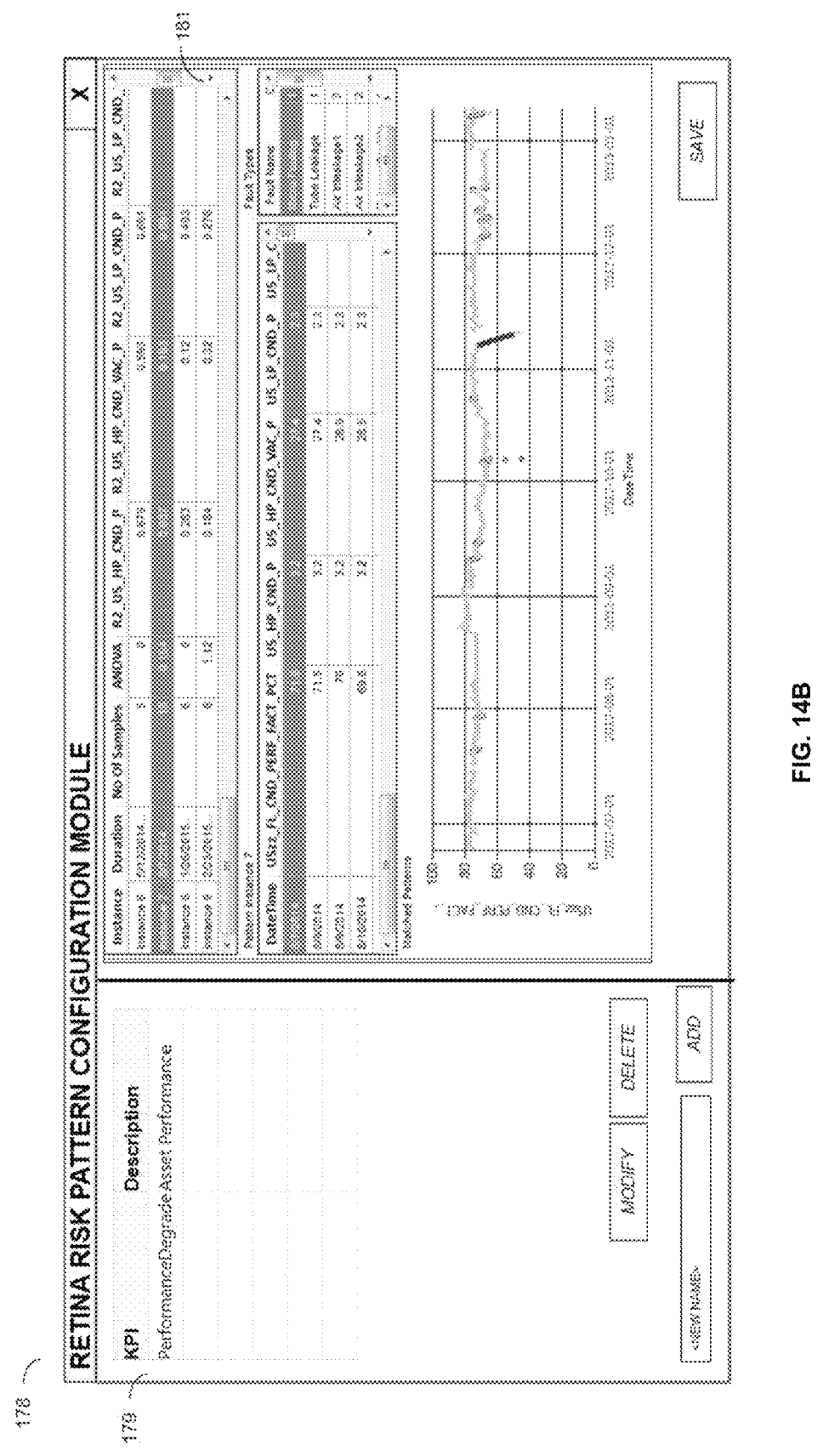

The risk pattern configuration module is as illustrated in FIGS. 14-A and 14-B and works under the hood of Decision synchronizer module (127). This illustrates the mechanism to configure the logic behind the identification of patterns in historical data that corresponds to the faults that has happened causing disruptions to the operations, followed by mechanism to encode these patterns. (179) and (183) list the configured pattern rules, while (180) shows the details and options for pattern configurations and (181) shows the identified patterns in history datasets accessible by RETINA.

In the preferred embodiment the constraint optimization methodology (126) includes quadrating programming and dynamic programming algorithms with constraint equations being made easy and with objective functions. The data flows into the constraint model (126) from the Real time logic processing and KPI computation engine (125) dynamically. Any number of concurrent constraint models can be configured and made to run in the RETINA system. The constraint optimization configuration module is as illustrated in FIG. 15. List of constraints configured are in (183) while constraint optimization configuration options including objective function expression setting, constraints expressions additions, algorithm to be used such as Evolutionary, Lagrangian, Newtonion or Linear programming are available for usage as in (184).

Figure 16A:
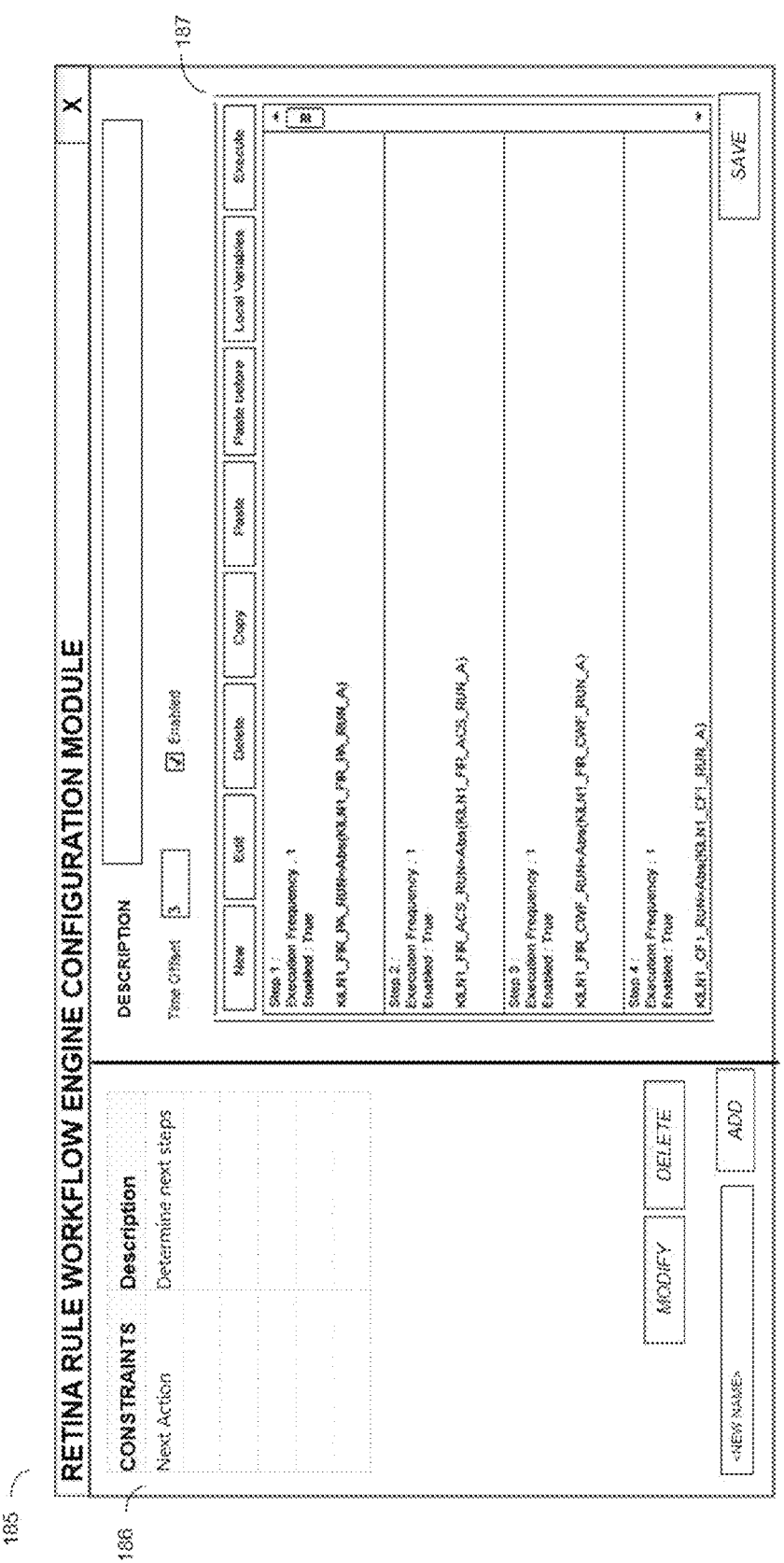
FIGS. 16-A and 16-B illustrate the Real time Rule Workflow engine configuration module of RETINA
Figure 16B:
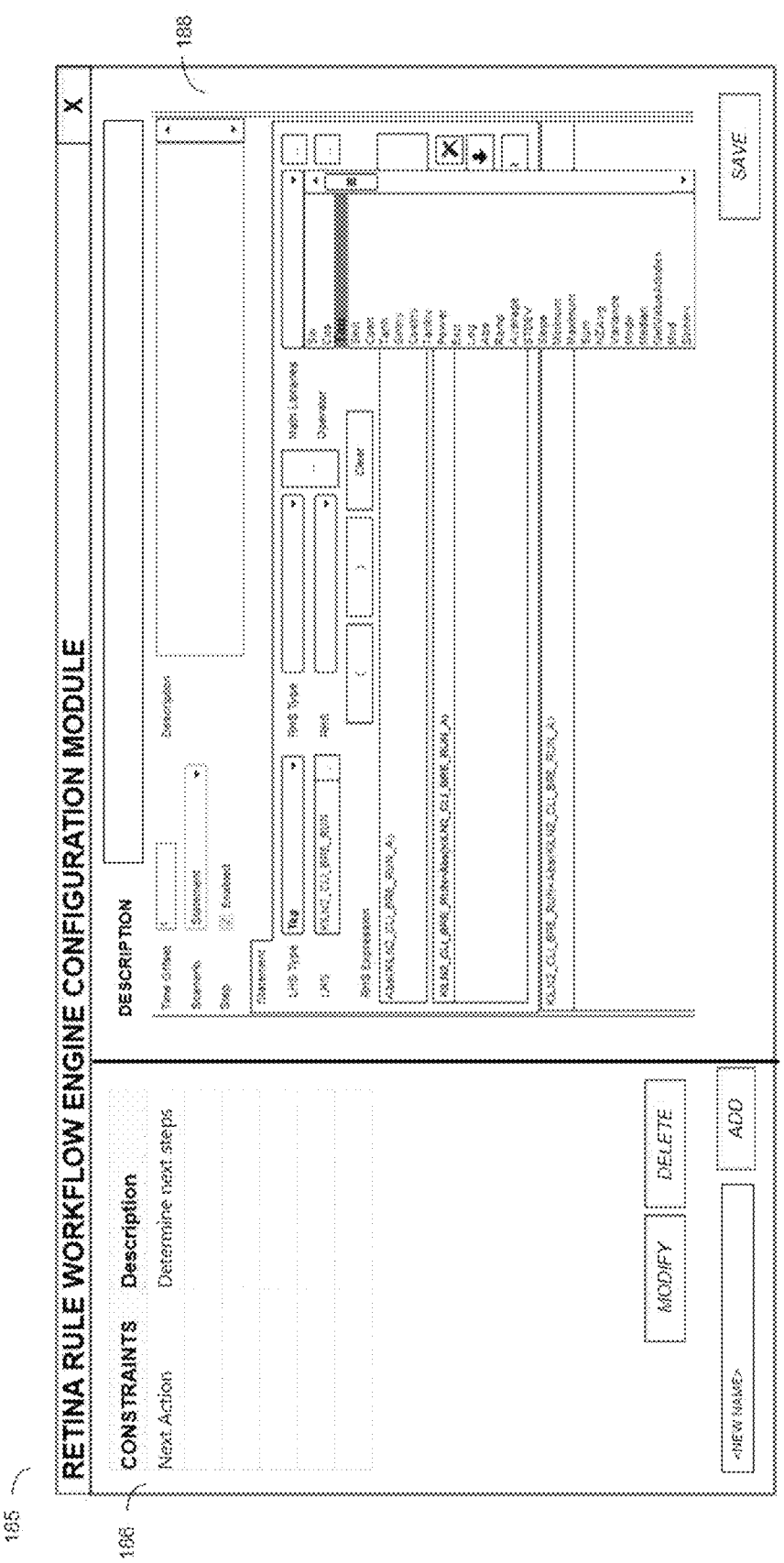

The real time rule processing engine configurator(125) is as shown in FIGS. 16-A and 16-B. The list of rules are in (186) while options for configuring are in (187) and (188). RETINA real time rule engine has provisions to do the data plumbing, smoothing, sensor validation algorithms built in for multi-sensor monitoring and parameter value reliability. The engine is capable of generating alarms when parameter values breach ranges classified in the following bands: Minimum, Low-Low Limit, Low Limit, High Limit, High-High Limit and Maximum. An event log for this also gets generated and alerts in the form of e-mails can also be generated.

RETINA real time rule engine has inbuilt capability for data plumbing, range validations, alarming and alerting. The alerts and alarms can be generated based on threshold limit breaches as well as on monitoring the parameter variation tendency or slope as well as rate of change factors. Diagnostics can be configured in the system based on these capabilities.

RETINA Real time rule engine can provide options to configure on-line root cause analysis to detect faults and identify reasons and provide remedial measures. With RETINA rule engine, the user has options to create his own knowledge base that has several in built mathematical & statistical libraries that would execute in real time to give the online real time root cause analytical ability along with advisories. The summary of the RETINA's rule engine spec sheet is as mentioned below:

1. RETINA's real-time rule processing engine allows building, editing and deletion of rules that would enable a scenario to be logically traced or acted upon.
2. These rules are written in the format of IF . . . THEN . . . ELSE or IF . . . THEN or even without conditions just with a set of computations. The entire system called as the rule database, may have several rule blocks.
3. The basic building blocks of rules are parameters or variables and the mathematical or logical operations that are carried out on them.
4. The variables are to be of the types: integer, double, boolean, integer array and double array,
5. The logical operations that are to be made available are:
   a. Less than, <
   b. Greater Than, >
   c. Less than or equal to, <=
   d. Greater than or equal to, >=
   e. Not equal to, < > or !=
   f. Equal to, =
   g. WithinRange
6. The above operations would be used in the Condition checking part or the IF part of the rule block.
7. There may be more than one set of conditions to be checked in the condition checking or the IF part of the rule block. These conditions would be cumulatively connected to each other by a logical AND or a logical OR connector. Thus, the IF part could look like this:
   IF (C1 CON1 C2 CON2 . . . Cn) where Ck represents a comparator logical operation and CONk represents logical AND/OR connector.
8. For a rule block that is written with a IF . . . THEN . . . ELSE structure, computations configured under THEN block would get triggered only if the final output of the IF block is a Boolean value of TRUE. If the value is FALSE, then the ELSE block gets activated. In case, the rule does not have an ELSE block and the final Boolean output of the IF block is FALSE, then for this rule block, there will not be any computation.
9. All mathematical computations are carried out only in the THEN or ELSE blocks.
10. The rule blocks have the capability to access variables processed in other rule blocks.
11. The rule blocks have capability to trigger other rule blocks.
12. Rule blocks can be triggered asynchronously independent of other blocks or sequentially.
13. The frequency of the trigger to each rule block can be configured and can be controlled.
14. After each execution or firing of the rules, the variables that are available for usage in other rule blocks shall retain the latest values that were stored in them as a result of processing of certain logic.
15. In the preferred embodiment the Math Library (121) tool kit includes numerous computing libraries such as simple math, trigonometric, algebraic and statistical computations which can be pulled into the logic built by the domain expert. The set of math computations that are to be available in the ELSE or THEN part of the logic are as tabulated as below are available as in (188):

| S. No | Math Function | Description | Type |
|---|---|---|---|
| 1 | Abs | Returns the absolute value of a number. | Arithmetic |
| 2 | Average | Returns the average value of an array. | Arithmetic |
| 3 | AvgDev | Returns the absolute value of deviations of all elements within an array averaged | Array |
| 4 | CallRule | Executes the rule block | Internal |
| 5 | Ceiling | Returns the upper rounded figure of a double/decimal value | Arithmetic |
| 6 | ClearLocalVariables | Clears the local variables within the scope of a rule block and resets to defaults | Internal |
| 7 | Correl | Returns the correlation co-efficient between two arrays of data | Statistics |
| 8 | CoshInv | Returns the Inverse Hyperbolic Cosine | Trigonometric |
| 9 | Cosh | Returns hyperbolic cosine of an angle | Trigonometric |
| 10 | CosInv | Returns the angle of a Cosine value | Trigonometric |
| 11 | Cos | Returns cosine of an angle | Trigonometric |
| 12 | Covariance | Returns the covariance index between two arrays of data | Statistics |
| 13 | DegToRad | Returns the radians given the degree | Conversion |
| 14 | DelayStep | Stops the step execution for given cycle | Internal |
| 15 | DisableRule | Disables the execution of a rule block | Internal |
| 16 | DisableStep | Disables a step in the current rule block for execution | Internal |
| 17 | EnableRule | Enables the execution of a rule block | Internal |
| 18 | EnableStep | Enables a step in the current rule block for execution | Internal |
| 19 | Exp | Returns the Exponential value of a number | Arithmetic |
| 20 | Floor | Returns the lower rounded figure of a double/decimal value | Arithmetic |
| 21 | Fuzzy | Executes a pre-configured fuzzy logic block | Model |
| 22 | GetValueAtIndex | Returns the value at a particular index of an array | Array |
| 23 | Log | Returns the logarithmic value of a number for a given base | Arithmetic |
| 24 | Maximum | Returns the maximum value within an array | Statistic |
| 25 | Median | Returns the Median statistic of an array | Statistic |
| 26 | Minimum | Returns the minimum value within an array | Statistic |
| 27 | Mode | Returns the Mode statistic of an array | Statistic |
| 28 | Mod | Returns the remainder after a number is divided by a divisor | Arithmetic |
| 29 | Negative | Returns the negative value of the given value | Arithmetic |
| 30 | NZAvg | Returns the average value for all the array index values that are not zero | Statistic |

| S. No | Math Function | Description | Type |
|---|---|---|---|
| 31 | Power | Returns the result of a number raised to a power | Arithmetic |
| 32 | RadToDeg | Returns the degree given the radians | Conversion |
| 33 | Ramp | Returns the value a parameter should take while ramping between current and target values | Control |
| 34 | Regression | Executes a pre-configured regression block | Model |
| 35 | SinhInv | Returns the Inverse Hyperbolic sine | Trigonometric |
| 36 | Sinh | Returns hyperbolic sine of an angle | Trigonometric |
| 37 | SinInv | Returns the angle of a Sin value | Trigonometric |
| 38 | Sin | Returns sine of an angle | Trigonometric |
| 39 | Slope | Returns the Slope of an array with respect to another array | Statistic |
| 40 | STDEV | Returns the Standard Deviation of an array | Statistic |
| 41 | Sum | Returns the Sum of all index values of an array | Statistic |
| 42 | TanhInv | Returns the Inverse Hyperbolic Tangent | Trigonometric |
| 43 | Tanh | Returns hyperbolic tangent of an angle | Trigonometric |
| 44 | TanInv | Returns the angle of a Tangent value | Trigonometric |
| 45 | Tan | Returns tangent of an angle | Trigonometric |
| 46 | Variance | Returns the variance of an array | Statistic |
| 47 | Transmit | Sets the value to a parameter configured for writing back to the controller as per the change, limits and enables the reason assignment of this transmission of the control action. | Control |
| 48 | Neural | Executes a preconfigured neural network model | Model |
| 49 | Timeseries | Executes a preconfigured ARMA, ARIMA, ARIMAX timeseries models | Model |
| 50 | GP | Executes a preconfigured Genetic programming model | Model |
| 51 | Constraint | Executes a preconfigured constraint optimization problem | Method |

The RETINA rule engine has the ability to dynamically create rules by itself. The system allows for manual creation of logic & its execution online and on-the-fly, without having to restart the core engine due to the changes. RETINA has the ability where the user can view the real time data along with the time-series statistics of the same or of the related parameters. The rule engine provides for two levels of debugging:
  a. The evaluation of the logic built with the data that is flowing into the system in a manner that it does not actually alter or affect the current operating parameter values. Data can be from any sources: real time sources, OPC, databases, CSV files, Excel files, web services etc.
  b. Provide for what-if analysis type of simulation by allowing users to force the values and check the computations thereof.

RETINA's native capability is to log events, messages, alarms and user actions into the database. These are available as reports as well. RETINA allows recording of operator actions in a chronological manner. For examples, if operator changes the value of damper set point from 61% opening to 63%, the system records the same as date-time, operator, parameter, value from and value to. The same is available as reports as well.

The user can create the UI where he can have, for example, a button to set or reset a Boolean parameter to true or false value. The rule engine can be configured to execute set of logic based on the value that the parameter takes.

RETINA has options to create 1 dimensional and 2 dimensional arrays as parameters. The mathematical libraries possess capabilities to fill the values into these arrays in the rule engine. The values are stored in memory and all math libraries that manipulate the arrays look up for these in memory parameter values to execute time based computations such as slope, rate of change etc besides statistics such as mean, standard deviation, correlation etc. The RETINA rule engine and UI can be configured to alert on the behavior of the fault model itself.

Figure 17:
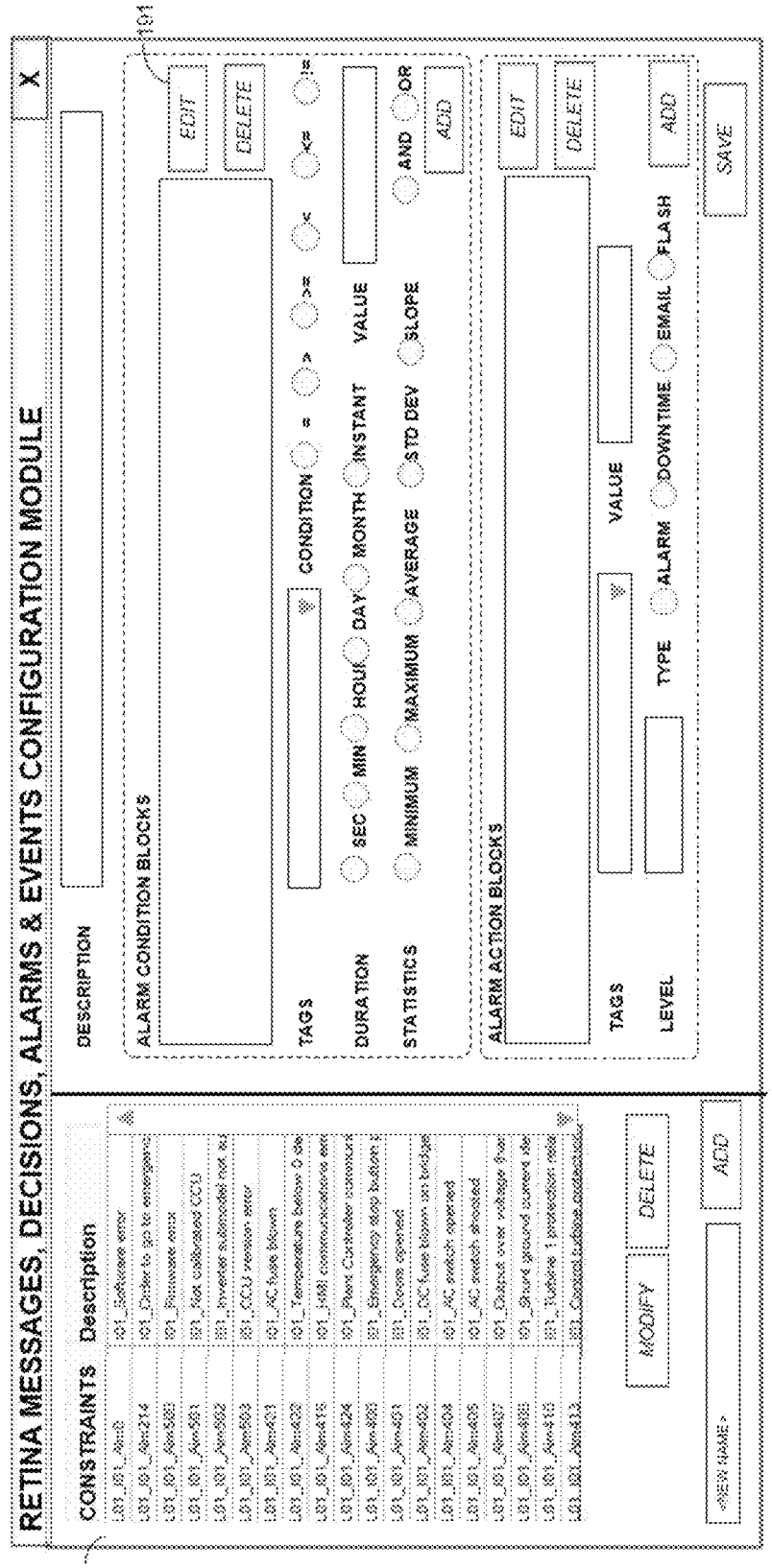
FIG. 17 illustrates the Messages, Decisions, Alarms and Events configuration module of RETINA

In the preferred embodiment, the alarms, messages, decisions and events are configured through the configurator as illustrated in FIG. 17. This works under the hood of decision synchronizer module (127). List of configured messages, alarms, decisions are shown in (190) while options to configure are in (191).

Figure 18:
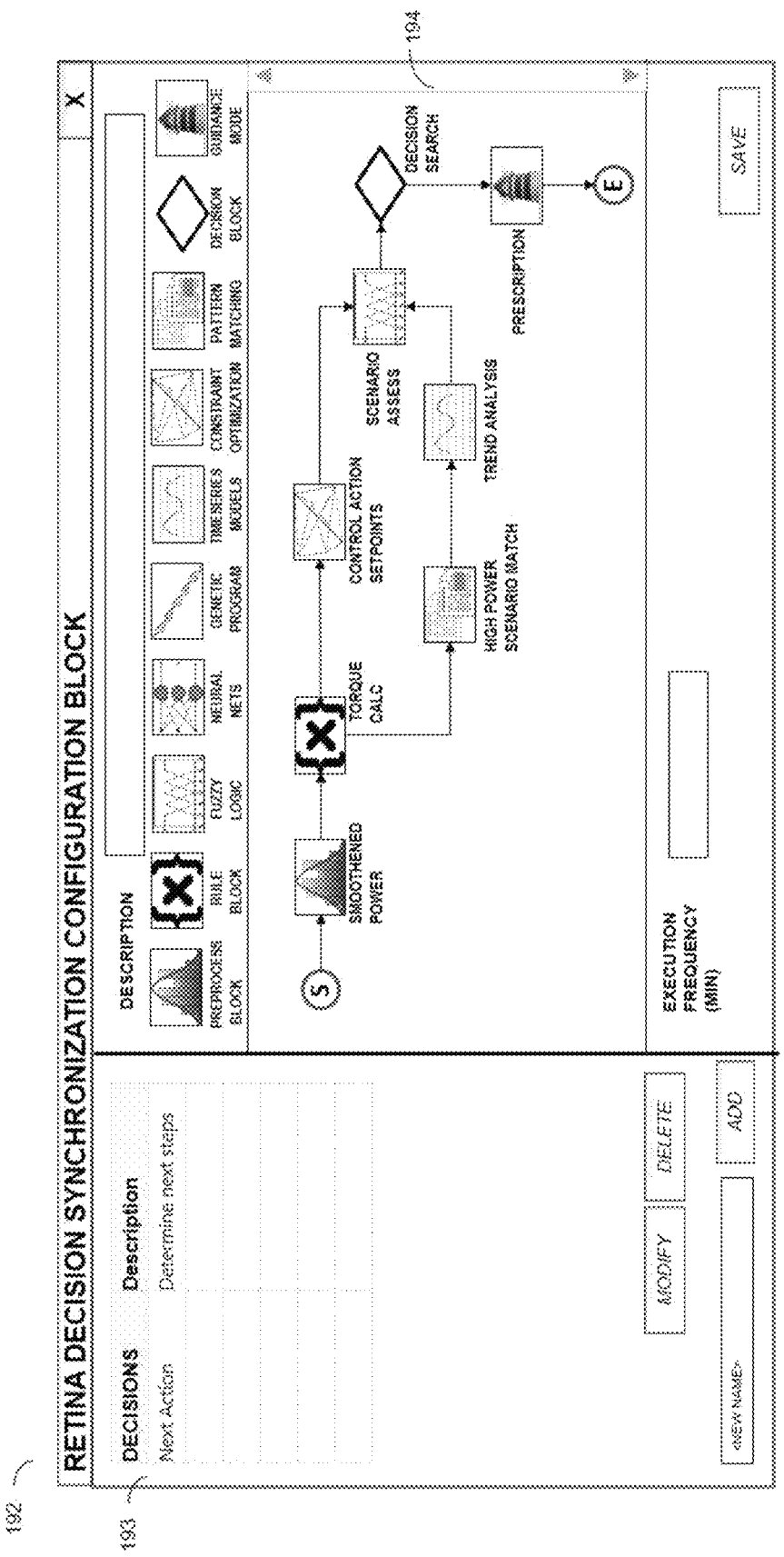
FIG. 18 illustrates the Decision Synchronization configuration block of RETINA
Figure 19:
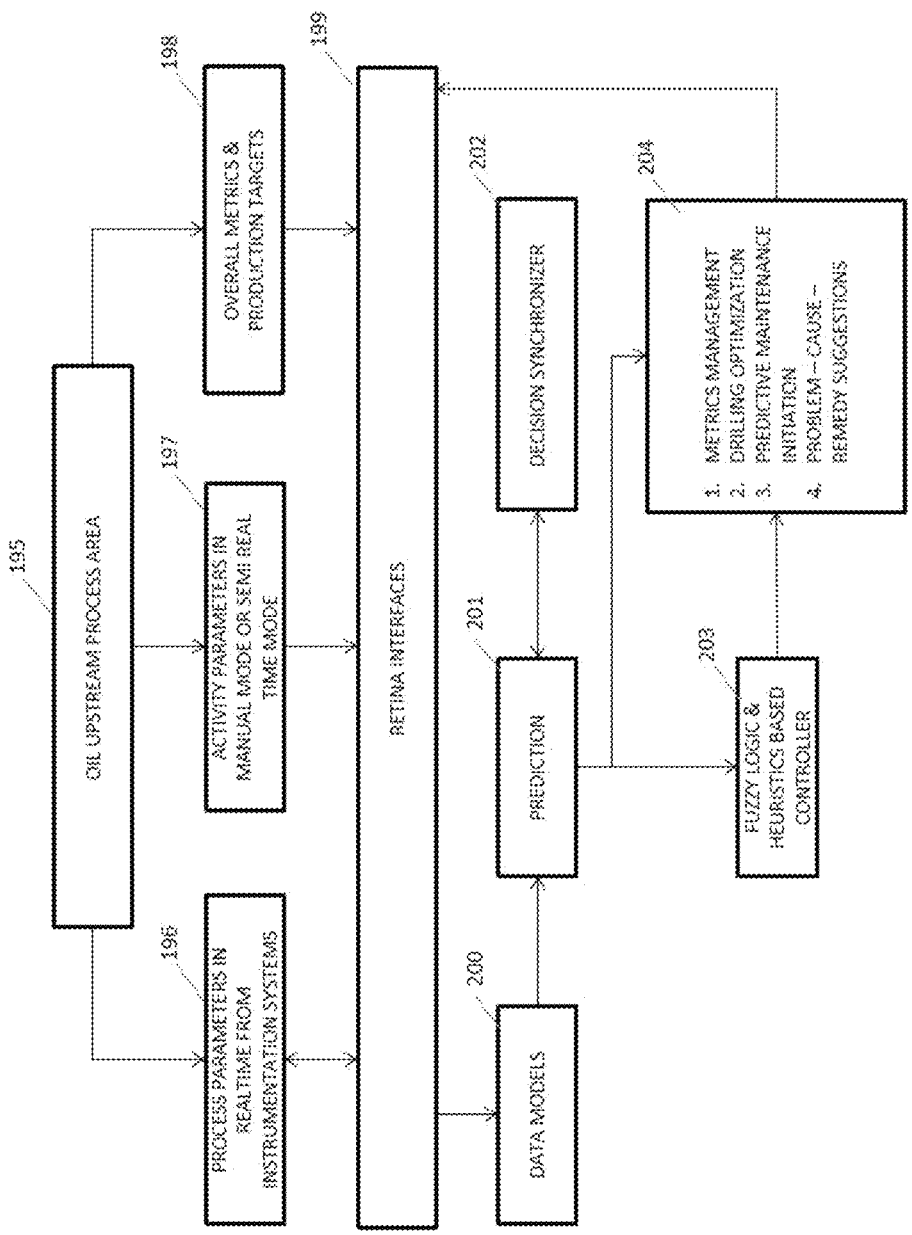
FIG. 19 illustrates a typical embodiment of decision synchronization using RETINA in Oil & Gas upstream process for risk reduced decisions.

In the preferred embodiment the output from decision synchronizer (127) module can be closed loop with systems or connected, to alarm displays to correct personnel for manual action. The module also tracks the actions taken by the respective personnel on the decisions conveyed by the RETINA system and updates the same back to RETINA for a closed loop adjustment of the decisions and their impact. The configuration module for decision synchronizer is illustrated in FIG. 18. The list of decision workflows are listed in (193) while options for configurations are in (194). It should be noted that RETINA decision synchronization module allows configuration of any of the blocks namely, Data pre-processing block, rule block, fuzzy logic block, neural network block, genetic programming block, constraint optimization block, risk patterns block, messages block and time series blocks in any order and in any number of recursive additions.

The current invention has a distinct data pre-processing module that allows the user to define and configure pre-processing rules on various data parameters through a simple or a combination of various statistical methods such as minimum, maximum, arithmetic mean, non-zero non-negative average, standard deviation, variance, median, mode, skew, kurtosis, max-min, last—first, slope and rate of change.

The current invention provides the data pre-processing capability by allowing to create multiple set of processing rules on the live data tags obtained from real time sources, data that are pooled from various data sources before persistence on incoming data and defining the frequency of data sampling for pre-processing.

This allows the set of rules to be applied on the live data allowing them to be subject statistical pre-processing in a combination that may be required as per the data model requirement and then persisted and stored as pre-processed parameter tag data.

This pre-processed data is then fed to the decision synchronizer for real time invocation of models like a regression model (ref FIG. 2 of the original patent document), or a fuzzy logic model or a neural network model or a constraint optimization algorithm.

The pre-processing module works as a data mining system through Z-score normalization, ANOVA, k-means clustering and Euclidean distance criteria which as collectively intended to serve as a data preparation mechanism for data model based risk pattern identification algorithm that is embedded as a component in the current invention. The pre-processing rules also are integrated with the decision synchronization module where the decision generation rules are configured.

For example, when data pre-processing and decision synchronization is applied for a cement manufacturing process as mentioned in example 1, the data pre-processing would need smoothening of related process parameters such as burning zone temperature, secondary air temperature and cooler outlet temperature. In this case data pre-processing rules would be set in the following manner as an example for Burning Zone Temperature:
  a. Acquire data through the data interface server which integrates with cement plant DCS or PLC or SCADA system in real time.
  b. Store the acquired data in the in-memory datastore of the current invention in real time as a real time tag of type float. Let this parameter be named as fKiln1_BZT_Raw
  c. Store the data at a time frequency defined in the pre-processing rule, say every 5 seconds, into another in-memory data tag that is a tag of type float array of size 12 (which again is configurable). This is intended to store the burning zone temperature raw data for last one minute at a sample rate of 5 seconds. Let this array be named as fKiln1_BZT_Raw Array.
  d. Apply the Arithmetic mean on the array tag to get the output stored into another array tag of type float. Let this tag be name fKiln1_BCT_Smoothened. Again for the computation of Arithmetic mean the user can set a computation frequency.

So a simple smoothening or running average of data available as real time parameter tag from the PLC/DCS/SCADA data sources is realized through the data pre-processing module.

The uniqueness that data pre-processing brings is to provide the following flexibility in handling different types of data and parameters to be treated before processing or applying various data models. In the above Cement example this means the following benefits
  1. Lesser noise data in the system which would bring down in variations in the computations, leading to minimized iterations and computation complexity
  2. Unnecessary building of raw data to persist being prevented/minimized bringing significant computing savings For a 3000 Tones/day Cement Plant which would be a mid-size cement plant consisting of one manufacturing line of Raw Mill, Preheater, Kiln & Cooler, Cement Mill, there would be approximately 600+ raw parameters used for process computing and optimization to be persisted every second. This equals approx. 50 Million data points or approx. 400 MB/day of data processing required. With Pre-processing the persistence in this context could be reduced to close to 28 Million data points or 214 MB/day with a result of close to 45% reduction in persistence and associated processing need.

The resultant benefit of this approach is that the most important process characteristic data alone is stored eliminating other unimportant parameters, leading to accurate optimization models. This approach has helped in achieving reducing the standard deviation of quality control parameters in cement plants by 30 to 45% compared to those without pre-processing capabilities The present invention RETINA eliminates the risks of inconsistent decision making in any process industries by providing a composite system with accuracy 24×7 irrespective of the expertise or experience levels of personnel in business & operations.

Further the present invention RETINA is an all in one system that has data collaborative capability; artificial intelligence enabled heuristic and data modeling capabilities; an extensible software architecture that enables embedding evolutionary algorithms and constraint optimization toolkits; architecture scalability in an SOA driven model that allows easy integration of multiple systems across different technologies; an architecture that allows co-existence and seamless integration with business systems in a scalable manner; and finally it is a singular system for both continuous and discrete manufacturing environments in providing adaptive decision system minimizing or eliminating human intervention.

RETINA has been architected to be adaptive and configurable to available hardware resources. There has not been any major or known performance constraints encountered thus far. RETINA has been tested for 50 web portal users and 50 desk top client concurrent users.

RETINA is a multi threaded, multi-tasking & multiprocessor compliant system. Certain components of RETINA can be configured as web service. These can be data collectors, health check applications, error loggers, application integrity management tools. Besides, the core computation engine can also be configured as a service. RETINA can be interfaced with DCS for displaying advisory messages. To do this, the following are the steps:
  1. The logic that would determine the advisory messages is to be first configured in RETINA.
  2. The set of messages that would get displayed should be configured in the DCS and linked to unique tags for condition based display.
  3. The tags of DCS should be linked to the tags of RETINA that holds the information of what messages are to be displayed for various scenarios.

It is to be noted that all the messages are to be pre-configured and RETINA does not generate any new message of its own. The following are the methods/best practices adapted in RETINA to optimize connectivity between components:
  1. Splitting the tags to be read from data sources into groups
  2. Prioritizing and phasing the tags for acquisition
  3. Load monitoring and tuning of read cycles based on the incurred load both in the data source end as well as in the RETINA end.
  4. Within RETINA, if multiple pictorials are opened at the same time, the optimization has been done in manner such that the pictorial on the top most display level will refresh & other pictorials will be in suspended animation mode till such time they get the focus.

| | |
|---|---|
| Number of nodes | 3 |
| Platform | Windows XP SP2, Windows Server 2003, Windows Server 2008 R2, SQL Server Enterprise edition 2008 R2, IIS |
| Computer configurations | Intel Dual Core & Quad Core processors, 4 GB RAM, 310 GB HDD, dual Ethernet NIC |
| Number of concurrent users | 50 web portal users and 50 desktop clients |
| Number of concurrent real time interfaces | 15 |
| Number of persistent interfaces | 3 |
| Number of tags | 300,000 (2000 tags per real time adaptor) |
| Approximate CPU load factor in each of the computers | 50-60% |
| Read cycle time measured for each of the adaptors | 50-100 ms |
| Total number of rules written in the test system | 300 rule blocks with 100 steps in each block, 150 fuzzy blocks, 150 regression blocks. Total of 300 1-dimensional arrays |
| Rule engine execution time | 100-125 ms |
| Duration of test | 60 days of continual run |
| Report & Visualization invocation duration | 3-5 seconds for a report of 25 parameters over a 30 day duration. 2-4 seconds for a screen launch with 100 screen controls |

RETINA has been designed to allow configurations so that it works adaptively to the memory & other hardware constraints of the underlying platform. Therefore, any augmentation to the server resources would help in the improved performance of the RETINA system as well as in increasing the payload of the RETINA central server. Data servers and data collection nodes if introduced will help in a more federated architecture which will lead RETINA to perform for High Availability, fail over, clustering and load balancing. The summary of largest implementation of RETINA is as follows:

| | |
|---|---|
| Hardware sizing | Intel Xeon processor server - 3 Nos. Data collector nodes with Intel Quad Core processors - 5 Nos. |
| No of users | 25 |
| Process Parameters accessed | 3000 |
| Speed of data scanning from the plant systems | Less than 50 milli seconds. |
| Data exchange volumes | 250 KB to 2 MB per second subject to bandwidth availability. |
| Rule engine execution speed | 50 milli seconds for a knowledge base covering about 25 plant equipment's. |

Example 1

Figure 27:
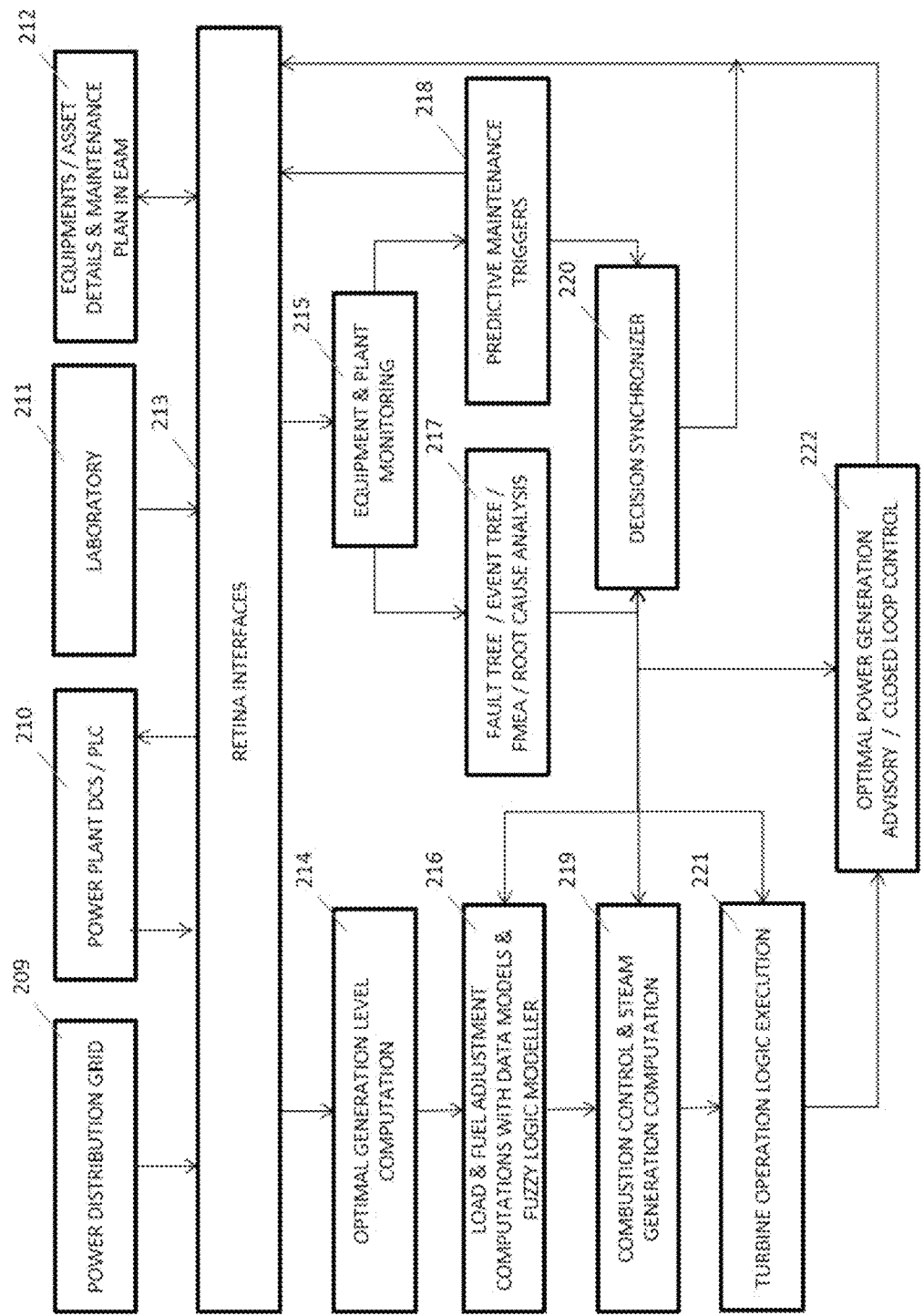
FIG. 27 illustrates a typical embodiment of decision synchronization using RETINA in Power Generation process for risk reduced decisions.

FIG. 27 shows the application of the present invention RETINA to another continuous process industry Oil & Gas upstream exploration process. Oil Upstream process area (195) can be a well site area with drilling equipment trying to explore for oil. RETINA interface management (116), (199) interfaces with real time process parameters (196), activity parameters (197) and overall metrics (198) of the exploration process for decision synchronization (127). Data models (200) correlate the metrics needed with metrics available in real time. Prediction (201) yields results and decisions that are conveyed to site in charge, drill supervisor, rig manager etc. regarding the state of drilling activity and what needs to be carried out to meet the metric deadlines. The prediction (201) results are used by fuzzy logic controller (203) to deliver as closed loop control. The output of predicted results may be used for any closed loop actions on drilling process, from drilling optimizations, changing the drill bits or any other steps or actions typically associated with drilling processes.

Preferably, the drilling process parameters (196) in real time are taken from instrumentation system of the drilling equipment in WITS (Wellsite Information Tranfer Specification) formats. Also, preferably, the drilling activity parameters (197) that correlate directly with drilling process are entered in semi real time mode by drilling supervisors to account for every second of the activity. And, preferably, the overall targets and metrics needed for drilling activity are interfaced from central ERP system or a specialized data mart.

In the preferred exemplary embodiment RETINA also enables predictive maintenance of drilling assets that is very critical to continue the drilling activities as well as synchronizing or triggering any asset purchase. The upstream drilling activities are asset intensive and any failures in assets could result in great loss of production in terms of time taken to get to reservoir usage for production. By computing Asset reliability and doing condition monitoring in real time, the present invention RETINA ensures sufficient pre-warning and remedial actions to be carried out for ensuring continuity in operations and prevent a complete halt in drilling activities.

Preferably, RETINA computes the metrics of drilling operations in real time and also guides the drill staff the sequence in which the operations are to be carried out so that the identified metrics are met. By virtue of data analytics and predictive capabilities, RETINA gives a clear problem root cause analytics by which planners can view the drilling operations and plan the movement of equipment. Therefore, the use of present invention RETINA in Oil & Gas upstream exploration process would improve drilling activity, Improve asset availability, minimize non-productive times, improved visibility of operations and reduce fuel and energy consumption.

Figure 20:
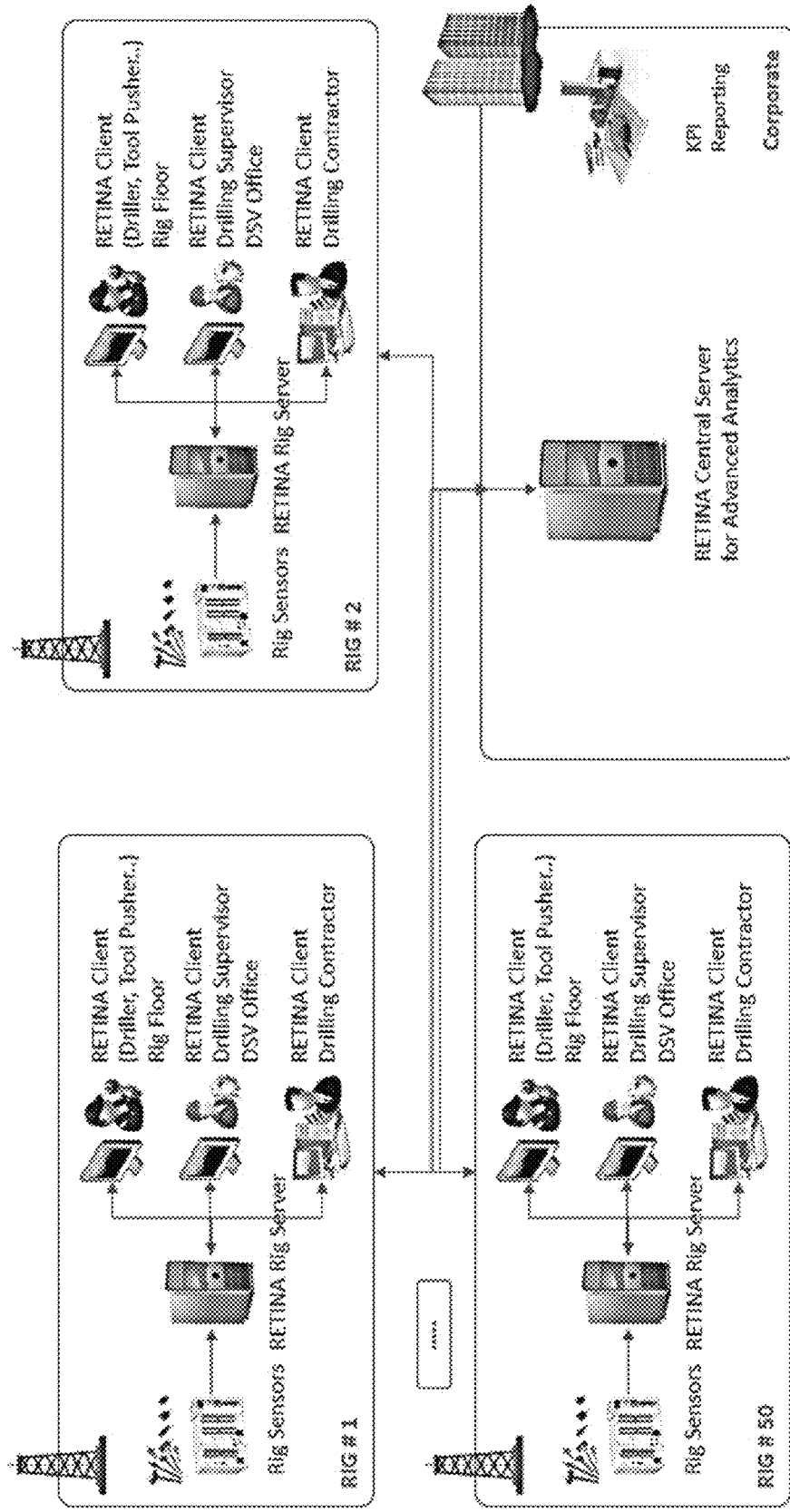
FIG. 20 illustrates a typical connectivity layout diagram of typical deployment of RETINA connecting multiple rigs—drilling and production for central analytics and decision synchronization.
Figure 21:
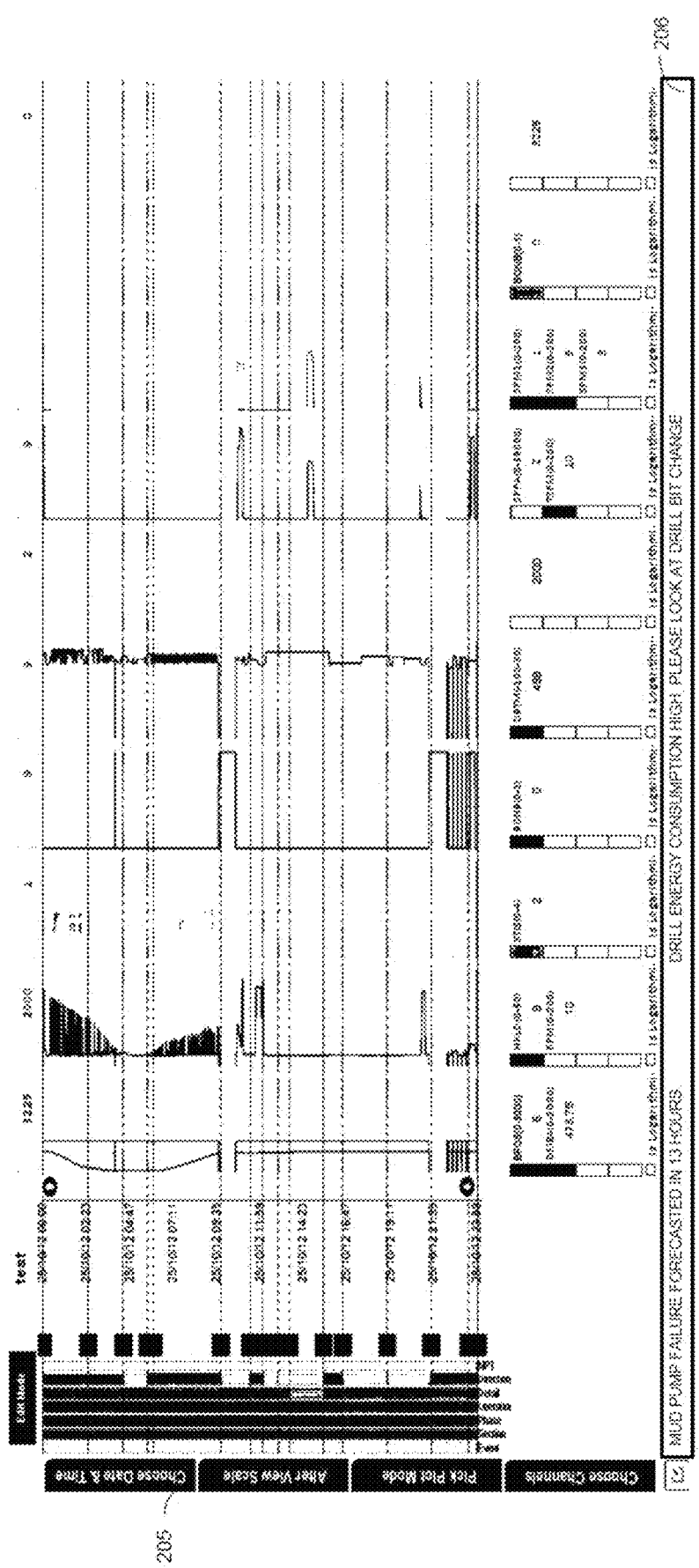
FIG. 21 illustrates the drilling supervisor console with prescriptive decisions and guidance messages.
Figure 22:
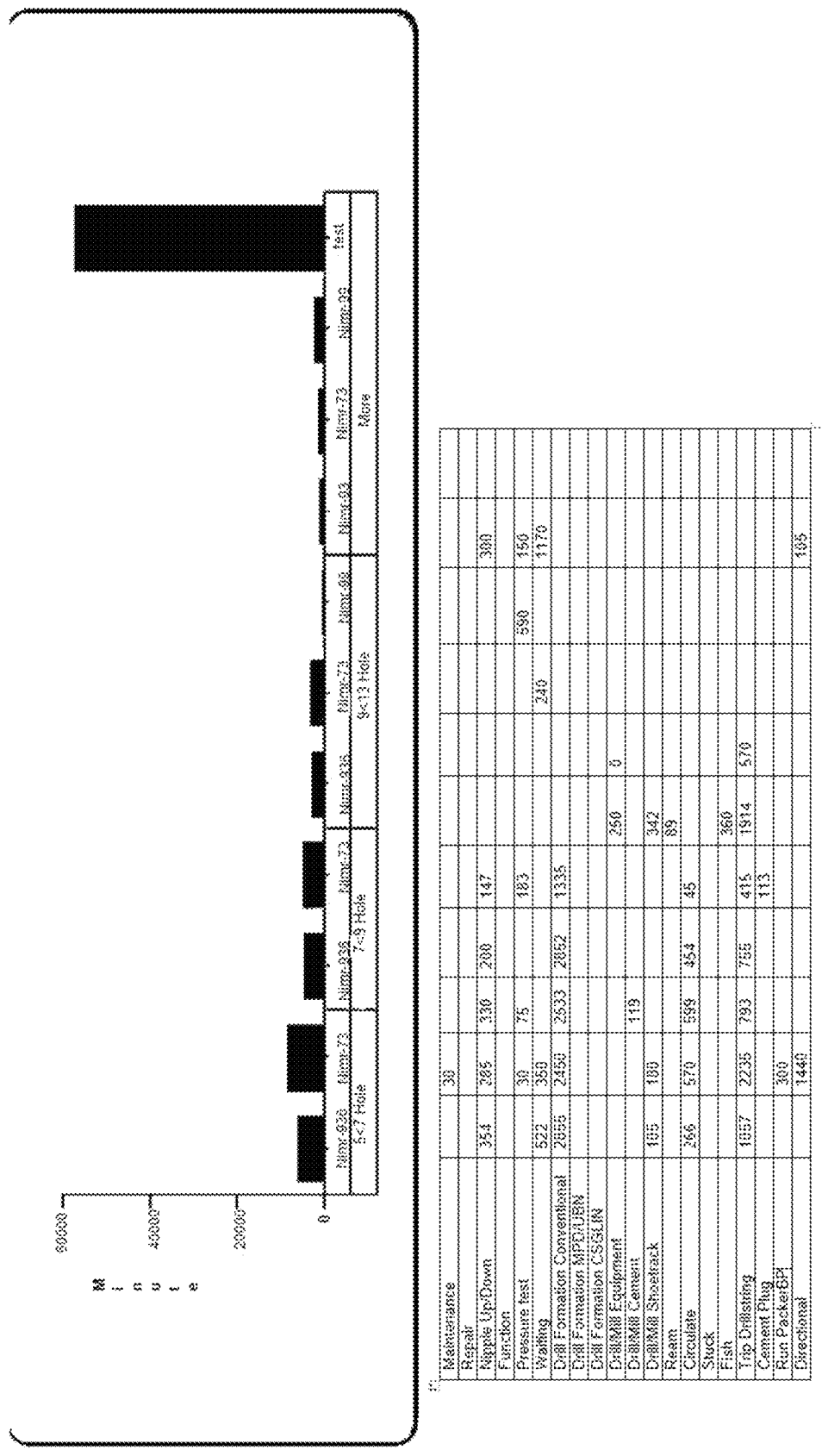
FIG. 22 illustrates a typical drilling KPI report generated through RETINA

FIG. 20 illustrates the typical connectivity and deployment architecture for RETINA enabled decision synchronization. FIG. 21 represents the user interface for the driller and supervisor where the activities are as listed in (205) while decisions are available for action based on configurations in decision synchronizer module of RETINA in (206).

Figure 24A:
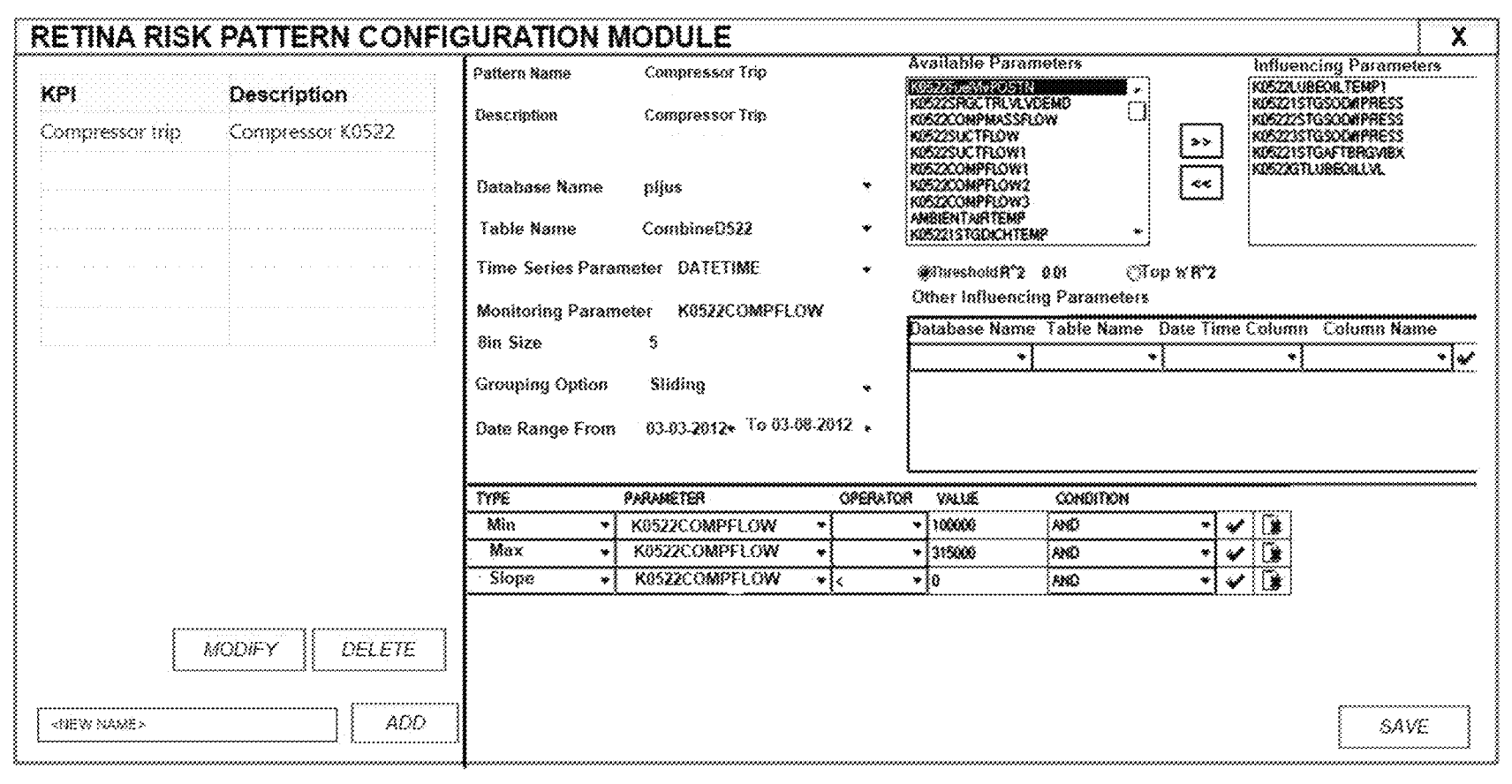
Figure 24B:
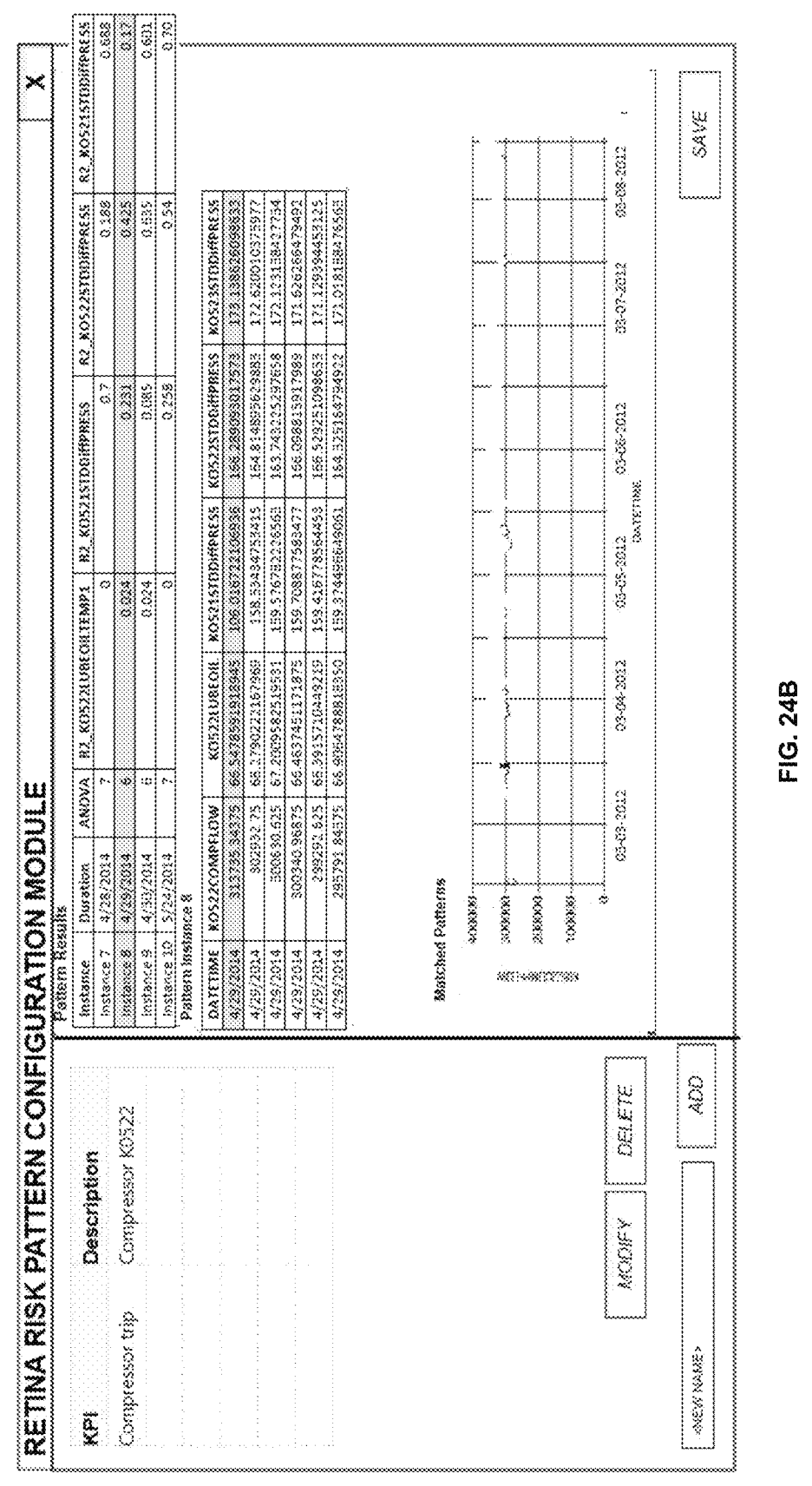
Figure 25:
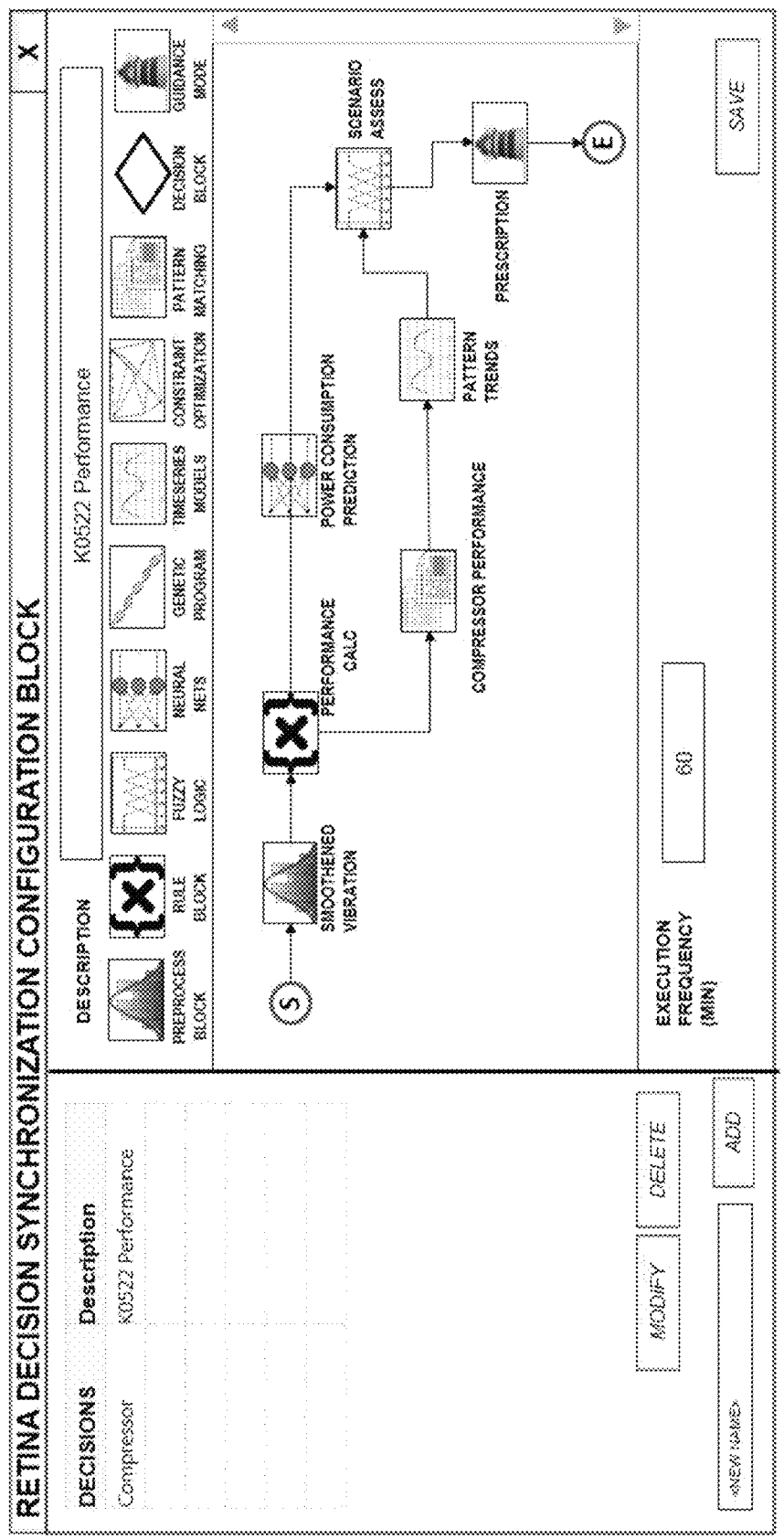
FIG. 25 illustrates a typical Decision Synchronization configuration in RETINA for prescriptive guidance message for compressors.
Figure 26:
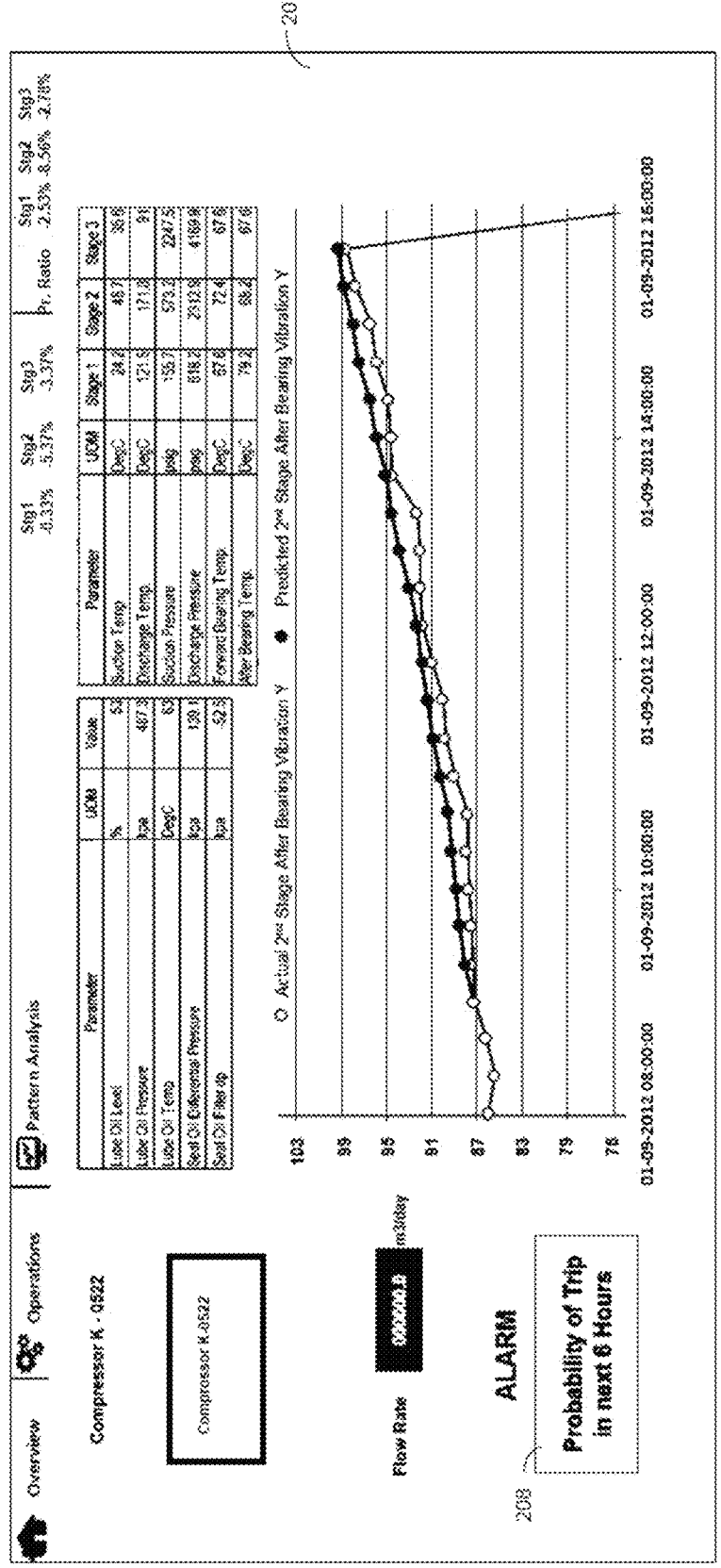
FIG. 26 illustrates a prescriptive guidance message generated by RETINA about an impending compressor trip.

FIGS. 24-A and 24-B represent the configurations made for gas compressors in the process circuit using the RETINA's Risk pattern configuration module. Decision synchronization is configured for the compressor equipment as illustrated in FIG. 25. It is to be noted that the models and computation blocks configured are specific for this compressor that is being monitored for operations risk reduction. FIG. 26 illustrates the identification of an impending failure in the equipment and providing a message of time after which this would happen. (207) and (208) illustrate the output of RETINA's decision synchronizer that helps operations take enough preventive measures to ensure that the equipment as well as the process do not suffer critical failures or faults and therefore cause opportunity loss.

Example 2

FIG. 27 shows the application of the present invention RETINA to another continuous process industry like Power sector. RETINA interface management (116), (213) acquires demand from the Power distribution grid (209), real time process parameters from power plant PLC/DCS system (210), laboratory inputs (211) and asset related information from Asset Management system (212). Optimal generation level computation (214) runs its constraint optimization module to determine optimal generation target for the generator. Load & fuel adjustments (216) to the generator are done using regression and fuzzy logic modeler. Combustion control and steam generation (219) is triggered to do a feed forward process response based on the load settings. Turbine operation (221) is also triggered to adjust to the new load settings. The combined effect of blocks 214, 216, 219 and 221 results in a synchronized, coordinated and integrated mechanism for optimal power generation that is either advisory or closed loop (222).

In the preferred embodiment the power generating utilities are connected to Power distribution grid (209). The Transmission & Distribution of the power is determined by the consumption, load and other major attributes such as cost of energy. In such scenarios, the grid would forecast and lay out the demand of power generation that needs to be fulfilled by generating utilities.

Preferably, the power plant PLC/DCS system (210) provides access to real time process parameters such as temperature, pressure, flow, volume and other critical process parameters.

Preferably, the Laboratory analysis (211) provides the chemical & physical properties of fuel, water and emissions. These are critical to determine the efficiency of the power plant which determines how economical it is to operate the plant at various generation levels.

In the preferred embodiment the asset Management system (212) provides details of assets that are available in the power plants and provides details of their maintenance criticality.

In the preferred embodiment the computation for optimum generation target (214) for the generator is based on Demand at the point from the grid, Heat rate or efficiency levels of generation of the generator, Minimum & maximum load that the generator can handle at the given point of time and the Cost of Generation & economics of using the generator. The present invention RETINA runs its constraint optimization module to determine optimal generation levels from a multiple set of generators to meet the demand at any point of time from the grid. The computations are repeated if there is a change to the demand or any changes to availability of the generators or if there is any perceptible change to heat rate of the generator.

In the preferred embodiment the Load & fuel adjustments (216) uses fuel chemistry and load vs. efficiency characteristics as well as equipment limitations or constraints for determining the manner in which load can be altered.

By having access to process, quality data from the plant as well as about the equipment from an asset management system, the present invention RETINA has been implemented for enabling real time performance and condition monitoring of assets and equipment (215) in the power plant. Standard performance levels of the equipment under various ambient conditions are continuous compared with current operating levels to determine and sense any deviation in equipment conditions.

Equipment conditions monitored (215) by RETINA ensure that a thorough Fault Tree, Event Tree, FMEA and Alarm root cause analytics (217) to be enabled and carried out seamlessly to provide any pre-emptive decision making & synchronization (220).

In the preferred embodiment the Predictive maintenance triggers (218) refrains in total the occurrence of any unwanted generation outage or any dangerous plant instability.

By providing an integrated management of power generation, the present invention meets the required load demands in a cost effective manner, provides ideal targets for optimal combustion control, provides heat rate degradation computation and advisory, provide alarm and fault root cause analytics, provides auto-pilot plant generation mode, provides monitoring of equipment condition and predictive maintenance.

Figure 28A:
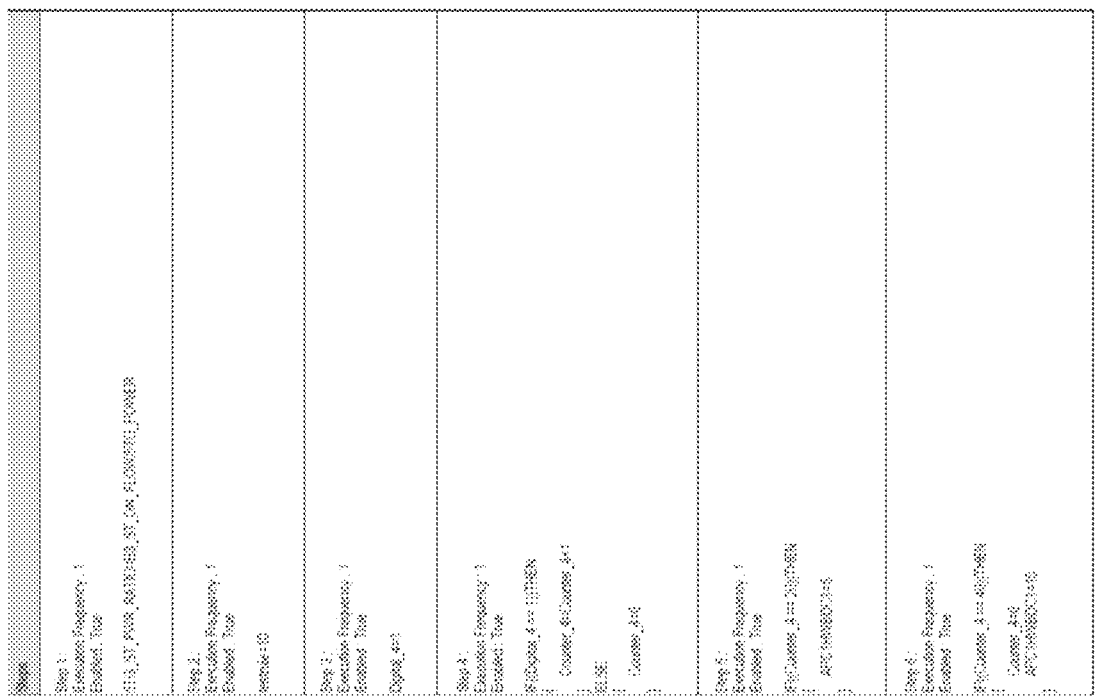
FIGS. 28-A to 28-C illustrate a typical Rule engine workflow rule set created in RETINA for a prescriptive two way closed loop control of the power plant.
Figure 28B:
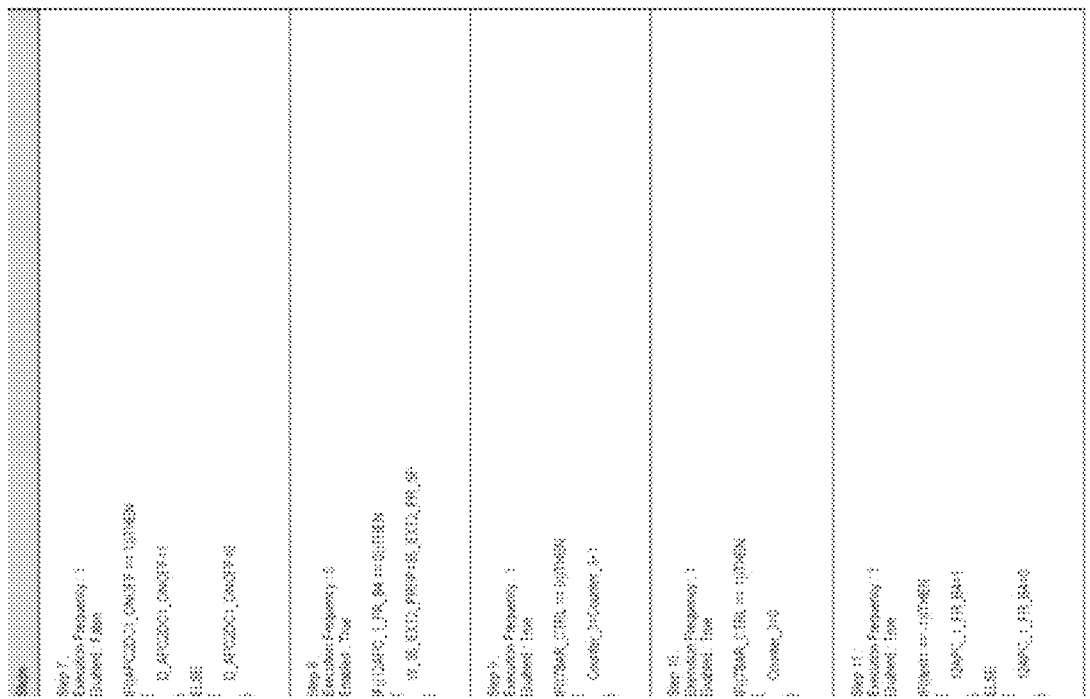
Figure 28C:
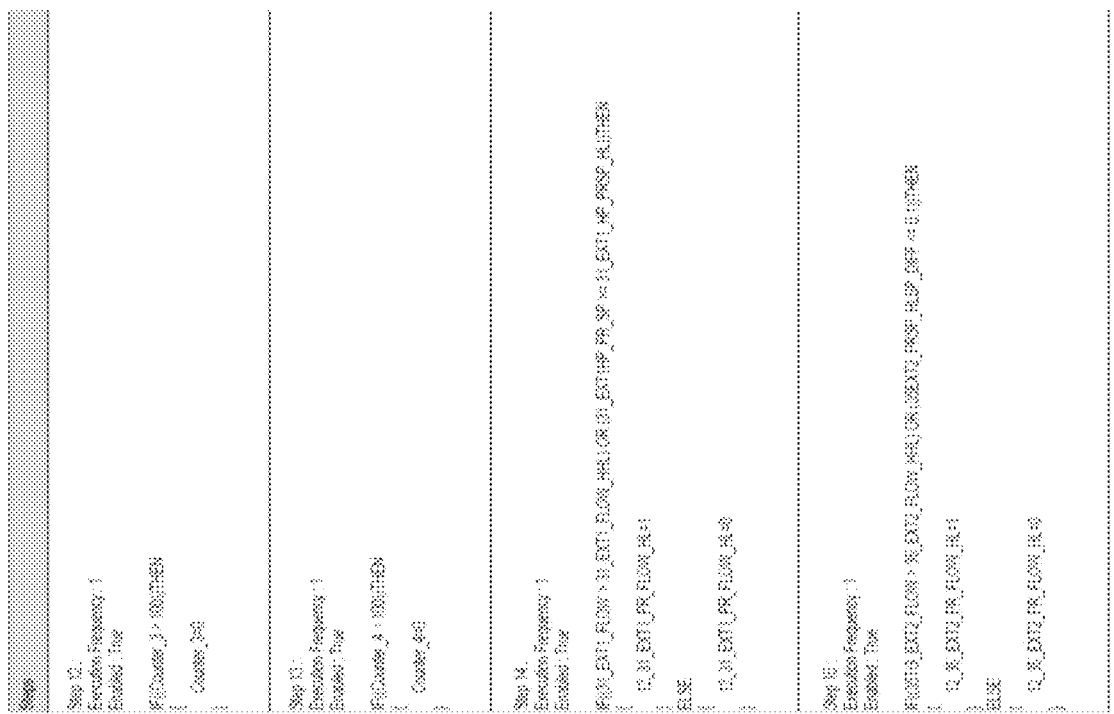
Figure 29:
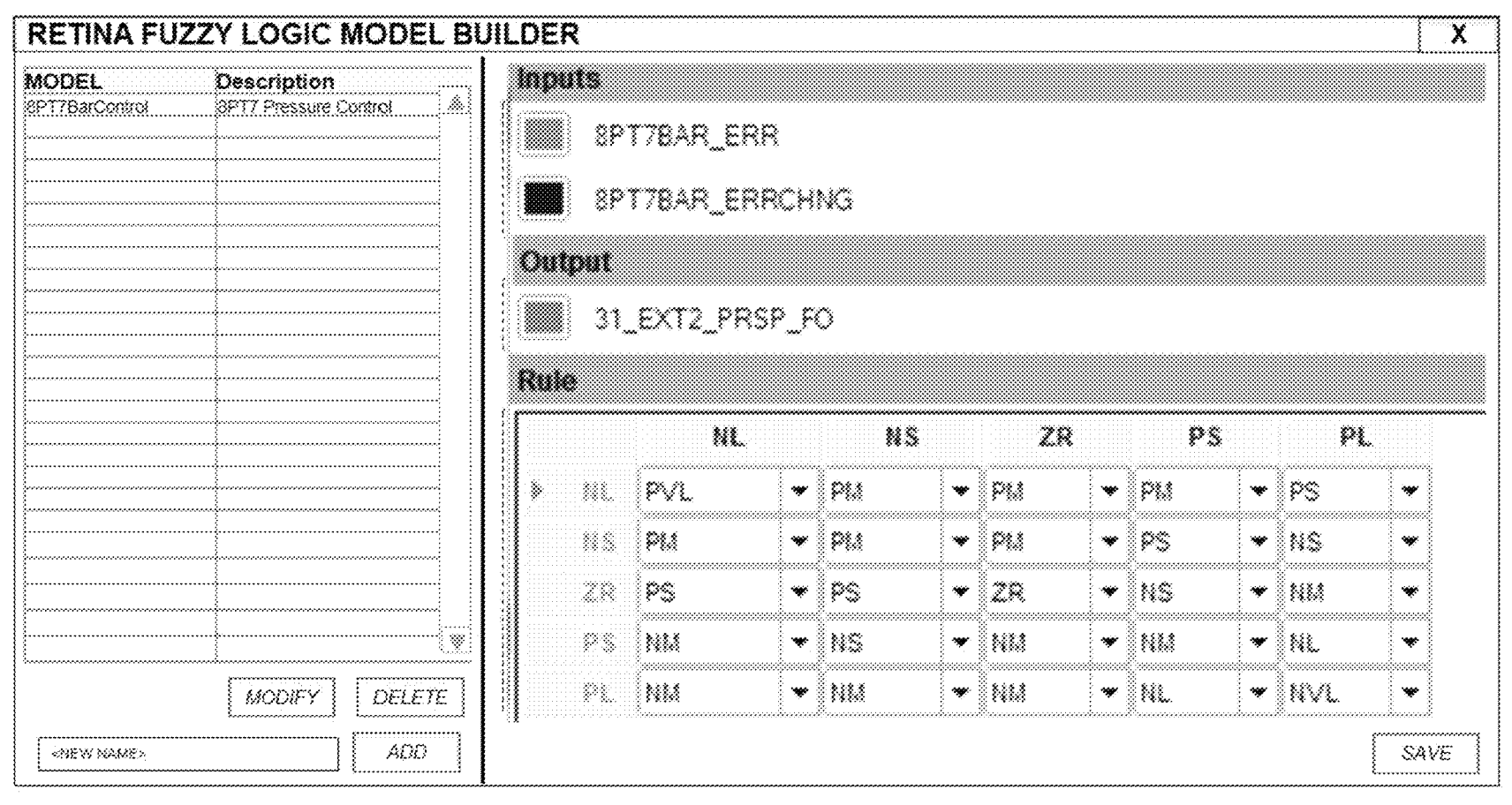
Figure 30:
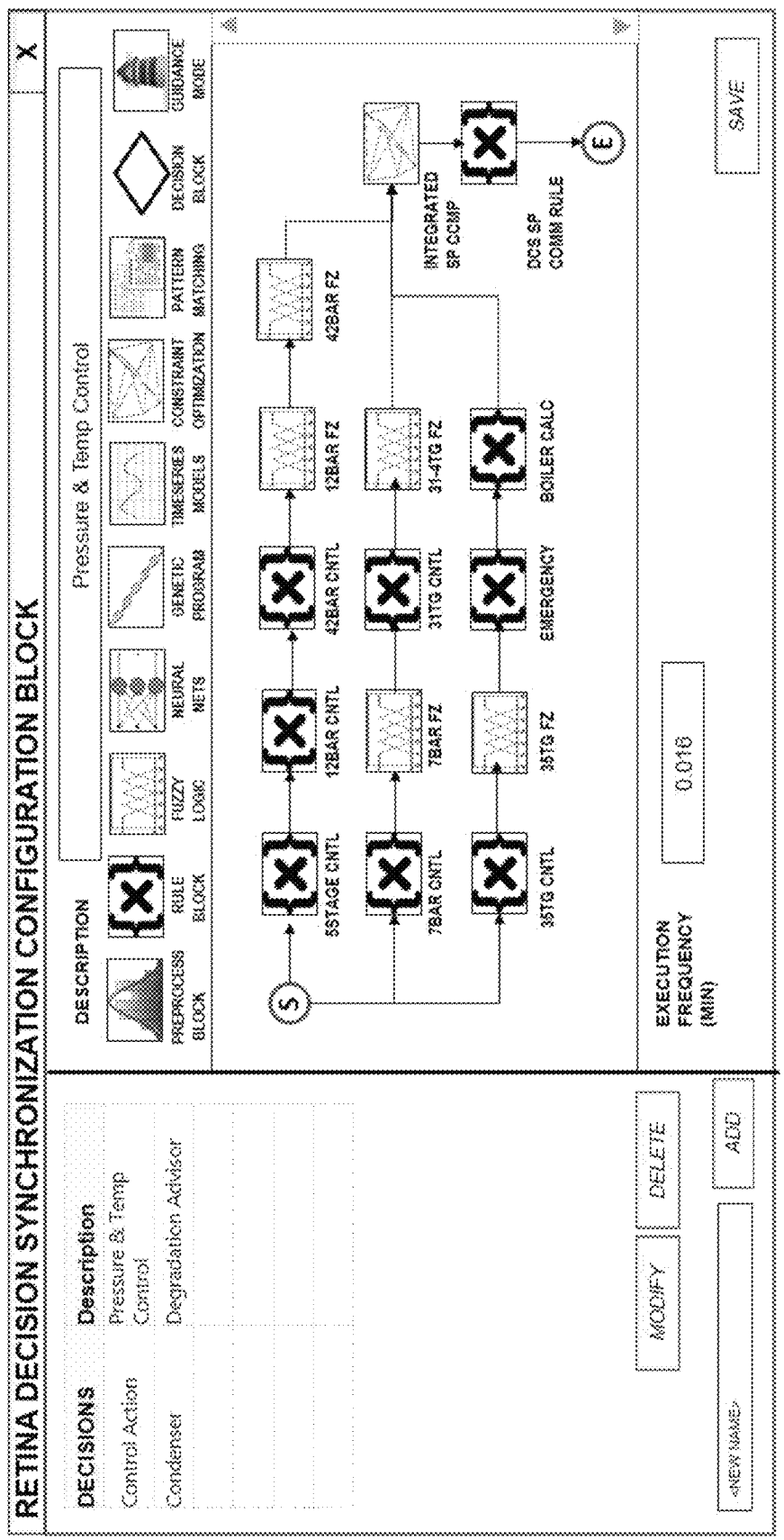
FIG. 30 illustrates a decision synchronization block configured in RETINA for a power plant closed loop control.
Figure 32:
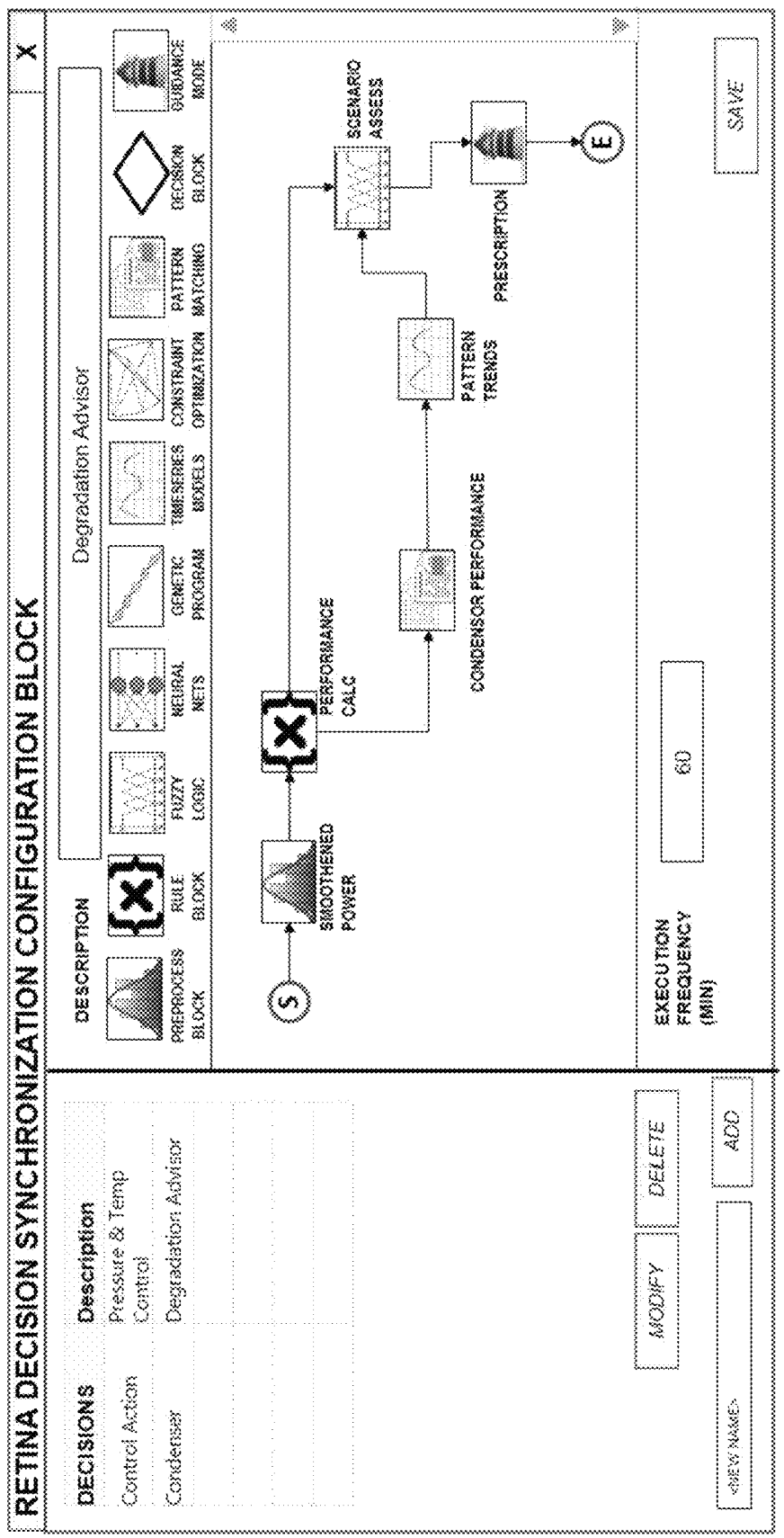
FIG. 32 illustrates a decision synchronization block configured in RETINA for identifying operations risk with condenser equipment in power plant and provide guidance messages.
Figure 33:
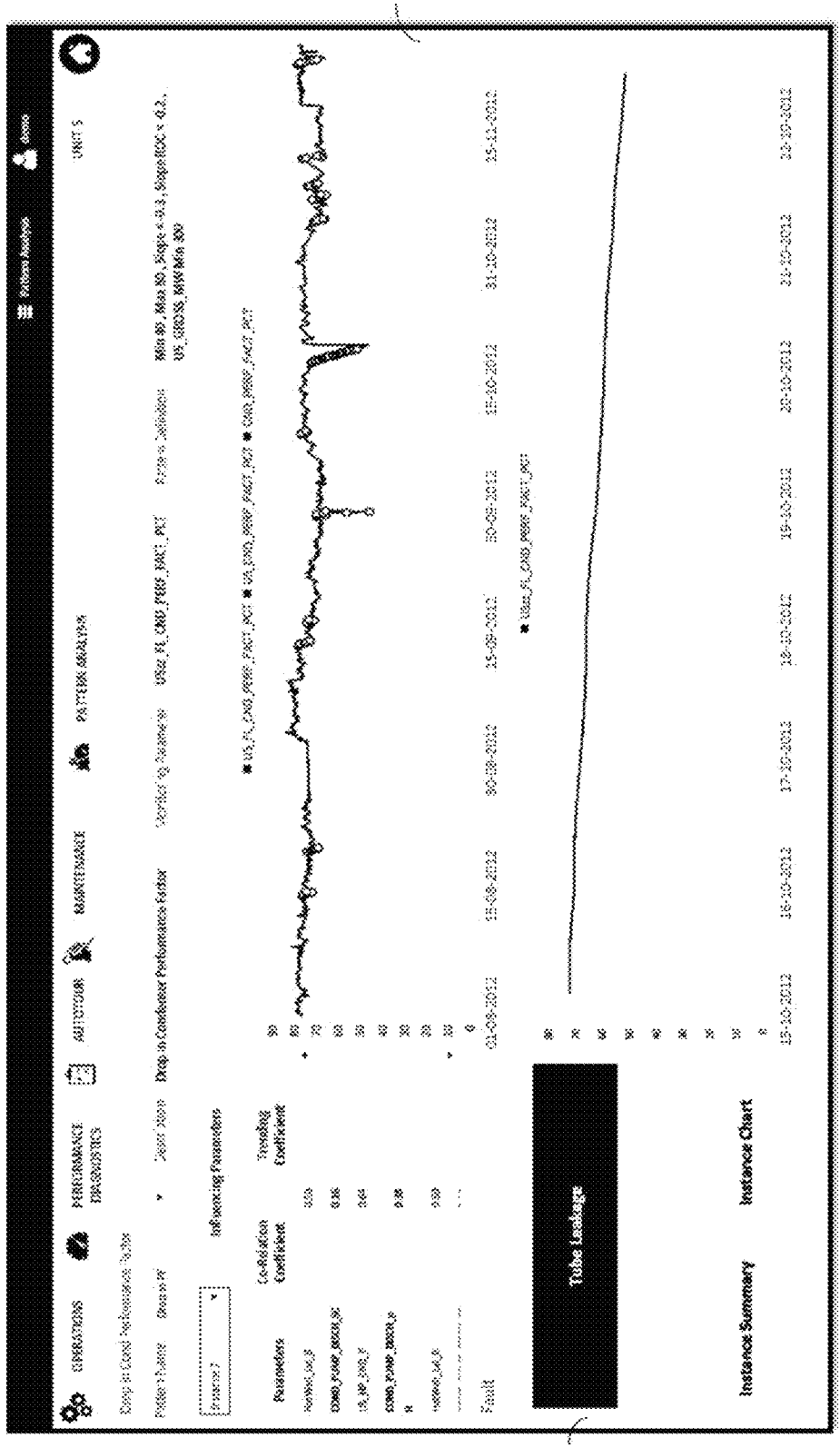
FIG. 33 illustrates failures patterns identified by RETINA through decision synchronization for power plants.
Figure 34:
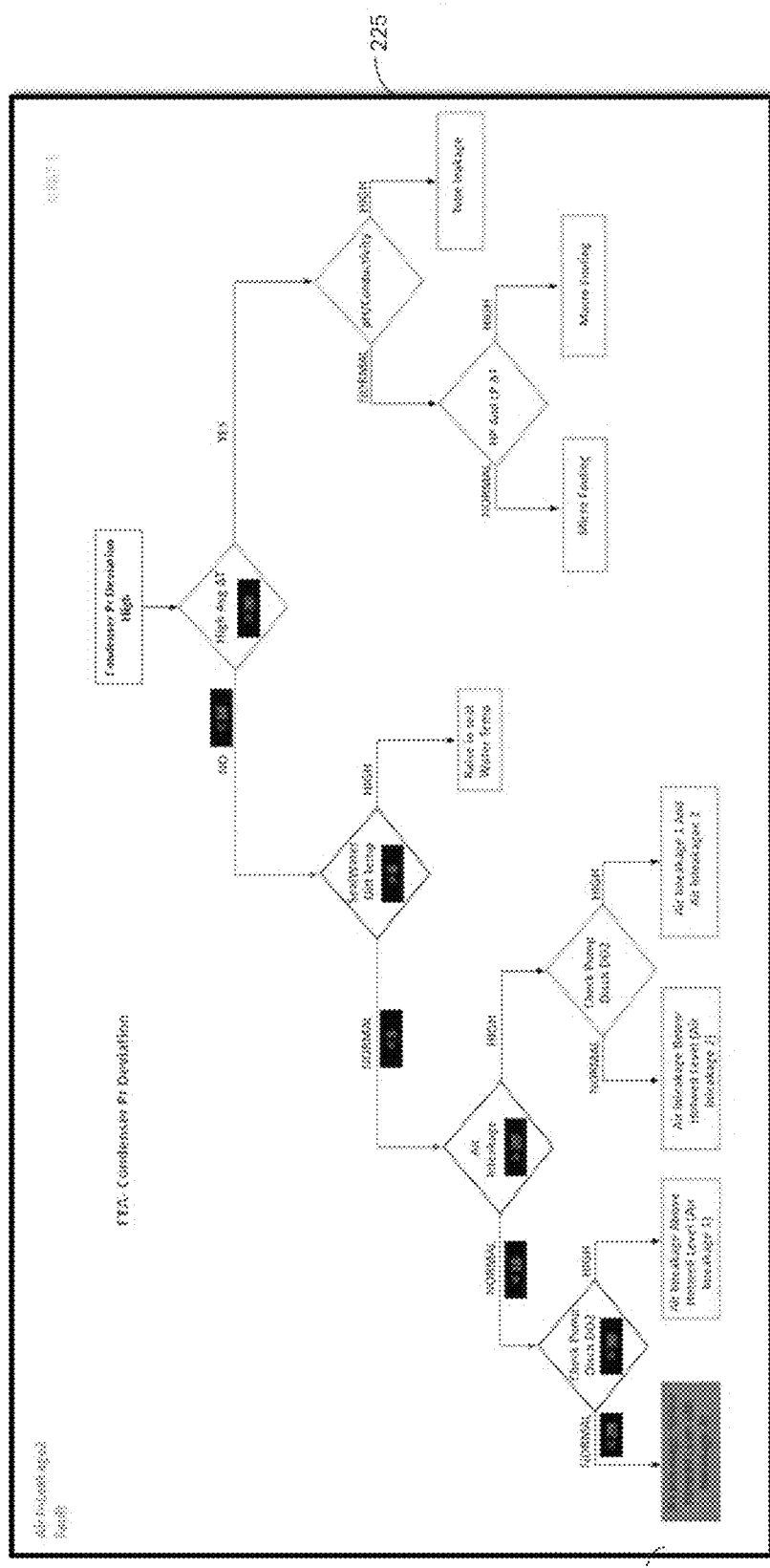
FIG. 34 illustrates a fault tree identified by RETINA corresponding to an identified performance degradation of condenser equipment in power plant.
Figure 35:
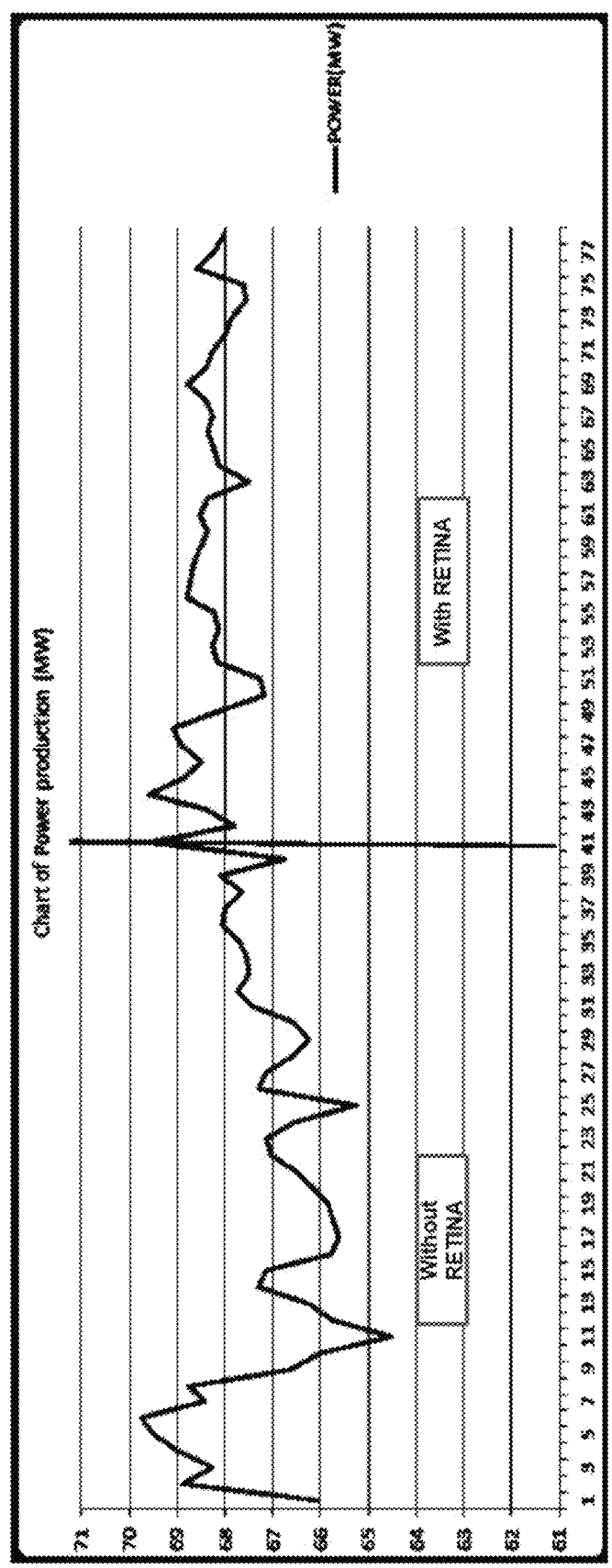
FIG. 35 illustrates the typical benefits of RETINA decision synchronization for power plants.

FIGS. 28-A, 28-B and 28-C illustrate the rules created in the rule engine block (125) for the closed loop control of the process. FIG. 29 illustrates the pressure control blocks created, while FIG. 30 illustrates the decision synchronization workflow created in RETINA for the closed loop optimization control of the process. FIG. 31 illustrates the risk pattern rules configured for condenser equipment in the regenerative process, while FIG. 32 illustrates the decision synchronization block for the condenser operations risk minimization. FIG. 33 shows the failures identified by the condenser risk pattern module in line with decision synchronization module where patterns are shown in (223) and problems are shown in (224). FIG. 34 shows the drill down of the problem and illustrates the identified root cause. FIG. 35 illustrates the overall betterment of the process and stabilization resulting in increased generation of power.

Ramification

As shown and described herein, RETINA eliminates the risks of inconsistent decision making in continuous, discrete and batch process industries by providing a composite system with accuracy 24×7 irrespective of the expertise or experience levels of personnel in business & operations. The experienced operators in continuous & discrete process industries operate the plants in a near optimal manner to provide best possible throughput in a constraint driven environment. The production throughput and yield are inconsistent due to anomalies in human decision making process. Thus the advantages of RETINA are readily imminent.

a) RETINA acts as an all in one system that has data collaborative capability.
b) RETINA provides artificial intelligence enabled heuristic and data modeling capabilities.
c) RETINA has an extensible software architecture that enables embedding evolutionary algorithms and constraint optimization toolkits.
d) RETINA enables architecture scalability in an SOA driven model that allows easy integration of multiple systems across different technologies.
e) RETINA acts as a singular system for continuous, discrete and batch manufacturing environments in providing adaptive decision system minimizing or eliminating human intervention.
f) RETINA provides an architecture that allows co-existence and seamless integration with business systems in a scalable manner.

The embodiments of the present invention may be implemented using any appropriate computer system hardware and/or computer system software and network connections or wireless or wired networks in communication or residing upon the relevant industrial facility network(s) or equipment. In this regard, those of ordinary skill in the art are well versed in the type of computer hardware that may be used (e.g. personal computers, networks, servers, and client devices), the type of programming techniques that may be used (e.g. object oriented programming), the types of computer languages that may be used. For example, enterprise resource planning systems in communication with embodiments of the present invention may include IBM Maximo™, SAP PM™, Oracle PM™, Oracle EBS™ SAP ECC 6.0™ or R/3™ using XML based data connectivity or web services.

It will be understood that the invention described herein can be performed in any order and can be performed once or repeatedly. Various operations described herein may be implemented in hardware, software, and/or any combination thereof. It is to be understood by the person skilled in the art that the examples and illustrations in figures describe the invention in the best possible way and are not limiting the scope of the invention.

The invention claimed is:

1. A system comprising:
a combined real time predetermined and non-predetermined data integration capability, predictive analytics capability, adaptive real time process modeling capability, and performing in continuous, discrete and batch manufacturing processes of generating business decisions, said system comprising:
 a. one or more data memory storage units for storing and managing of one or more parameters and attributes (data) from a plurality of data sources;
 b. one or more data pre-processor units for pre-processing of said data;
 c. one or more real-time logic processing units for determining the impending operations risk;
 d. a key performance indicator computation unit incorporated with a processing logic using a computational power provided by a mathematical library module;
 e. an interface management unit having a data integration gateway to handle a plurality of concurrent interfaces of similar or different types;
 f. an internal database unit serving to keep track of configurations, variations, limits and key attributes;
 g. a computational library tool unit having a plurality of computing libraries, wherein said computational library tool unit is used to build logic;
 h. one or more heuristic and data based model embedded in the real time logic processing and key performance indicator computation unit building a processing logic;
 i. a constraint optimization unit for processing of one or more linear and non-linear programming models;
 j. a key performance indicator configuration unit to dynamically configure key performance indicators that are computed by the real-time logic processing and key performance indicator computation engine; and
 k. a decision synchronizer unit for delivering of decisions in a closed loop system,
wherein said one or more real-time logic processing units pre-process data in a remote node in two steps using first a function block acting on live data streams to:
 (i) assess quality of the live data streams,
 (ii) min-max filter the live data streams, and
 (iii) clip the live data streams to a predetermined min-max range where deviations are detected, and second a preprocessing block acting on stored data to (i) assess quality of the stored data to ensure adequate and sufficient stored data for further processing based on predetermined amounts of stored data, and (ii) conduct minimum, maximum, mean, standard deviation, variance, skew, median, kurtosis, non-zero average, and rate of change pre-processing to produce remote node pre-processed data further comprising the steps of:

I. processing spontaneously data acquired by a remote intelligence node using a sensor;
and generating a set of recommended actions that are synchronized for local users within a remote location, and wherein said data acquired by the remote intelligence node using the sensor is transmitted exclusively from each remote location through the Internet to a central real time integration and analytics intelligence node, II. once configuration setup is completed, the remote intelligence node initiates processing the data transmitted from each remote location by steps comprising:
 i. the data interface module acquiring live data from the sensors and one or more of plant control systems, plant control system program logic controllers (PLC), distributed control systems (DCS), supervisory control and data acquisition (SCADA), historian and a sensor network of the remote location;
 ii. transferring the live data acquired by the data interface module in step II(i) into an in-memory raw data ingestion storage and pre-processing the live data by:
 validating the quality of the acquired live data with data quality assessor;
 checking a range of the live data with data min-max filter, and
 clipping the live data via a data clipper which clips the live data to a user predetermined min-max range;
 iii. storing the live data subjugated in step II(ii) in the in-memory live data pass storage block and furthering the live data into the in-memory short term history storage block to act as multidimensional arrays for the identified parameters and subsequently enabling the statistical processing of computations comprising the steps of:
 ensuring sufficient adequate live data is present in the in-memory short term history storage block for subsequent processing, and
 processing the live data in the in-memory short term history storage block by executing the statistical computations, comprising minimum, maximum, mean, standard deviation, variance, skew, median, kurtosis, non-zero average, Rate of Change (ROC) on the identified data;
 iv. archiving the processed live data in-memory processed data storage locally and sharing the processed live data with the central intelligence node and the real time rule workflow computation engine of the remote node executes a real-time rule processing that embeds fuzzy logic and regression fit modelers, wherein the computations are made in real-time and if recommendations or decisions need to be provided, said recommendations or decisions are reverted to the actuator network through:
 in-memory control data storage and the data interface module;

III. The live data processed in steps II(i) through II(iv) is received into the central intelligence node by:
 i. processing further the live data from remote nodes by the data synchronizer management block, which ensures the uninterrupted data connectivity and data integrity between the remote node and central node;
 ii. unifying and archiving the live data from step III(i) before validating for consistency, periodicity, normalization or denormalization of data and flagging for any aberration;

iii. processing further the live data from step III(ii) through the missing data identifier, which checks for missing data either by data sets or within datasets and flags them again;
iv. processing further the live data from step 3(iii) III(iii) by a repeating data filter, which validates, based on data distance criterion, irrespective of whether the live data is time-series or otherwise, for uniqueness and flags repeated data, if any;
v. processing the live data processed in steps III(i) to III(iv) through a data reconstruction block, which processes all the flags raised and re-creates the archived live data pushing the said data into a central archival manager;
vi. subjecting the live data obtained from pre-processing step III(v) to one or more data mathematical models chosen from those listed in g-i which results in the delivery of decisions to a user;
wherein the pre-processed data is provided to a central data archival manager node, which further pre-processes the remote node data by:
IV. performing a sufficiency analysis of the pre-processed data comprising the steps of:
(i) conducting a Box-Whisker analysis on the pre-processed data to produce estimates of the spread and median of each parameter;
(ii) storing the estimates of the spread and median of each parameter from step IV(i);
(iii) conducting one or more analyses selected from Normal, Weibull, Poisson, Rayleigh or binomial probability distribution analyses on the pre-processed data to obtain one or more probability distribution results;
(iv) storing the one or more probability distribution results from step 4(iii) IV(iii);
(v) analyzing the pre-processed data through a k-means clustering technique to produce a data grouping result;
(vi) storing the data grouping result from step IV(v);
(vii) analyzing the pre-processed data by Euclidean distance analysis to produce a data distance measure result;
(viii) storing the data distance measure result from step 4(vii) IV(vii);
(ix) comparing, at the central data archival manager node, the stored data grouping and the data distance measure results versus a predetermined distribution threshold to determine whether or not the outputted stored data grouping and the data distance measure results meet said predetermined threshold to determine whether or not the outputted stored data grouping and the data distance measure results meet said predetermined threshold and setting one or more flags to indicate said determination(s);
(ix) comparing, at the central data archival manager node, the distance measure results from step IV(viii) with predetermined threshold values and set flags for this criteria to be met or not met and indicate the said determination(s);
(x) storing the one or more flags from step 4(ix) IV(ix);
V. performing an intra-data relationship analysis further comprising the steps of:
(i) conducting sensitivity analysis on a first parameter of the pre-processed data with respect to a second parameter of the pre-processed data by using a partial least squares analysis to identify and then flag related parameters;
(ii) storing the identified flagged related parameters of step V(i);
(iii) conducting sensitivity analysis on a first parameter of the pre-processed data with respect to a second parameter of the pre-processed data by using a random forest and regression fit analysis to identify and then flag related parameters;
(iv) storing the identified flagged related parameters of step 5(iii) V(iii);
VI. conducting a dimensional analysis further comprising the steps of:
(i) conducting a singular value decomposition on the pre-processed data to produce reduced dimensionality data;
(ii) storing the reduced dimensionality data of step VI(i);
(iii) conducting a singular value decomposition on the reduced dimensionality data to flag extraneous and redundant data parameters;
(iv) storing the flagged extraneous and redundant data parameters of step VI(i); and
VII. validating with a fitment analysis for models further comprising the step of:
(i) verifying the flags stored in steps 1-6 by conducting one or more analyses selected from the group consisting of Correlation techniques, ANOVA techniques and Kohonen's Self Organizing Maps to provide affirmation flags;
VIII. considering the flags raised by steps I to VII and using them for data transformation from live data to preprocessed data and then to removal due to remove any repetition or missing values processing to produce flagged, documented and reduced data to define the failure pattern identification algorithm logic, and storing the flagged, documented and reduced data in a central data warehouse.

2. The system of claim 1 wherein the system further:
a. identifies failure patterns from history;
b. determines probability of failure occurring.

3. The system of claim 1 wherein the system further executes a decision synchronizer to deliver one or more of decisions, messages, reports, and data in the form of one or more of actions, triggers, events, e-mails, and short message service messages to operators, planners and business decision makers.

* * * * *